(12) United States Patent
Freeny, Jr.

(10) Patent No.: US 8,935,184 B2
(45) Date of Patent: Jan. 13, 2015

(54) PROXIMITY SERVICE PROVIDER SYSTEM

(75) Inventor: Charles C. Freeny, Jr., Dallas, TX (US)

(73) Assignee: Automated Business Companies, Irving, TX (US)

(*) Notice: Subject to any disclaimer, the term of this patent is extended or adjusted under 35 U.S.C. 154(b) by 1703 days.

(21) Appl. No.: 11/018,176

(22) Filed: Dec. 21, 2004

(65) Prior Publication Data

US 2005/0102211 A1 May 12, 2005

Related U.S. Application Data

(63) Continuation of application No. 09/697,557, filed on Oct. 26, 2000, now Pat. No. 6,970,850.

(60) Provisional application No. 60/161,883, filed on Oct. 27, 1999, provisional application No. 60/186,874, filed on Mar. 3, 2000.

(51) Int. Cl.
*G06Q 20/00* (2012.01)
*G06Q 20/14* (2012.01)
(Continued)

(52) U.S. Cl.
CPC .......... *G06Q 20/145* (2013.01); *G06Q 22/1235* (2013.01); *G06Q 20/04* (2013.01);
(Continued)

(58) Field of Classification Search
USPC .......................................................... 705/50
See application file for complete search history.

(56) References Cited

U.S. PATENT DOCUMENTS 4,532,416 A 7/1985 Berstein
4,734,858 A 3/1988 Schlafly
(Continued)

FOREIGN PATENT DOCUMENTS

EP 0731580 A1 11/1996
EP 0982264 A1 1/2000
(Continued)

OTHER PUBLICATIONS

Press Releases; "Nokia unveils the world's first media phone for Internet access"; www.db.nokia.com/pressrel/web, Aug. 3, 1999; 2 pgs.
(Continued)

*Primary Examiner* — Calvin L Hewitt, II
*Assistant Examiner* — John M Winter
(74) *Attorney, Agent, or Firm* — Dunlap Codding, P.C.

(57) ABSTRACT

Web-sites www.proximityservices.com, www.accessservices.com, www.vendingmachineservices.com, www.vehicleservices.com, www.meterservices.com, www.picopay.com, www.tollservices.com, for all the proximity service systems world wide are disclosed wherein customers can sign up for proximity services such as toll gate services at any toll gate in the world that has signed up to provide the service to customers, parking meter services etc. and the proximity systems owners are guaranteed their payments. In the preferred embodiment all transactions are approved at the local POS (toll gate, parking meter, checkout station, parking lot, pay phone, ATM, gas station, etc.) using a service provider identification number (SPIN) issued to the service provider owner each month for example. The local approved transactions are guaranteed by the web-site owners and the customers each have unique SPIN numbers that expire periodically such as each month. The web-site designs are designed to work most efficiently with all in one access devices such as, a wireless cell phone, a pager, or master PASS unit that can directly activate proximity transaction units by delivering credit card, Smartcard, debit card, and or SPIN code data.

3 Claims, 32 Drawing Sheets

(51) Int. Cl.

| | |
|---|---|
| *G06Q 20/04* | (2012.01) |
| *G06Q 20/20* | (2012.01) |
| *G06Q 20/34* | (2012.01) |
| *G06Q 20/38* | (2012.01) |
| *G06Q 20/40* | (2012.01) |
| *G06Q 30/06* | (2012.01) |
| *G06Q 40/00* | (2012.01) |
| *G07F 7/02* | (2006.01) |

(52) U.S. Cl.
CPC .............. *G06Q 20/20* (2013.01); *G06Q 20/342* (2013.01); *G06Q 20/385* (2013.01); *G06Q 20/40* (2013.01); *G06Q 30/06* (2013.01); *G06Q 40/00* (2013.01); *G07F 7/025* (2013.01)
USPC .................................. 705/52; 705/64; 705/76

(56) References Cited

U.S. PATENT DOCUMENTS

| | | | |
|---|---|---|---|
| 4,910,775 A | 3/1990 | Yves et al. | |
| 4,970,655 A | 11/1990 | Winn et al. | |
| 4,999,763 A | 3/1991 | Ousborne | |
| 5,088,586 A | 2/1992 | Isobe et al. | |
| 5,091,713 A | 2/1992 | Horne et al. | |
| 5,113,351 A | 5/1992 | Bostic | |
| 5,192,854 A | 3/1993 | Counts | |
| 5,243,174 A | 9/1993 | Veeneman et al. | |
| 5,285,382 A | 2/1994 | Muehlberger et al. | |
| 5,349,658 A | 9/1994 | O'Rourke et al. | |
| 5,396,443 A | 3/1995 | Mese et al. | |
| 5,440,479 A | 8/1995 | Hutton | |
| 5,442,567 A | 8/1995 | Small | |
| 5,457,636 A | 10/1995 | Sansone et al. | |
| 5,524,201 A | 6/1996 | Shwarts et al. | |
| 5,533,123 A | 7/1996 | Force et al. | |
| 5,533,727 A | 7/1996 | DeMar | |
| 5,534,857 A | 7/1996 | Laing et al. | |
| 5,537,315 A | 7/1996 | Mitcham | |
| 5,550,976 A | 8/1996 | Henderson et al. | |
| 5,551,030 A | 8/1996 | Linden et al. | |
| 5,555,408 A | 9/1996 | Fujisawa et al. | |
| 5,557,730 A | 9/1996 | Frid-Nielsen | |
| 5,559,728 A | 9/1996 | Kowalski et al. | |
| 5,564,048 A | 10/1996 | Eick et al. | |
| 5,572,643 A | 11/1996 | Judson | |
| 5,572,984 A | 11/1996 | Alden et al. | |
| 5,615,346 A | 3/1997 | Gerken | |
| 5,648,906 A | 7/1997 | Amirpanahi | |
| 5,753,899 A | 5/1998 | Gomm et al. | |
| 5,844,808 A | 12/1998 | Konsmo et al. | |
| 6,016,476 A * | 1/2000 | Maes et al. ..................... 705/1.1 |
| 6,116,505 A * | 9/2000 | Withrow ........................ 235/381 |
| 6,574,603 B1 | 6/2003 | Dickson et al. | |
| 6,601,038 B1 * | 7/2003 | Kolls .............................. 705/14 |
| 6,609,659 B2 | 8/2003 | Sehr | |
| 6,671,358 B1 * | 12/2003 | Seidman et al. ............ 379/93.12 |
| 6,789,733 B2 * | 9/2004 | Terranova et al. ............. 235/381 |
| 6,816,083 B2 * | 11/2004 | Brandt ..................... 340/870.11 |
| 7,170,391 B2 * | 1/2007 | Lane et al. ..................... 340/5.82 |
| 7,183,924 B1 * | 2/2007 | Ku .............................. 340/572.1 |
| 7,188,764 B2 * | 3/2007 | Penuela ........................ 235/384 |
| 7,204,409 B2 * | 4/2007 | Kumar et al. .................. 235/375 |
| 7,221,258 B2 * | 5/2007 | Lane et al. ..................... 340/10.1 |
| 7,239,241 B2 * | 7/2007 | Claudatos et al. .......... 340/572.1 |
| 7,245,221 B2 * | 7/2007 | Claudatos et al. .......... 340/572.1 |

FOREIGN PATENT DOCUMENTS

| | | |
|---|---|---|
| WO | 96/36163 A | 11/1996 |
| WO | 96/36163 B | 11/1996 |

OTHER PUBLICATIONS

Press Releases; "Visa, Nokia and MeritaNordbanken Group to Pilot Mobile Payment"; www.db.nokia.com/pressrel/web.
Press Releases; Nokia announces cooperation with technology leaders toward development of WAP based products and solutions; 4 pgs.
Press Releases; The New Internet Forum has been established: The IPv6 Forum; www.db.nokia.com/pressrel/web; Aug. 3, 1999; 2 pgs.
Press Releases; "Nokia and Beijing TA, China sign agreement for further expansion of Beijing dualband network"; www.db.nokia.com/pressrel/web; Aug. 3, 1999; 2 pgs.
"Technical Specifications"; www.nokia9000.com; Aug. 16, 1999; 2 pgs.
"Executive Summary" and Installing a NOS on an HP NetServer Remotely; 3 pgs.
"Introducing Diffie and Hellman"; 5 pgs.
Wall Street Journal; "M-Commerce, Still Nascent in U.S. Looks to Grow" and "A. Nascent Industry in the U.S. Looks to Blossom"; date unknown.
Wall Street Journal; "That's a WAP—How the Cell Phone and Web Contracted an Arranged Marriage"; Oct. 11, 1999; 2 pgs.
Wall Street Journal; "Overseas, a Cell Phone Can Pay the Monthly Rent"; date unknown.
Wall Street Journal—Corporate Focus; "Japanese Cell-Phone Service Thrives With Microbilling"; date unknown; 1 pg.
Wall Street Journal; Overseas Mobile Phones Work Like Electronic Wallets; Bank, Buy Wine, Pay Rent; date unknown; 1 pg.
DIY KIT KS232D Time Recorder.
Texas Instruments; TIRIS Automatic Recognition of Consumers: Series 5000 Reader System; 13 pgs.

* cited by examiner

|  | AP #1 | AP #2 | AP #3 | ****** | AP #n |
|---|---|---|---|---|---|
| MUI #1 | IA11 | IA12 | IA13 | ****** | IA1n |
| MUI #2 | IA21 | IA22 | IA23 | ****** | IA2n |
| MUI #3 | IA31 | IA32 | IA33 | ****** | IA3n |
| MUI #4 | IA41 | IA42 | IA43 | ****** | IA4n |
| MUI #5 | IA51 | IA52 | IA53 | ****** | IA5n |
| MUI #6 | IA61 | IA62 | IA63 | ****** | IA6n |
| MUI #7 | IA71 | IA72 | IA73 | ****** | IA7n |
| ** | ** | ** | ** | ********* | ** |
| MUI #v | IAv1 | IAv2 | IAv3 | ****** | IAvn |

Fig. 20

|         | AP #1 | AP #2 | AP #3 | ****** | AP #n |
|---------|-------|-------|-------|--------|-------|
| MUI #1  | CE11  | CE12  | DC    | ****** | CE1n  |
| MUI #2  | DC    | N/A   | CE23  | ****** | CE2n  |
| MUI #3  | CE31  | DC    | N/A   | ****** | N/A   |
| MUI #4  | DC    | CE42  | CE43  | ****** | N/A   |
| MUI #5  | N/A   | CE52  | N/A   | ****** | DC    |
| MUI #6  | CE61  | DC    | CE63  | ****** | N/A   |
| MUI #7  | N/A   | CE72  | DC    | ******* | N/A  |
| * *     | * *   | * *   | * *   | **** * *  | * *   |
| MUI #v  | DC    | CEv2  | N/A   | ****** | N/A   |

Fig. 21

|  | AP #1 | AP #2 | AP #3 | ****** | AP #n |
|---|---|---|---|---|---|
| MUI #1 | CBE11 | CBE12 | DC | ****** | CBE1n |
| MUI #2 | DC | N/A | CBE23 | ****** | CBE2n |
| MUI #3 | CBE31 | DC | N/A | ****** | N/A |
| MUI #4 | DC | CBE42 | CBE43 | ****** | N/A |
| MUI #5 | N/A | CBE52 | N/A | ****** | DC |
| MUI #6 | CBE61 | DC | CBE63 | ****** | N/A |
| MUI #7 | N/A | CBE72 | DC | ****** | N/A |
| ** | ** | ** | ** | ******** | ** |
| MUI #v | DC | CBEv2 | N/A | ****** | N/A |

Fig. 22

|  | AP #1 | AP #2 | AP #3 | ****** | AP #n |
|---|---|---|---|---|---|
| MUI #1 | SE11 | SE12 | DC | ****** | SE1n |
| MUI #2 | DC | N/A | SE23 | ****** | SE2n |
| MUI #3 | SE31 | DC | N/A | ****** | N/A |
| MUI #4 | DC | SE42 | SE43 | ****** | N/A |
| MUI #5 | N/A | SE52 | N/A | ****** | DC |
| MUI #6 | SE61 | DC | SE63 | ****** | N/A |
| MUI #7 | N/A | SE72 | DC | ****** | N/A |
| ** | ** | ** | ** | ******** ** | ** |
| MUI #v | DC | SEv2 | N/A | ****** | N/A |

Fig. 22A

| User Requirements / Applications | Generic User Requirements #1 Operations (GUR) | Generic User Requirements #2 Accounting (GUR) | Generic User Requirements #3 HR (GUR) | Generic User Requirements #4 G&A (GUR) | Generic User Requirements #5 Special (GUR) |
|---|---|---|---|---|---|
| AP#1 Sales | MUI with (r) CE | MUI with (r) CE | MUI with (r) CE | MUI with (r) CE | MUI with (r) CE |
| AP#2 Payroll | MUI with (r) CE | MUI with (r) CE | MUI with (r) CE | MUI with (r) CE | MUI with (r) CE |
| AP#3 Purchasing | MUI with (r) CE | MUI with (r) CE | MUI with (r) CE | MUI with (r) CE | MUI with (r) CE |
| AP#4 Facilities | MUI with (r) CE | MUI with (r) CE | MUI with (r) CE | MUI with (r) CE | MUI with (r) CE |
| AP#5 Suppliers | MUI with (r) CE | MUI with (r) CE | MUI with (r) CE | MUI with (r) CE | MUI with (r) CE |
| AP#6 Reports | MUI with (r) CE | MUI with (r) CE | MUI with (r) CE | MUI with (r) CE | MUI with (r) CE |
| AP#7 Forms | MUI with (r) CE | MUI with (r) CE | MUI with (r) CE | MUI with (r) CE | MUI with (r) CE |
| AP#8 Customers | MUI with (r) CE | MUI with (r) CE | MUI with (r) CE | MUI with (r) CE | MUI with (r) CE |
| AP#9 Payments | MUI with (r) CE | MUI with (r) CE | MUI with (r) CE | MUI with (r) CE | MUI with (r) CE |
| AP#10 Tax | MUI with (r) CE | MUI with (r) CE | MUI with (r) CE | MUI with (r) CE | MUI with (r) CE |
| AP#11 Maintenance | MUI with (r) CE | MUI with (r) CE | MUI with (r) CE | MUI with (r) CE | MUI with (r) CE |
| AP#12 Regulations | MUI with (r) CE | MUI with (r) CE | MUI with (r) CE | MUI with (r) CE | MUI with (r) CE |
| AP#13 Training | MUI with (r) CE | MUI with (r) CE | MUI with (r) CE | MUI with (r) CE | MUI with (r) CE |
| AP#14 Security | MUI with (r) CE | MUI with (r) CE | MUI with (r) CE | MUI with (r) CE | MUI with (r) CE |
| AP#15 Legal | MUI with (r) CE | MUI with (r) CE | MUI with (r) CE | MUI with (r) CE | MUI with (r) CE |
| AP#16 Cash | MUI with (r) CE | MUI with (r) CE | MUI with (r) CE | MUI with (r) CE | MUI with (r) CE |
| AP#17 Office | MUI with (r) CE | MUI with (r) CE | MUI with (r) CE | MUI with (r) CE | MUI with (r) CE |
| AP#18 Receivables | MUI with (r) CE | MUI with (r) CE | MUI with (r) CE | MUI with (r) CE | MUI with (r) CE |
| AP#19 Insurance | MUI with (r) CE | MUI with (r) CE | MUI with (r) CE | MUI with (r) CE | MUI with (r) CE |
| AP#20 Special AP | MUI with (r) CE | MUI with (r) CE | MUI with (r) CE | MUI with (r) CE | MUI with (r) CE |

Fig. 23

| User Requirements / Applications | Generic User Requirements #1 Operations (GUR) | Generic User Requirements #2 Accounting (GUR) | Generic User Requirements #3 HR (GUR) | Generic User Requirements #4 G&A (GUR) | Generic User Requirements #5 Special (GUR) |
|---|---|---|---|---|---|
| AP#1 Sales | MUI with (t) TE | MUI with (t) TE | MUI with (t) TE | MUI with (t) TE | MUI with (t) TE |
| AP#2 Payroll | MUI with (t) TE | MUI with (t) TE | MUI with (t) TE | MUI with (t) TE | MUI with (t) TE |
| AP#3 Purchasing | MUI with (t) TE | MUI with (t) TE | MUI with (t) TE | MUI with (t) TE | MUI with (t) TE |
| AP#4 Facilities | MUI with (t) TE | MUI with (t) TE | MUI with (t) TE | MUI with (t) TE | MUI with (t) TE |
| AP#5 Suppliers | MUI with (t) TE | MUI with (t) TE | MUI with (t) TE | MUI with (t) TE | MUI with (t) TE |
| AP#6 Reports | MUI with (t) TE | MUI with (t) TE | MUI with (t) TE | MUI with (t) TE | MUI with (t) TE |
| AP#7 Forms | MUI with (t) TE | MUI with (t) TE | MUI with (t) TE | MUI with (t) TE | MUI with (t) TE |
| AP#8 Customers | MUI with (t) TE | MUI with (t) TE | MUI with (t) TE | MUI with (t) TE | MUI with (t) TE |
| AP#9 Payments | MUI with (t) TE | MUI with (t) TE | MUI with (t) TE | MUI with (t) TE | MUI with (t) TE |
| AP#10 Tax | MUI with (t) TE | MUI with (t) TE | MUI with (t) TE | MUI with (t) TE | MUI with (t) TE |
| AP#11 Maintenance | MUI with (t) TE | MUI with (t) TE | MUI with (t) TE | MUI with (t) TE | MUI with (t) TE |
| AP#12 Regulations | MUI with (t) TE | MUI with (t) TE | MUI with (t) TE | MUI with (t) TE | MUI with (t) TE |
| AP#13 Training | MUI with (t) TE | MUI with (t) TE | MUI with (t) TE | MUI with (t) TE | MUI with (t) TE |
| AP#14 Security | MUI with (t) TE | MUI with (t) TE | MUI with (t) TE | MUI with (t) TE | MUI with (t) TE |
| AP#15 Legal | MUI with (t) TE | MUI with (t) TE | MUI with (t) TE | MUI with (t) TE | MUI with (t) TE |
| AP#16 Cash | MUI with (t) TE | MUI with (t) TE | MUI with (t) TE | MUI with (t) TE | MUI with (t) TE |
| AP#17 Office | MUI with (t) TE | MUI with (t) TE | MUI with (t) TE | MUI with (t) TE | MUI with (t) TE |
| AP#18 Receivables | MUI with (t) TE | MUI with (t) TE | MUI with (t) TE | MUI with (t) TE | MUI with (t) TE |
| AP#19 Insurance | MUI with (t) TE | MUI with (t) TE | MUI with (t) TE | MUI with (t) TE | MUI with (t) TE |
| AP#20 Special AP | MUI with (t) TE | MUI with (t) TE | MUI with (t) TE | MUI with (t) TE | MUI with (t) TE |

Fig. 24

|  |  |  |  |  |  |  |
|---|---|---|---|---|---|---|
|  | (10) Entertainment MOSS: Each MOSS Manages (20) APPs | | | | | |
|  | (20) Event MOSS: Each MOSS Manages (20) APPs | | | | | |
|  | (100) Commercial Service MOSS: Each MOSS Manages (20) APPs | | | | | |
|  | (50) Public Service MOSS: Each MOSS Manages (20) APPs | | | | | |
|  | (25) Educational Service MOSS: Each MOSS Manages (20) APPs | | | | | |
|  | (75) Facility Management MOSS: Each MOSS Manages (20) APPs | | | | | |
|  | (20) Facility Development MOSS: Each MOSS Manages (20) APPs | | | | | |
|  | (68) Transportation Services (TS) MOSS: Each MOSS Manages (20) APPs | | | | | |
| 19 Applications to generate 536 user Master Programs | | | | | | |
| TS Operations APP | Airline (5) | Trucking (15) | Railroad (8) | Ship (5) | Automobile (20) | Public (15) |
| TS Sales APP | Airline (5) | Trucking (15) | Railroad (8) | Ship (5) | Automobile (20) | Public (15) |
| TS HR APP | Airline (5) | Trucking (15) | Railroad (8) | Ship (5) | Automobile (20) | Public (15) |
| TS Accounting APP | Airline (5) | Trucking (15) | Railroad (8) | Ship (5) | Automobile (20) | Public (15) |
| TS Facilities APP | Airline (5) | Trucking (15) | Railroad (8) | Ship (5) | Automobile (20) | Public (15) |
| TS PR APP | Airline (5) | Trucking (15) | Railroad (8) | Ship (5) | Automobile (20) | Public (15) |
| TS Collection APP | Airline (5) | Trucking (15) | Railroad (8) | Ship (5) | Automobile (20) | Public (15) |
| TS Training APP | Airline (5) | Trucking (15) | Railroad (8) | Ship (5) | Automobile (20) | Public (15) |
| TS Security APP | Airline (5) | Trucking (15) | Railroad (8) | Ship (5) | Automobile (20) | Public (15) |

Fig. 25A

| | Airline (5) | Trucking (15) | Railroad (8) | Ship (5) | Automobile (20) | Public (15) |
|---|---|---|---|---|---|---|
| TS Maintenance APP | Airline (5) | Trucking (15) | Railroad (8) | Ship (5) | Automobile (20) | Public (15) |
| TS Regulations APP | Airline (5) | Trucking (15) | Railroad (8) | Ship (5) | Automobile (20) | Public (15) |
| TS Reporting APP | Airline (5) | Trucking (15) | Railroad (8) | Ship (5) | Automobile (20) | Public (15) |
| TS Customers APP | Airline (5) | Trucking (15) | Railroad (8) | Ship (5) | Automobile (20) | Public (15) |
| TS Suppliers APP | Airline (5) | Trucking (15) | Railroad (8) | Ship (5) | Automobile (20) | Public (15) |
| TS Purchasing APP | Airline (5) | Trucking (15) | Railroad (8) | Ship (5) | Automobile (20) | Public (15) |
| TS Payment APP | Airline (5) | Trucking (15) | Railroad (8) | Ship (5) | Automobile (20) | Public (15) |
| TS Insurance APP | Airline (5) | Trucking (15) | Railroad (8) | Ship (5) | Automobile (20) | Public (15) |
| TS Forms APP | Airline (5) | Trucking (15) | Railroad (8) | Ship (5) | Automobile (20) | Public (15) |
| TS Legal APP | Airline (5) | Trucking (15) | Railroad (8) | Ship (5) | Automobile (20) | Public (15) |
| TS Receivables APP | Airline (5) | Trucking (15) | Railroad (8) | Ship (5) | Automobile (20) | Public (15) |
| (45) Transportation Manufacturing (TM) MOSS: Each MOSS Manages (20) APPs | | | | | | |
| TM Operations APP | Airline (10) | Trucking (5) | Railroad (5) | Ship (10) | Automobile (10) | Public (5) |
| TM Sales APP | Airline (10) | Trucking (5) | Railroad (5) | Ship (10) | Automobile (10) | Public (5) |
| TM HR APP | Airline (10) | Trucking (5) | Railroad (5) | Ship (10) | Automobile (10) | Public (5) |
| TM Accounting APP | Airline (10) | Trucking (5) | Railroad (5) | Ship (10) | Automobile (10) | Public (5) |
| TM Facilities APP | Airline (10) | Trucking (5) | Railroad (5) | Ship (10) | Automobile (10) | Public (5) |
| TM PR APP | Airline (10) | Trucking (5) | Railroad (5) | Ship (10) | Automobile (10) | Public (5) |

Fig. 25B

| TM Collection APP | Airline (10) | Trucking (5) | Railroad (5) | Ship (10) | Automobile (10) | Public (5) |
|---|---|---|---|---|---|---|
| TM Training APP | Airline (10) | Trucking (5) | Railroad (5) | Ship (10) | Automobile (10) | Public (5) |
| TM Security APP | Airline (10) | Trucking (5) | Railroad (5) | Ship (10) | Automobile (10) | Public (5) |
| TM Maintenance APP | Airline (10) | Trucking (5) | Railroad (5) | Ship (10) | Automobile (10) | Public (5) |
| TM Regulations APP | Airline (10) | Trucking (5) | Railroad (5) | Ship (10) | Automobile (10) | Public (5) |
| TM Reporting APP | Airline (10) | Trucking (5) | Railroad (5) | Ship (10) | Automobile (10) | Public (5) |
| TM Customers APP | Airline (10) | Trucking (5) | Railroad (5) | Ship (10) | Automobile (10) | Public (5) |
| TM Suppliers APP | Airline (10) | Trucking (5) | Railroad (5) | Ship (10) | Automobile (10) | Public (5) |
| TM Purchasing APP | Airline (10) | Trucking (5) | Railroad (5) | Ship (10) | Automobile (10) | Public (5) |
| TM Payment APP | Airline (10) | Trucking (5) | Railroad (5) | Ship (10) | Automobile (10) | Public (5) |
| TM Insurance APP | Airline (10) | Trucking (5) | Railroad (5) | Ship (10) | Automobile (10) | Public (5) |
| TM Forms APP | Airline (10) | Trucking (5) | Railroad (5) | Ship (10) | Automobile (10) | Public (5) |
| TM Legal APP | Airline (10) | Trucking (5) | Railroad (5) | Ship (10) | Automobile (10) | Public (5) |
| TM Receivables APP | Airline (5) | Trucking (15) | Railroad (8) | Ship (5) | Automobile (20) | Public (15) |

Fig. 25C

PROXIMITY SERVICE PROVIDER SYSTEM

CROSS-REFERENCE TO RELATED APPLICATIONS

This application is a continuation application of U.S. application Ser. No. 09/697,557, filed on Oct. 26, 2000 now U.S. Pat. No. 6,970,850, which claims priority to the provisional patent application identified by U.S. Ser. No. 60/161,883, entitled Proximity Service Provider System, filed on Oct. 27, 1999, and which also claims priority to the provisional patent application identified by U.S. Ser. No. 60/186,874, entitled Master Operating Software System, filed on Mar. 3, 2000; the entire contents of which are hereby expressly incorporated herein by reference.

STATEMENT REGARDING FEDERALLY SPONSORED RESEARCH AND DEVELOPMENT

Not Applicable.

BACKGROUND OF THE INVENTION

The present invention relates to methods for selling, authorizing, collecting, distributing payments, and maintaining proximity services from a central location wherein the proximity services are provided at remote locations. More particularly, but not by way of limitation, the present invention relates to a proximity service provider system (PSPS) that allows users of Proximity service systems to sign up for the service, operators of proximity service systems to receive maintenance information, and owners of proximity service systems to get paid without having to have separate communication networks and methods to obtain these separate services. Proximity service systems require a person to be within predetermined close distances, such as 200 feet, to the proximity service systems in order to receive a service therefrom. Examples of proximity service systems are physical POS stations, ATM machines, toll gates, gas pumps, kiosks, pay phones, vending machines and parking meters to name a few.

PROBLEMS TO BE SOLVED

The problems to be solved are related to the proximity services for such proximity service systems as kiosk machines, vending machines, ATM's and toll and access systems being implemented for the convenience of the mobile consumer. Most of these proximity service systems have their own special activation devices and methods of payment and means for the operators to maintain the proximity service systems. In most cases these proximity service systems are either operated by coins or cards of some type. Wireless activation devices, such as toll tags, gate and garage openers are often used when vehicles are involved. Except for credit card payments, most proximity service systems have their own activation and payment means and will not operate with other activation and/or devices. Even in the case of credit card payment methods, both consumers and owners are obliged to carry or accept many types of cards (e.g. Visa, MasterCard, American Express, Discover, Diners Club, plus five merchant cards, plus five gas cards for a total of 15 cards is typical). Also, the means for authorizing and collecting for these proximity service systems are typically done over networks designed separately for the owner.

In recent years there have evolved service companies servicing merchants that accept most credit and debit cards and can even authorize check payments. These services certainly help both the consumer and merchant and have facilitated more proximity service growth. However, the available authorization and collection services are only directed at retail POS systems (both physical and cyber services) and they do not let a consumer sign up for the service but only collect payment for the merchant from the consumer's card.

Another recent system for universal credit is called "Proton" (the details are at www.proton.be), which uses a smart card to pay at the merchants site once the card has been verified to be valid. However, this is just a replacement for the credit card and requires the customer to carry cash in the card rather than the merchant and credit card company giving credit to the customer for 30 days. The smart card is good for merchants but not so good for customers. There are several virtual credit cards a person can apply for to make purchases in cyber stores, similar to card services that allow purchases in physical stores but they can not be used in physical stores and again, the person registers for the cyber card, not for a service.

In summary, regarding the prior art credit card payment and collection systems, consumers have to sign up for cards of some type and hope merchants accept the cards they have. That is, the consumer does not sign up for the service, they sign up for a device. Also the technology has made it so easy for each merchant to have a card or device system for offering "purchase points" as a way of attracting repeat business, the proliferation of devices carried by the consumer is huge. The number of cards total into the thousands in this country alone, when regional merchants cards are included. But again, the consumer actually signs up for a card or device that allows them to receive the service, they do not sign up for the service itself.

With other types of proximity service systems such as toll tags, gate and garage access, vehicle access using wireless activators and payment methods, virtually no commonality exists. Combining these devices with the new wireless communication device revolution involving cell phones, pagers, and now, hand held wireless digital devices, a consumer is faced with a formidable array of physical devices (along with remembering their authorization codes) when leaving the home prepared to function each day. The means to service all of these devices with a common approach has not ever been attempted except in futuristic concepts such as the "piano software platform" Motorola announced this year involving the development of a software platform so wireless devices could operate on a network such as the Internet in the future.

There are several reasons proximity service provider systems have not been designed before now, but probably the main reason is that owners of these various systems, such as the tolling authorities, parking garage owner, paging company, cell and pager communication operators, are primarily trying to increase their customer bases by offering more services. They are not working to solve the commonality problems with other services, as the credit card industry did. Commonality problems exist in terms of devices, activation methods, collection methods, marketing, maintenance, and operation procedures for the various services. The FCC regulations, of course, help in terms of device signal commonality, but not regarding the styles, activation, payment, and collection means across the wireless device utilization spectrum. All of the other commonality problems have barely been addressed in the proximity service industry other than adopting credit card payment methods into most collection systems.

A number of specialized service systems designed for owners of the proximity systems such as vending machines connected by networks like the Denmark company "DIKU" that connected a coke machine to the Internet so the owners could check the sales and inventory status from a web-site (1997 time frame). Another example is the "Harvest system" (can be reviewed at www.harvest.com) designed for the Coca Cola Company starting in 1990 to monitor their machines in terms of sales and inventory over a private network. More recently on-line vending in the UK have networks being established similar to harvest.com run by GPT Telemetry whereby an owner can connect his vending machine and obtain data regarding sales. There have been parking lots and meter electronic management systems designed that use various collection and maintenance means for the owners but none that offer a parking lot or meter service for the consumer (other than issuing access cards). The same is true in the electronic lock industry where all the service systems are designed privately for the owners and not the consumers. The leaders in this field primarily involve hotel systems that issue electronic door keys to new customers.

The above problem discussion has focused primarily on the fact that today, consumers can only sign up for devices (physical or virtual) not services, even though the person only wants a service. This is true even in the case of access services such as automatic toll gates, hotel rooms, subway debit cards, etc. There are similar problems and disparities when the focus is on the operating costs the owners have because they force the customer to use special activation and payment means rather than accept common devices or methods. This has hampered the vehicle access systems for years because authorization, activation and payment methods have not been common among the operating systems. Thus, not only is it very inconvenient for the customer, the cost of operation has remained very high because service companies can not make a profit operating the various access systems for the owners. Consequently, there are hardly any service companies (other than the individual owners) that the owners and operators of these other proximity service systems can use to lower their cost, as for example, in the POS systems discussed above. Thus in all cases: 1.) the consumer can only sign up for more devices if they want more services; 2.) for services other than POS, the owners cannot even sign up for the collection service except using specialized collection systems designed for devices such as toll tags or gate and parking cards; and 3.) the operators of the proximity service systems have no service center for maintenance and inventory control other than those specialized for the owners centered around collections.

PRIOR ART

Some of the prior art for services involving the consumer, owner or the proximity system operator were reviewed in discussing the problem. An apparatus and methods for monitoring and communicating with a plurality of networked remote vending machines is disclosed by Konsmo in U.S. Pat. No. 5,844,808, to help owners monitor the state of their remote vending systems. However, this system does not allow customers to sign up for proximity services supplied by the owners.

A system described by Gomm in U.S. Pat. No. 5,753,899 allows smart cards to be accepted at owner vending machines and can be used entirely for the purchase or to supplement the customer's coins by rounding the machine up or down to the closest amount accepted by the machine for the selected item.

Yet another payment system for cards is disclosed by Muehlberger in U.S. Pat. No. 5,285,382, where the system only validated remotely for transactions exceeding $2.00. The less than $2.00 fraudulent transactions were considered to be acceptable by the owner in favor of not having to get remote approval for every transaction.

A networked parking meter system is disclosed in U.S. Pat. No. 5,648,906, wherein a vehicle was sensed automatically and a meter would be reset, for example, when the vehicle left the parking space.

Again, none of the cited art discussed systems that allow both the owner of proximity service systems and the customer to sign up for services and/or allow local transactions to be validated locally by fraudulent detecting means. The state of the art for networked services to help more than one participant is best described in Fortune magazine September 1999 on pages 215-224, wherein a summary of services for both hardware operations and software operations that can be obtained today or will be available in the near future were listed. The list is not complete, but does indicate that web based services for application software, "Rent-AN-App" and "Rent a Whole Service" are just emerging and range from rent a software program to a service for purchasing products for companies. The closest service available on the published list to the type disclosed herein is that of Bidcom (www.bidcom.com), in which construction companies services are offered. Bidcom provides information services for employee and managers, such as schedules, blueprints, work permits, etc. associated with a construction project. The cited example, along with the other services listed are nothing more than moving services to the WEB, that have been offered inside the company for years in order make access much more convenient and possibly allow out sourcing by companies not wanting to maintain their own internal service. Such changes are certainly steps in the right direction, but do not address the problems discussed above.

Web-site services for finding and purchasing products and services abound on the web, but most sites do nothing more than move physical stores and services to the cyber world. In fact, most web-sites do nothing more than convert a lot of proximity services, such as retail stores, to non proximity services so that the consumer does not have to be within a predetermined distance of the service to purchase a product and/or get the service. This explains, in part, the rapid growth of cyber stores, because this conversion in itself is a huge convenience for the consumer.

The web based technology for implementing the current invention is available by combining: 1.) interactive web-site page designs like those used on company sites such as Microsoft, Cisco, Motorola, or Sun Micro Systems, for examples that have specialized pages for world wide customers and products for purchase, developers of related products (third parties), the owners for corporate data with; 2.) the web-site designs available for collecting and distributing payments, such as done on the new MP3 web-site when customers purchase songs and royalties must be paid to the copyright owner; and 3.) the automated machine reporting web designs such as that used by on line vending. Other available technologies for implementing the preferred methods are referenced in the description of the web-site invention.

SUMMARY OF THE INVENTION

The terms "PSPS site", "PSPS Web-site" and "PSPS system" are used interchangeably herein.

The terms "user", "person" and "customer" are used interchangeably herein.

The current invention provides solutions to all three of the basic problems mentioned earlier and does it in such a manner to take advantage of the www system that is currently available. In summary, there are no proximity service provider systems, such as the one presented herein, that is designed for the owners of proximity service systems, physical operators of proximity service systems, and the consumer of proximity services from the proximity service systems to go to the same location, such as a web-site, and receive or sign up for the service or services pertaining to their needs. The solution then is one, of letting the consumer, the owner and the physical operator interact with (i.e. provide information to and receive information from) that portion of the proximity system service information and data each needs from the same web-site or affiliated web-sites, for example. Actually, the solution is the same with or without using the www network, but without the www, a worldwide private communication network would have to be established in order to implement the design. Clearly a free world wide network eliminates this major obstacle and allows the design to be implemented with current technology in a very practical fashion and more communication options are available when discussing the preferred embodiments of the various communication requirements.

The proximity service provider system (PSPS) web-site allows a plurality of consumers to log on and sign up for individualized arrays of different world wide proximity services provided by various separate proximity service systems, such as "vending machines", "parking meters", "pay phones", and POS terminals, for example. The consumers then select individualized predetermined payment methods, such as which credit cards or which banks to pay for the services and the manner in which each the consumer wants to be billed (debit the account, monthly statement, etc.). A simple example would be that the customer selects to pay for all the selected services with a Visa card and wants to use the legacy method of service activation rather than use a PSPS unique cyber card code assigned by the PSPS web-site (discussed below), the customer is then told which proximity service systems accept such services.

If the consumer is approved for the requested service and the payment method, the consumer is then given two cyber card codes if he signs up for the PSPS service method. One cyber card code is for accessing the proximity services and the other cyber card code is for accessing the PSPS web-site pages designed for the customers. The PSPS customer web-site pages provide individualized reports regarding the services the consumer received that might include locations, amount paid and dates of the received service, for example. Also, these pages may also be used by customers to get updated cyber card codes (cyber card codes may optionally automatically expire at predetermined periods, for example, each month, in order to virtually eliminate fraud and remote authorization requirements in the preferred PSPS design). These pages are also used to report lost devices that might be carrying a person's cyber card code, such as a credit card or cell phone or to request another cyber card code at anytime in case a person has let another person use their cyber card code temporarily. The second cyber card code is for receiving one of the approved services when at a specific location and these cyber card codes may be renewed by each customer at predetermined times. This feature allows the PSPS service payments to be guaranteed to the owner of the proximity service system providing the services to the consumer without having to have remote authorization services each time the customer wants a relatively inexpensive service, such as the dispensing of soda pop or ice cream at an amusement park, for example. Also the feature is considered much less bothersome than refilling a smart card with money, for example, each time the card runs out of money. In addition, limits can be put on a customer's account, either by the customer or the PSPS web-site operator, and the cyber card becomes invalid when received services of all types exceed these predetermined amounts. The customer and owner are automatically notified in such a case and desired a new valid cyber card code is issued. The second cyber card code may be generated from a private encryption key produced by the PSPS web-site, for example. Only the PSPS web-site can generate these keys, so that only the proximity service systems that also have a different public key corresponding to the cyber card code will unlock the customers key locally and approve a transaction.

The owners and operators of proximity service systems such as those listed above, as well as ATM's and POS merchants, can also sign up for the PSPS service from the same PSPS web-site or affiliated web-sites. The owners, for example, can list the physical location of proximity service systems and services they provide and at what physical locations they will accept customer regular legacy payment cards and in what form or methods they will allow PSPS cyber card codes to be accepted. The owner enters the bank accounts into which money is to be deposited each time transaction data is delivered to the PSPS web-site and they plan for delivery of the accepted transaction data (both frequency and method). For example, the legacy data can be routed through the PSPS web-site using the legacy card method and the PSPS web-site collects from the legacy card company and puts the money into the proximity service owners account. PSPS cyber card delivered transaction data might be delivered several times a day or weekly from the proximity service systems to the PSPS web-site, depending on the collection method used by the proximity service owner and desirably lists the customer cyber card code along with the amount charged for each service at each location along with the time the service was delivered.

Once the owner's service(s) are approved, the owner is given a web-site cyber card code plus a special cyber card code to be incorporated into or stored by the proximity service system or service transaction unit at each of the owners' locations. The owner cyber card code allows the owner to access the PSPS owner web-site pages that provide the owner transaction reports made available with the PSPS service including how much money was paid each day and at what physical locations. The special cyber card code issued for the owner locations can be stored at each of all of the owner's proximity service systems or at proximity service systems selected by the owner. The special cyber card code can be utilized in conjunction with the customer access cyber card code to authorize services locally at the service location (or proximity service system) with out having to get remote authorization each time a service or product is delivered, as is commonly done at present. That is, the PSPS system allows local authorization using a cipher algorithm supplied to the proximity service systems selected by the proximity owner or operator as part of the special location cyber card code rather than remote authorization as done now for credit, debit, and smart cards.

The cipher algorithm converts every valid customer cyber card code into the same PSPS service provider identification number (SPIN) that is valid during the predetermined period along with a unique code identifying the customer. The SPIN can be changed as often as the owners and PSPS system decide, but normally they would change every month, for example, when the customers get new cyber card codes. Thus no matter which distinct customer valid cyber card code was entered at a proximity service system or service location, the same SPIN number would be computed by the proximity service system or transaction unit and be checked against the valid SPIN number for the predetermined period. Also the customer data portion of the deciphered customer cyber card code would be checked against in a valid customer card file.

To speed up the approval process, these computations could be done in parallel even though milliseconds are involved rather than seconds, as currently required with legacy remote approval systems. If the cyber card code is not approved locally by the proximity service system, the transaction service is denied. Such a feature greatly reduces the cost of operation and payments are guaranteed by the PSPS web-site or PSPS system that deals with the customer. In other words the PSPS web-site really becomes the collection agent rather than the proximity service system owner. In the past, this was only partially accomplished by credit card companies such as Visa, MasterCard, etc. that issued physical cards and required the proximity owner to get remote approval each time a customer wanted to use the card for which they would guarantee payment. However, credit card systems are only practical in limited proximity service systems such as those with POS checkout stations connected to a phone lines.

To protect the PSPS web-site owner from loss due to known collection problems, there are lists of bad legacy and cyber cards given out to the Proximity system owners when they connect to the site to turn in the collection transaction data (in the case of legacy cards these are maintained at the web-site for the owner since connection is required each time a service is requested). Each of the bad cyber cards may have a location of prior use, such as Dallas, Tex., associated with it so the owners or their operators of proximity service systems do not necessarily have to notify each proximity service system owned or operated thereby (in Japan for example) to not accept that particular cyber card. This is especially true since the cyber card valid life is relative short to begin with. This decision is left up to the owner. However the PSPS web-site is not responsible for payment on invalid cyber cards accepted by an owners proximity service system once the owner or operator of the proximity service system has been notified that the cyber card is bad.

In cases where an owner subcontracts the operation of the proximity service system to a third party, the third party operator is assigned a cyber card code that allows the third party to access the owner information that is designated by the owner, plus routine maintenance data collected along with the daily transaction data. This information is transmitted to the PSPS web-site, and typically by the proximity service systems partitioned over to the PSPS web-site pages for the operators and most likely includes all of the maintenance and daily operational tasks such as delivery of transaction data to the PSPS web-site and notifying the service location sites regarding invalid cyber cards.

The process described above lets the customer select the type of legacy or cyber card method desired to convey the customer cyber card code to the proximity service system based on the list of methods the proximity owner will accept supplied to the PSPS web-site. These might range from using a visa card plus a PIN number that changes each month to a portable wireless device carried by the customer that transmits the customer cyber card code to the proximity service system that deciphers the SPIN number cyber card code for the month that is stored and delivered by the wireless unit such as a cell phone to the proximity service system each time the service is requested. The preferred embodiment for conveying the customer cyber card code to the proximity service system is a common device for all proximity service systems and all customers such as the Master PASS or the Advanced Wireless Phone System described in detail in co-pending patent application Ser. Nos. 60/152,184 and 09/325,500, the entire content of both are hereby expressly incorporated herein by reference and advocated by the inventor. Alternatively, the customer cyber card code could be punched into a key pad provider or the proximity service system or entered into the proximity service system via a card reader, for example. Such devices will most likely be adopted in the next few years so consumers only need to deal with one or two devices to face the world each day while owners and operators could finally solve the proximity service system or transaction unit commonality problems. Alternatively, the customer cyber card code could be punched or manually entered into a key pad provider or the proximity service system, or electronically entered into the proximity service system via a card reader, for example.

In summary, this invention concerns a PSPS web-site that the customer, owner, and third party operator can subscribe to for service to increase convenience for the customer, and lower cost for the owner and is designed to work with any type legacy or PSPS cyber card system that the owners subscribing to the service agree to accept and customers subscribing to the service agree to use. The fees charged by the owner of the PSPS web-site to the owners and customers can be similar to those charged by credit card companies today.

BRIEF DESCRIPTION OF THE SEVERAL VIEWS OF THE DRAWING

FIG. 7 is a block diagram showing a Proximity Access Service Provider System (PASPS) having customers, owners, operator locations, legacy financial and communication networks communicating in accordance with the present invention.

FIG. 8 is a block diagram showing a Proximity Meter Service Provider System (PMSPS) having customers, owners, operator locations, legacy financial and communication networks communicating in accordance with the present invention.

FIG. 9 is a block diagram showing a Proximity Pay Phone Service Provider System (PPSPS) having customers, owners, operator locations, legacy financial and communication networks communicating in accordance with the present invention.

FIG. 10 shows a Proximity Toll Service Provider System (PTSPS) having customers, owners, operator locations, legacy financial and communication networks communicating in accordance with the present invention.

FIG. 11 is a block diagram showing a Proximity Vehicle Service Provider System (PVSPS) having customers, owners, operator locations, legacy financial and communication networks communicating in accordance with the present invention.

FIG. 12 is a block diagram showing a Proximity Vending Machine Service Provider System (PVMSPS) having customers, owners, operator locations, legacy financial and communication networks communicating in accordance with the present invention.

FIG. 20 is a table showing a Master Input Output System (MIOS) address matrix for an N Application Program (AP) user SB with V user Master User Interface MUI types.

FIG. 21 is a table showing an example of a MIOS converter engine matrix for an N*V user system.

FIG. 22 is a table showing an example of a MIOS converter browser engine matrix for an N*V user system.

FIG. 22a is a table showing an example of a MIOS Search Engine (SE) matrix for an N*V user system.

FIG. 23 is a MIOS table for a 20 application user system having 5 type relations to generate 100 potential MUI each with (r) CE.

FIG. 24 is a MIOS table for a 20 application user system having 5 type relations to generate 100 potential MUI each with (t) TE.

FIG. 25 is a table for 536 generic master programs with user and sub user categories taken from the Standard Industrial Category (SIC) tables.

DESCRIPTION OF THE INVENTION

Figure 1:
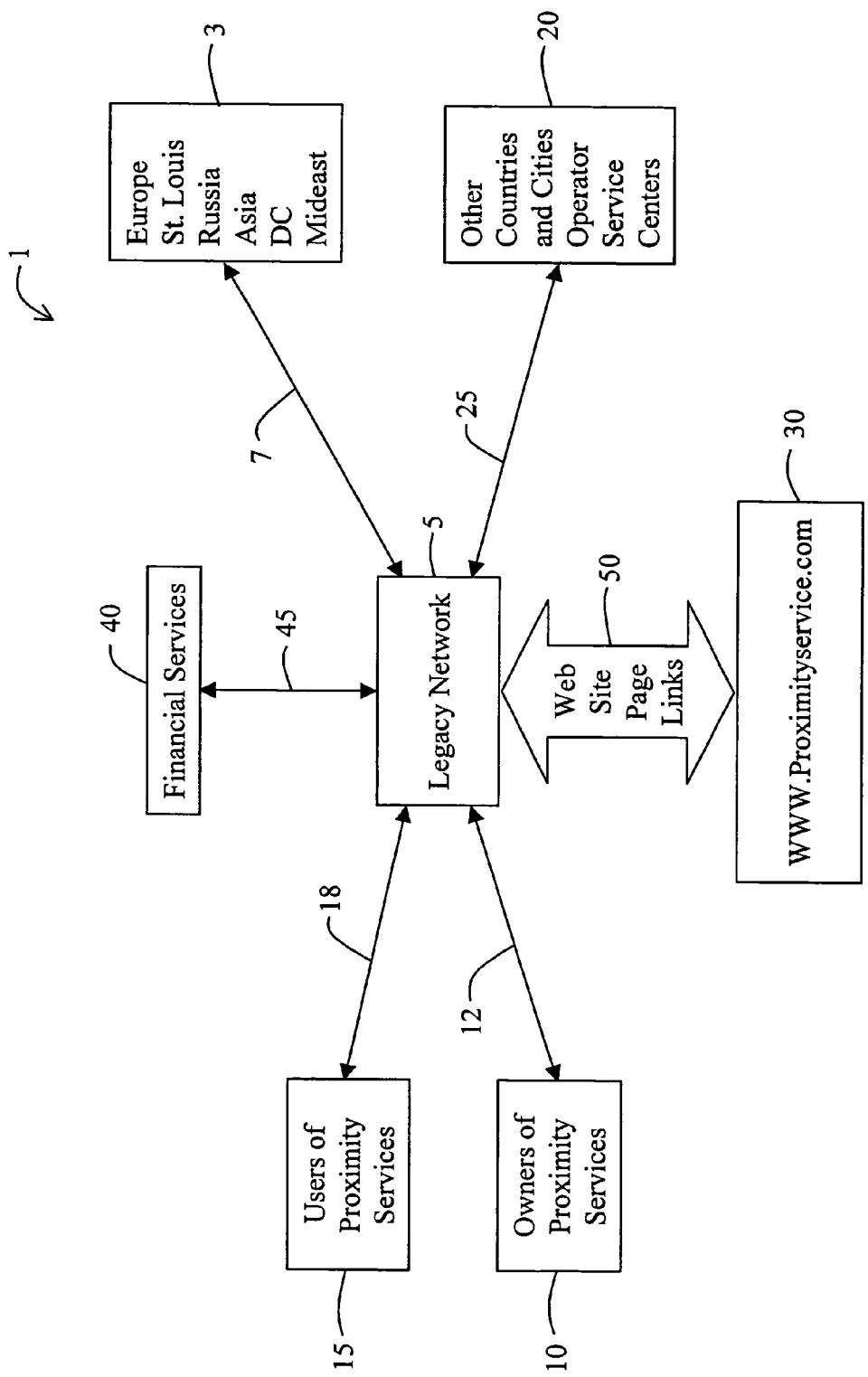
FIG. 1 is a block diagram showing a Proximity Service Provider System (PSPS) having customers, owners, operator locations, legacy financial and communication networks communicating in accordance with the present invention.

Shown in FIG. 1 is a Proximity Service Provider System (PSPS) 1, which is constructed in accordance with the present invention for managing a plurality of Proximity Service Systems 3 of any type located at any world wide location connectable or connected by any suitable communication system to Legacy World Wide Communication Networks 5 as indicated by a communication link 7. Examples of proximity service systems 3 are physical POS stations, ATM's, toll gates, gas pumps, kiosks, pay phones, vending machines and parking meters to name a few. Different geographic locations are labeled in FIG. 1 to show that the proximity service systems 3 can be located in various geographic locations. The legacy world wide communication networks 5 are shown to indicate that Users 15 connected to this same network 5 will have access to a new PSPS web-site 30 via Website Page Links 50 also connected to the network 5. The web-site page links 50 may be on one or several thousand web-sites around the world such as AOL and Yahoo. Likewise, Owners 10 and Operators 20 of the various proximity service systems 3 are connected to 5 via a communication links 12 and 25, respectively, that allow access to the PSPS web-site 30 via one or more of the web-site page links 50. The PSPS web-site 30 is connected to Financial Services 40 and vice versa via the web site page links 50, the communication network 5 and the communication link 45. The users 15, owners 10, operators 20 and financial services 40 can each be provided with a suitable computer system (or web-TV), capable of communicating with the web-site page links 50 and the PSPS web-site 30, as indicated by FIG. 1. Thus, if any of the users 15, owners 10, operators 20 or financial services 40 click on any web-site page link 50 any where around the world they are immediately connected to the PSPS web-site 30 that has the URL of say for example www.proximityservice.com which was an available domain name at the time of this application. The web-site page links 50 and PSPS web-site 30 are described in more detail in connection with FIG. 2. The PSPS web-site 30 can be implemented by a single web-site, or multiple web-sites with suitable firewalls and/or other security measures utilized between each of the various components (as discussed below) of the PSPS web-site 30. For example, each country or separate geographic region might be serviced by a separate server in order to lower the communication costs worldwide and distribute the database.

The communication networks 5 can be a worldwide public network, such as the World Wide Web, or a worldwide private communication network. The worldwide public network is preferred because of the expense of implementing a worldwide private communication network.

The term "communication link", as used herein, refer to any suitable communication link which permits electronic communications, such as extra computer communication systems, intra computer communication systems, internal buses, local area networks, wide area networks, point to point shared and dedicated communications, infra red links, microwave links, telephone links, cable TV links, satellite links, radio links, fiber optic links, cable links and/or any other suitable communication system. It should be understood that each of the communication links are shown and described separately herein for the sole purpose of clearly illustrating the information being communicated between the various components. The communication links may not be separate communication links but may be a single physical communication link.

As will be discussed in more detail below, the PSPS web-site 30 receives for registration information from each of the owners 10, users 15, operators 20 and financial services 40 to carry out the registration, selection, use and collection of the proximity service systems 3 as discussed in detail herein. For example, the PSPS web-site 30 receives for registration information from each of the owners 10 registering particular one or ones of the proximity service systems 3 owned by each particular owner 10. The PSPS web-site 30 also receives for registration information from each of the owners 10 regarding payment and collection methods approved by the particular owner 10.

Once various proximity service systems 3 are registered with the PSPS web-site 30 (as will be discussed in more detail below) the PSPS web-site 30 receives for registration information from each of the users 15 regarding predetermined payment methods and the selection of one or more proximity service systems 3 that the respective users 15 wish to be available for use by the respective users 15.

After one of the users 15 utilizes one of the proximity service systems 3 which has been registered with the PSPS web-site 30, the PSPS web-site 30 receives information (either periodically or in real-time) from the proximity service system 3 utilized by one of the users 15. The information received from the proximity service system 3 may include a location of the proximity service system 3, an amount paid and a date or dates of the received service, for example.

Figure 2:
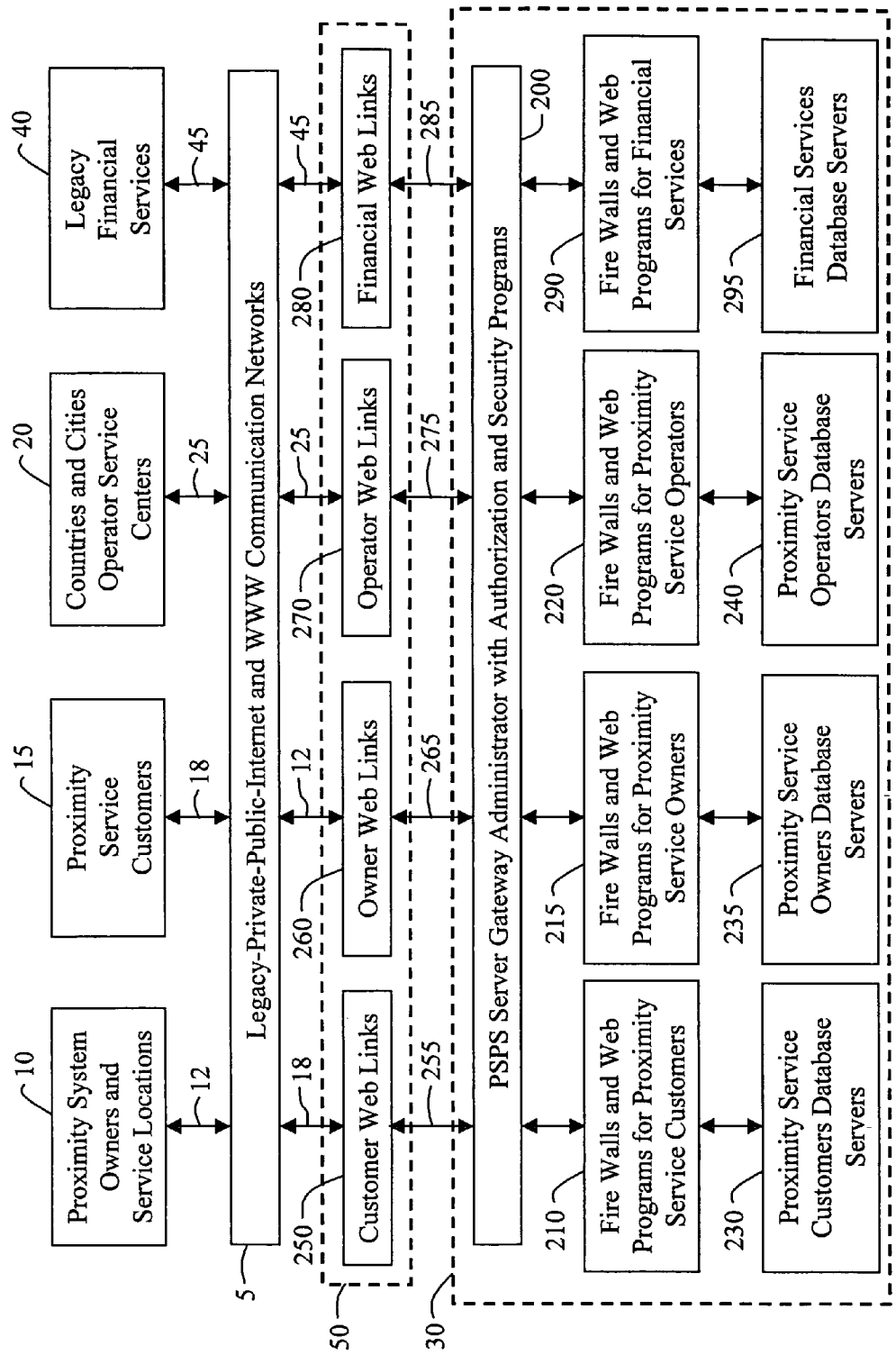
FIG. 2 is a block diagram showing a PSPS interface with customers, owners, locations and financial services.

In FIG. 2 the legacy world wide communication network 5, owners 10, users 15, operators 20 and financial services 40 are shown and the PSPS web-site 30 and web-site page links 50 are shown. The web-site page links 50 of the PSPS web-site 30 show at least four separate hyper links or hot spots: for a Customer Home Page 250; for an Owner Home Page 260; for an Operator Home Page 270; and for a Financial Home Page 280. The actual home page or web-site page links 50 showing these four links is not illustrated because this could take many forms and can be designed by any one skilled in the art of web page design of which people with these type skills number into the hundreds of thousands. Also there might be 100 different PSPS home page designs located on various (maybe as many as 2,000) search engines and home pages such as the financial services home pages around the world.

When the user 15 clicks on the hot spot 250 of the web-site page links 50 while connected to the www service provider 5 via 18, the user is then connected via 18 to the customer home page indicated by the hot spot 250 which is, in turn, connected to a server gateway 200 of the PSPS web-site 30 via a communication link 255. The server gateway 200 has the administrator, authorization and security programs that allow users 15 to be connected to Customer Programs 210 that maintain a Customer Database 230. The server gateway 200 and customer programs 210 and customer database 230 will be discussed in more detail in connection with FIG. 3.

Figure 3:
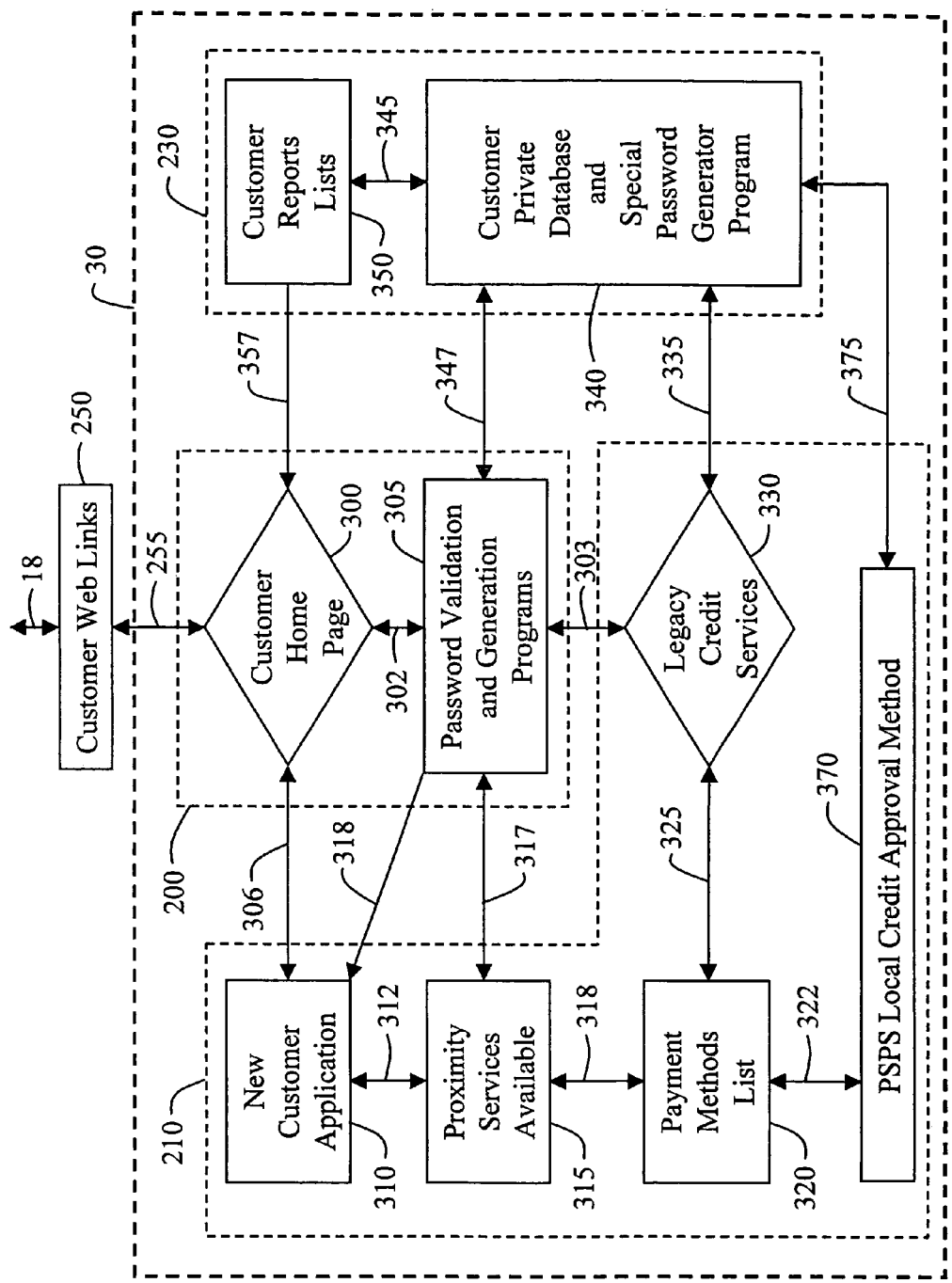
FIG. 3 is a block diagram showing a PSPS communication logic flow diagrams for customer services.

In FIG. 3 the server gateway 200 has a customer home page 300 connected to the user 15 (or customer location) via 255 and 18 as described earlier. The customer home page 300 allows a new customer to sign up for a number of services via paths 306 connected to New Customer Application Programs 310 as part of 210, or an existing customer to enter a password as will be discussed below to modify existing service selections. The new customer application programs 310 in turn is connected via a communication link 312 to Available Proximity Service Data 315 that also lets the customer or user see where the various available services are available (e.g. USA, Europe, Japan, Washington D.C. etc.) and select which one or ones of the proximity service systems 3 the customer 15 wants to obtain services from in the future. Moreover, the available proximity service data 315 can be categorized by type of proximity service system 3, i.e. vending machine types, toll tag type etc., or geographic region. In addition the customer is connected to Service Payment Choices 320 via a communication link 318 that in turn is connected to either Legacy Credit Service Programs 330 via a communication link 325 and/or they choose a PSPS Local Credit Approval Method 370 via a communication link 322. Legacy Credit Service Programs 330 are connected via a communication link 303 to a Password Validation And Generation Programs Unit 305. The legacy credit service programs 330 request credit check or approval for the customer 15 via Financial Home Page 280 of server gateway 200 and will be described in more detail in connection with FIG. 6.

Approval is either granted or denied depending upon what the customers application and payment request data and what is allowed by the financial service selected. When the request is denied the customer is notified to make different selections or to quit the new application process. When the customer is approved for legacy credit, the legacy credit service unit 330 notifies the password validation and generation programs unit 305 via communication link 303 to generate a site pass word for the customer 15 and provides the pass word via communication link 318 to the new customer application programs unit 310 connected to the user 15 or customer site via communication links 306,255 and 18. In addition, a Customer Private Database 340 is developed in the customer database unit 230 and partitioned from other customer databases as indicated via a communication link 335 and the access code information to the customer database 340 is provided by the password validation and generation programs unit 305 via a communication link 347. When one of the users 15 with a site password visits the PSPS 30 customer home page 300 they can enter the pass word via a communication link 302 and access is granted by the password validation and generation programs unit 305 if the password is valid. Once access is granted to the customer 15, the customer 15 can access any one or more of the available proximity service data 315, the service payment choices 320, the legacy credit service programs 330 and make changes in the services or payment methods previously approved. In addition the customer 15 can request reports from an available reports list 350 via communication link 347 and the reports are delivered from the customers 15 private database 340 via a communication link 345 and 357.

When a customer selects the PSPS local credit approval method 370 rather than the legacy credit service programs 330 described above (where the payment is guaranteed and approved by a credit card company, for example, each time the service is requested) in which the PSPS web-site 30 owner guarantees payment to the owner 10 of the proximity service systems 3 for a service approved locally at the owner 10 proximity service system 3 (e.g. a vending machine or parking meter) the customer 15 is given a special cyber card code generated by the customer private database unit 340 using one of the many standard RSA algorithms available, for example, and provided back to the customer 15 via communication links 375, 322, 318, 312, 306, 255, and 18.

Embedded into and made a part of each customer cyber card code can be a service provider identification number (SPIN). The SPIN is unique and may be valid for a predetermined time period. The SPIN will be stored at each owner 10 proximity service location (proximity service system 3) selected for service by the customer 15 as described in more detail in connection with FIG. 4 and is used to approve or disapprove credit locally. Thus after selecting and being approved for the PSPS local credit approval method 370, the customer 15 can receive local proximity services at those owner 10 locations (proximity service systems 3) where the method for entering the special cyber card code is accepted.

As discussed earlier, the preferred method for housing and delivering the cyber card code to the proximity service system 3 is a wireless master proximity activation service system (Master PASS) device or the user's cell phone configured and operated in the manner disclosed in the applicants co-pending patent application entitled "Advanced Wireless Phone System" (AWPS), which is expressly incorporated herein by reference. These preferred wireless devices can store all of a persons credit cards, PIN numbers and/or other codes which may be required to the activate one or more of the proximity service systems 3. It should be noted that each of the proximity service systems 3 can be constructed in a manner disclosed in applicants co-pending patent application entitled "communication and proximity authorization systems" which has been expressly incorporated herein by reference so as to receive and decode signals to activate any one or more of the proximity service systems 3 to provide the specified service. For example, one of the proximity service systems 3 can be a vending machine adapted to dispense candy. Upon receipt of an activation signal (such as a signal containing the cyber card code or a legacy credit card code from the wireless device carried by the customer) and the selection of a candy, the vending machine attempts to obtain authorization for the specified service (as discussed herein) and then provides the specified service of dispensing the selected candy for the customer once authorization is obtained.

The local authorization is approved at the owners 10 proximity service system 3 when a special password generator located in the proximity service system 3 similar or the same as the one in the customer private database unit 340 of FIG. 3 generates the same SPIN number when used in the computation of the valid monthly password provided to each owner as described in more detail in connection with FIG. 4.

For example, this process can be very similar as that done in the public key private key security systems used extensively in the bank money authorization systems today. In the PSPS preferred embodiment all of the owners of the proximity service systems 3 are given the public key and they are changed periodically, such as each month for security reasons. This change in turn, forces the customers to log back on to the web-site 30 periodically, such as each month (or when they have lost their device having the cyber card code stored thereon, etc.) to get a new password (that can be the private key, for example) that will generate a valid SPIN when used at approved proximity service systems 3. When the customer 15 is approved locally (by a process such as the one described above) or any other means agreed to between the owners 10 and web-site 30 owners that guarantee the payment, the amount of the transaction is computed (for example if the service is for parking the amount may be $3.00 an hour). The amount of the approved service along with the customer 15 cyber card number or code is stored in a local transaction data base associated with the proximity service system 3 where the service was delivered to the customer 15. This data base can be delivered at predetermined intervals discussed in more detail in connection with FIG. 4 to the web-site 30 in an agreed to manner. For example, this polling can be accomplished in a manner similar to the manner in which many cable service systems are polled by the owners operating company (such as harvest does for Coca Cola on the company machines to deliver inventory and maintenance data). At the PSPS web-site 30 owners (FIG. 4) or operators (FIG. 5) home sites, the credit and/or cyber card codes for each transaction is again deciphered and validated, sorted and sent to the customer private data base 340 for collection from the customer 15 who provided the cyber card code or credit card number to the proximity service system 3 and thereby received the service therefrom. The specified credit account and money is then deposited to the owners bank account as described in more detail in connection with FIG. 4. The data is also accumulated and available on predetermined customer reports 350 available to the customer 15 via communication link 357.

The above description is in regards to how the special local authorization credit approval 370 may work in terms of using the special cyber card code by the customer 15 for a service and the owner 10 eventually gets paid and the web-site owner 30 collects from the customer 15 and provides the customer 15 a report listing all the charges, locations and service dates for example. The service reports provided in the available reports list 350 also provide customer 15 transaction data for the legacy credit card approvals for proximity services that are routed through the PSPS web-site 30 as described earlier and such payments are also deposited into the owners account as described in more detail in connection with FIG. 4.

Figure 4:
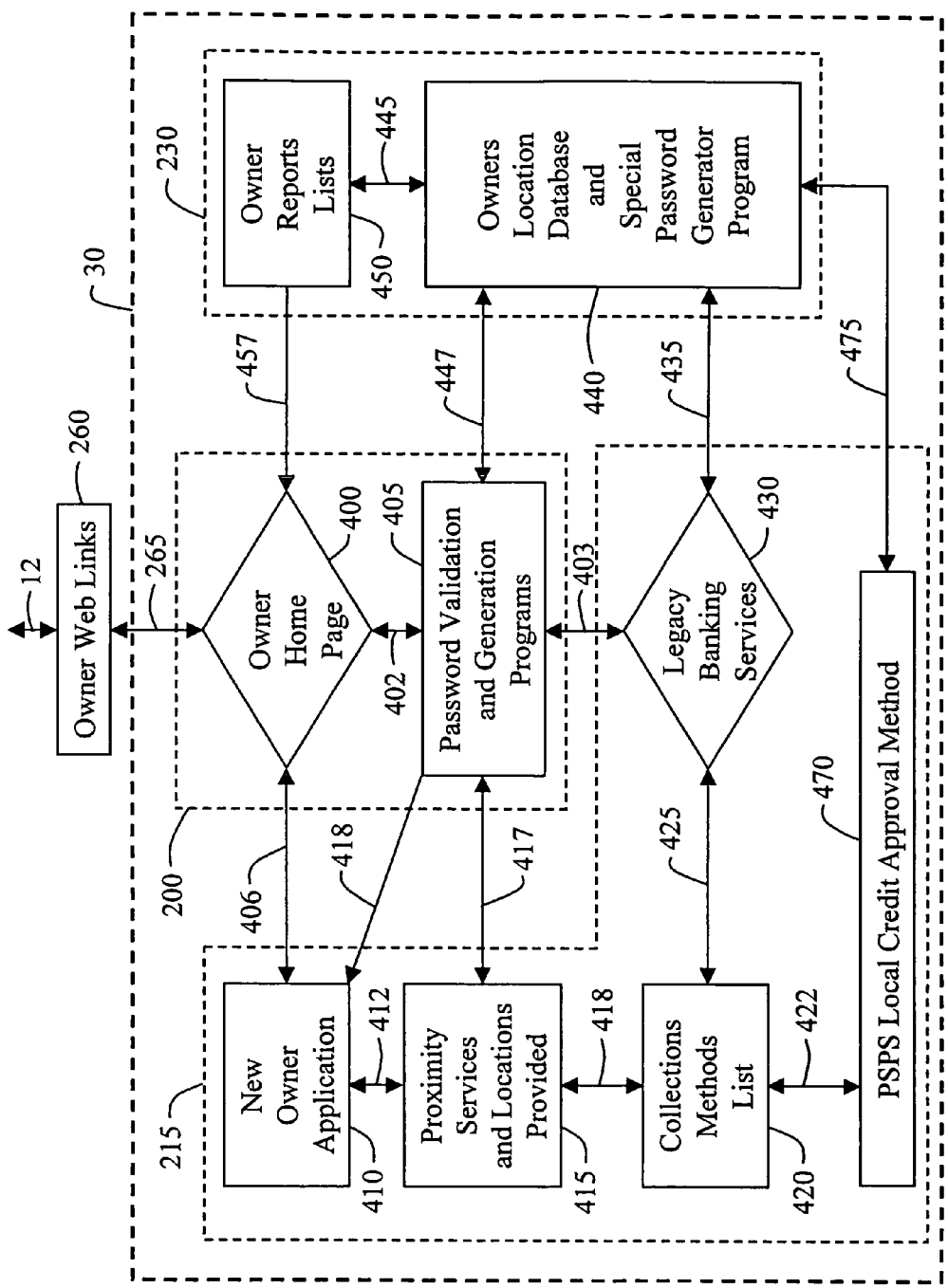
FIG. 4 is a block diagram showing a PSPS communication logic flow diagrams for owner services.

In FIG. 4 the server gateway 200 has an Owner Home Page 400 connected to the owner 10 via a communication link 265 and 12 as described earlier. The owner 10 home page 400 allows a new proximity owner 10 to sign up for services via a communication link 406 connected to New Owner 10 Application Programs 410 as part of Firewalls and Web Programs 215 for Proximity Service Owners 10. The application programs 410 in turn is connected via a communication link 412 to Proximity Services To Be Provided Data 415 that also lets the owner 10 list the owner's proximity service systems 3 and/or available service location sites (e.g. USA, Europe, Japan etc.) along with the methods the owner will permit proximity transactions to be approved and data to be collected (legacy or local). In addition the owner 10 is connected to Service Payment Choices 420 via a communication link 418 that in turn is connected to either Legacy Bank Service Programs 430 via a communication link 425 or a PSPS Local Credit Approval Method 470 via a communication link 422 that is eventually connected to 430 via a communication link 435 from an Owner's 10 Private Database and Special Password Generator Program 440 activated by a communication link 475. The legacy credit bank programs 430 are connected via a communication link 403 and Password Validation and Generation Programs 405 to the bank account selected by the owner 10 via home page 280 of 200 and will be described in more detail in connection with FIG. 6.

Approval of services is either granted or denied by the PSPS web-site 30 owner depending upon how the owners 10 proximity services, locations, collection and payment requirements fit the PSPS web-site 30 owner predetermined criteria. When the request is denied, the owner 10 is notified to make different selections or to quit the new application process. When the owner 10 is approved for providing proximity services, the legacy banking unit 430 notifies the password validation and generation programs unit 405 via communication link 403 to generate a site pass word for the owner 10 and provides the pass word via communication link 418 to the application programs unit 410 connected to the owners 10 terminal via communication links 406, 265 and 12. In addition, an owner private database 440 is developed in Proximity Service Owners 10 Database Servers 235 and partitioned from other owner databases (as indicated by communication link 435) and the access code information to this database is provided by the password validation and generation programs unit 405 via a communication link 447.

When the owner 10 with a site password visits the PSPS 30 owner home page 400 they can enter the pass word via a communication link 402 and access is granted by unit 405 if the password is valid. Once access is granted, the owner 10 can access any of the services 415, 420, 430 and 470 and make changes in the services available or collection methods previously approved. In addition the owner 10 can request reports from an available reports list 450 via communication link 447 and they are delivered from the owners 10 private database 440 via communication link 445 and 457.

When the owner 10 approves the PSPS local payment service 470 rather than or in addition to the legacy service 430 described above (where the payment is guaranteed and approved by a credit card company or other third party each time the service is requested) in which the PSPS web-site 30 owner guarantees payment to the owner 10 for a service approved locally at the owner 10 proximity service location (e.g. a vending machine or parking meter) the owner 10 is given a special cyber card number or code generated by unit 440 and provided back to the owner 10 via communication links 475, 422, 418, 412, 406, 265, and 12.

This special cyber card code will generate a unique service provider identification number (SPIN) at each owner 10 proximity service location selected for service by the customer 15 as described in more detail in connection with FIG. 3 above. Thus after selecting and being approved for the PSPS local payment method 470 the owner 10 can have local authorization services provided at those proximity service systems 3 or locations where the method for entering the customer's special cyber card code is accepted. As discussed earlier, the preferred method for housing and delivering the cyber card code is a wireless master proximity activation service system (Master PASS) device or the persons cell phone operating in the Master PASS mode disclosed in an advanced wireless phone system (AWPS) of which both are disclosed in co-pending applications as discussed above. These preferred wireless devices can store all of a persons credit cards, PIN numbers and be made to deliver the required cyber card code to the proximity service system 3. The local authorization is approved at the owners 10 proximity service system 3 as discussed above.

The authorization process can be similar to that done in the public key private key security systems used extensively in the bank money authorization systems today. In the PSPS web-site 30 preferred embodiment the owners 10 are given the public key and they are changed each month for security reasons. This change in turn, forces the customers to log back on to the PSPS web-site 30 each month (or when they have lost their card carrier etc.) to get a new password that will generate a valid SPIN when used at approved proximity service systems 3. When the customer 15 is approved locally (by a process such as the one described above) or any other means agreed to between the respective owners 10 and PSPS web-site 30 owners that guarantee the payment, the amount of the transaction is computed (for example if the service is for parking the amount may be $3.00 an hour). The amount of the approved service along with the customer 15 cyber card code is stored in the local transaction data base associated with the proximity service system 3 where the service was delivered to the customer 15. This data base can be delivered at predetermined intervals to the PSPS web-site 30 in an agreed to manner such as done with many cable service systems on a polled basis by the owners operating company (such as harvest does for Coca Cola on the company machines to deliver inventory and maintenance data). The operators 20 discussed in more detail in connection with FIG. 5 may connect the individual machines, i.e. the proximity service systems 3, to an Intranet or the Internet directly to make transaction collections very easy.

At the owners home page 400 (FIG. 4), the credit and cyber card codes for each transaction is deciphered and sorted in unit 440 using the same algorithms used to generate all of the customer 15 cyber cards. The cyber card codes entered into the proximity service systems 3 can be batched in the proximity service systems 3 and then periodically transferred to the PSPS web-site 30 and entered into the owners location database 400. The information associated with the legacy codes, i.e. transaction data in which the PSPS web-site 30 does not guarantee payment, is preferably transmitted to PSPS web-site 30 in real time and entered into the owners location database 400 in real time. The PSPS web-site 30 may be programmed such that the legacy codes are periodically transferred to the PSPS web-site 30 and entered into the owners location database 400, if the entity that is guaranteeing payment to the owner wishes to conduct business in this way.

The collected money is sent to the owners bank account via communication link 435 and the owner 10 transaction data for each site along with any inventory or maintenance data is stored in the owner 10 private data base 440. The customer 15 data is sent to the customers 15 home page through the fire walls using SSL for example in the server 200 administration. The data is also accumulated and available on predetermined owner 10 reports 450 available to the owner 10 via communication link 457.

Figure 5:
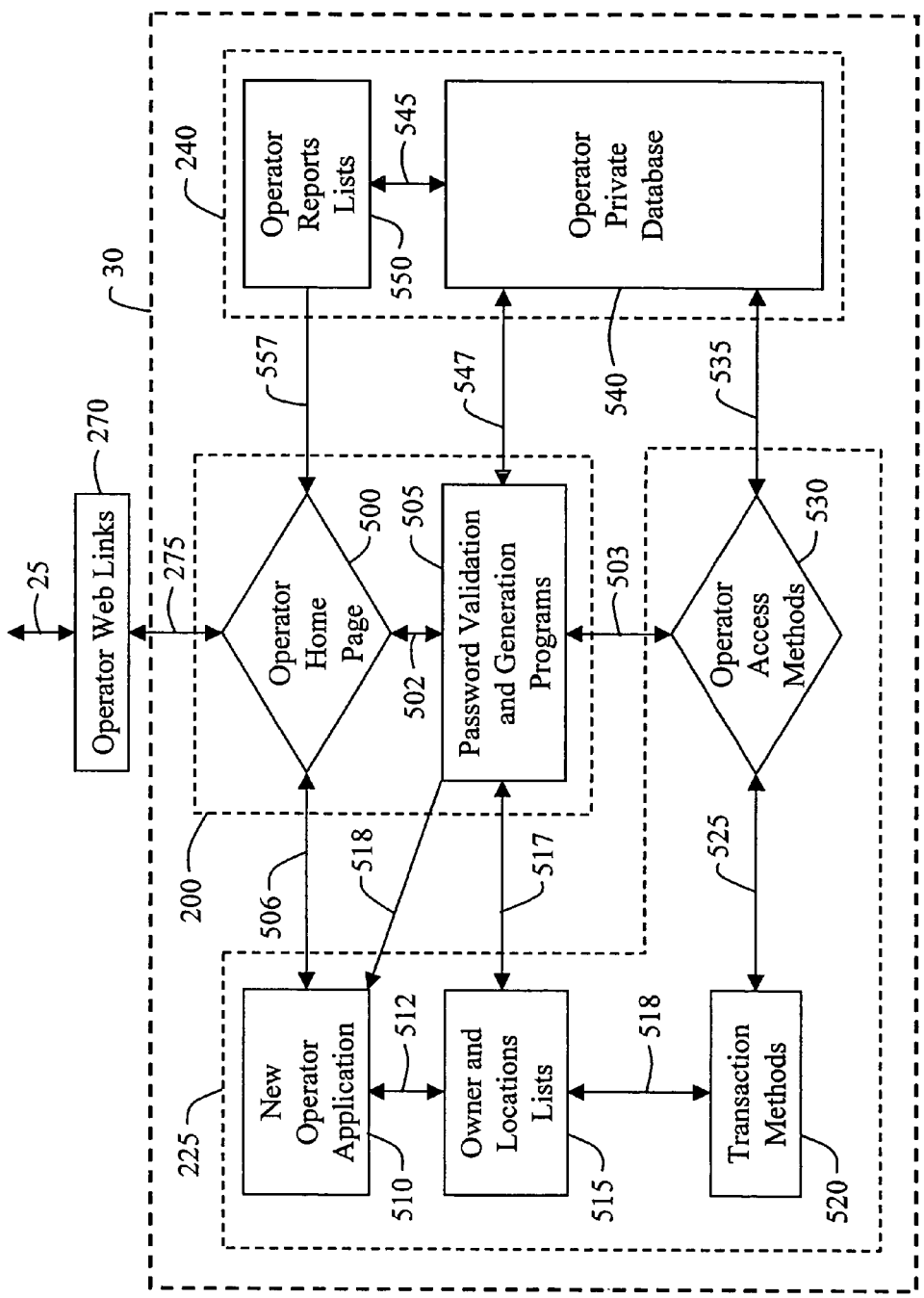
FIG. 5 is a block diagram showing a PSPS communication logic flow diagrams for operator services.

In FIG. 5 the server gateway 200 has a proximity system operator 20 home page 500 connected to the computer system utilized by the operator 20 via communication links 275 and 25 as described earlier. The operator 20 home page 500 allows a new proximity operator 20 to sign up to provide services for owners 10 via a communication link 506 connected to New Operator 20 Application Programs 510 as part of Firewalls and Web Programs for Proximity Service Operators 220. The application programs 510 in turn are connected via a communication link 512 to a Proximity Owner 10 Locations To Be Operated Data List 515 that list the owner 10 service location sites.mb (e.g. USA, Europe, Japan etc.). In addition the operator 20 is connected to an Accepted Transaction Choices 520 via a communication link 518 that in turn is connected to Access Programs 530 via a communication link 525. The access programs 530 are connected via a communication link 503 and a Password Validation and Generation Program 505 to the owner 10 home page 270 of 200 and will require one or more passwords given to the operator 20 by the owner 10 that owns the proximity systems being operated by the operator 20. In other words, the owner 10 controls access to the information associated with the owner's proximity service systems 3 and only allows operators 20 access via passwords the owner controls. When the operator 20 is approved for providing proximity services for an owner 10, unit 530 notifies unit 505 via communication link 503 to generate a site pass word for the operator 20 and provides the pass word via communication link 518 to unit 510 connected to the operators 20 terminal via communication links 506, 275 and 25. In addition, an Operator Private Database 540 is developed in Proximity Services Operator's Database Servers 240 and partitioned from other operator databases (as indicated by a communication link 535) and the access code information to this database is provided by unit 505 via a communication link 547. When an operator 20 with a site password visits the PSPS 30 operator home page 500 they can enter the pass word via a communication link 502 and access is granted by unit 505 if the password is valid. Once access is granted to an operator 20 they can access any of the services 515, 520, 530 and make changes in the services available or collection methods previously approved. In addition the operator 20 can request reports from an Available Operator Reports List 550 via communication link 547 and they are delivered from the operators 20 private database 540 via communication links 545 and 557. The operators 20 will normally focus on providing all proximity services for an owner 10 in a region, state or country for example and thus and an owner 10 may give out passwords to several operators 20 for different geographic regions and likewise an operator 20 may service many different proximity owners 10 in a same region. For example, an operator 20 may service toll systems for the regional tolling authority 10 and parking meters for the cities 10 in the region and parking lots for several more private owners 10 in the same region. Thus the main function of the operator 20 home page programs 500 are to manage regional data bases for multiple owners and combine these individual data bases 540 managed by proximity system operators 20 into the complete owner 10 data base 440 discussed in connection with FIG. 4. This would be similar to the owner of a franchise letting the individual franchisees report their store data into a central location where it is combined into demographics for the complete set of operating stores. In this case the complete set of data is maintained in the 440 data base and the individual pieces are reported into the 540 data base. Of course if one of the owners 10 managed all of their own proximity systems there would be no need to sign up one of the operators 20 except possibly to advertise that the owner 10 was looking to find an operator 20 or the owner 10 operated some systems as an operator 20 for other owners 10.

Figure 6:
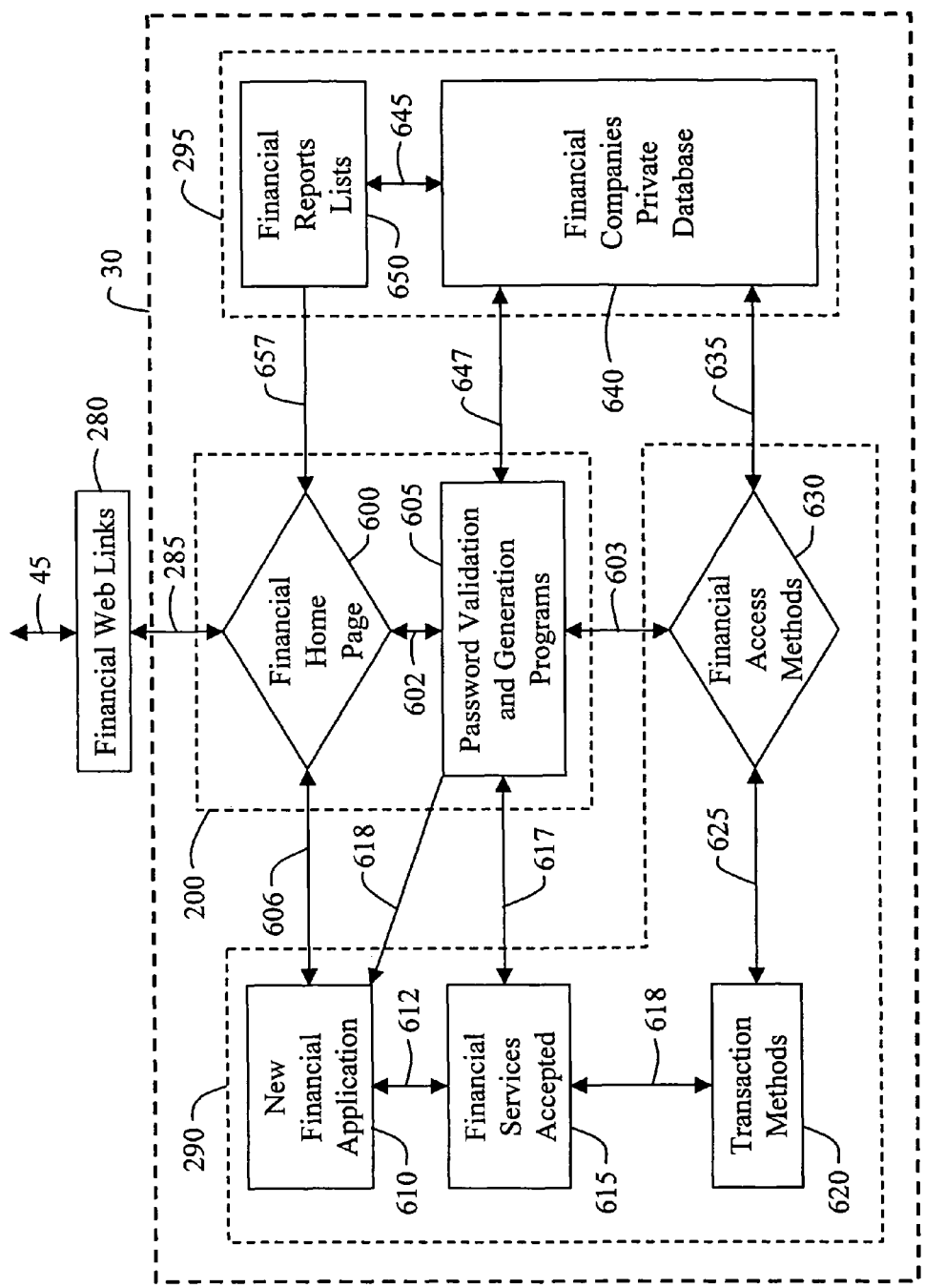
FIG. 6 is a block diagram showing a PSPS communication logic flow diagrams for financial services.

In FIG. 6 the server gateway 200 has a Financial Services (FS) 40 Home Page 600 connected to the financial service location via 280 and 45 as described earlier. The FS 40 home page 600 allows a new FS 40 to sign up to provide financial services for customers 15, owners 10 and operators 20 via a communication link 606 connected to a new FS 40 Application Programs 610 as part of Firewalls and Web Programs for Financial Services 290. The application programs 610 in turn are connected via a communication link 612 to a PSPS Services Accepted List 615 for the customers 15, owners 10 and operators 20 requiring financial services.

Financial Transaction Method Choices 620 via a communication link 618 are designated and each method is connected to Access Programs 630 via a communication link 625. The access programs 630 are connected via a communication link 603 and Password Validation and Generation Programs 605 to the owner 10 home page 260 of 200, the customer 15 home page 250 of 200 and the operators 20 home page 270 of 200. Connection to the financial programs in each of the other entities, sites will require one or more passwords. When the financial service company 40 is approved for providing services for one of the entities, unit 630 notifies unit 605 via communication link 603 to generate a site pass word for the financial service company 40 and provides the pass word via communication link 618 to unit 610 connected to the financial service company 40 terminal via communication links 606,285 and 45. In addition, a FS database 640 is developed in Financial Service Database Services 295 and partitioned from other FS 40 databases (as indicated by a communication link 635) and the access code information to this database is provided by unit 605 via a communication link 647. When a FS 40 company with a site password visits the PSPS 30 FS 40 home page 600 they can enter the pass word via a communication link 602 and access is granted by unit 605 if the password is valid.

Once access is granted to the FS 40, the FS company 40 can access any of the services 615, 620, 630 and make changes in the services available or credit methods previously approved. In addition the FS 40 company can request reports from an available Financial Reports List 650 via communication link 647 and they are delivered from the FS 40 private database 640 via communication links 645 and 657.

FIGS. 7-12 depict more specific categories of customers 15, owners 10, and operators 20 that might want services more tailored to their needs. The operational description process of FIGS. 7-12 is the same as that identified for FIG. 1, except that the systems shown in FIGS. 7-12 each include a different category of proximity service systems 3 working in conjunction with various different categories of customers 15, owners 10, operators 20, and financial services 40. By way of example each of the systems shown in FIGS. 7-12 may be linked to the more general all inclusive proximity services PSPS web-site 30, which may be identified by the URL www.proximityservices.com, for example. Similar elements will be designated in FIGS. 7-12 with the same numeric prefix, and a different alphabetic suffix for purposes of clarity.

Figure 7:
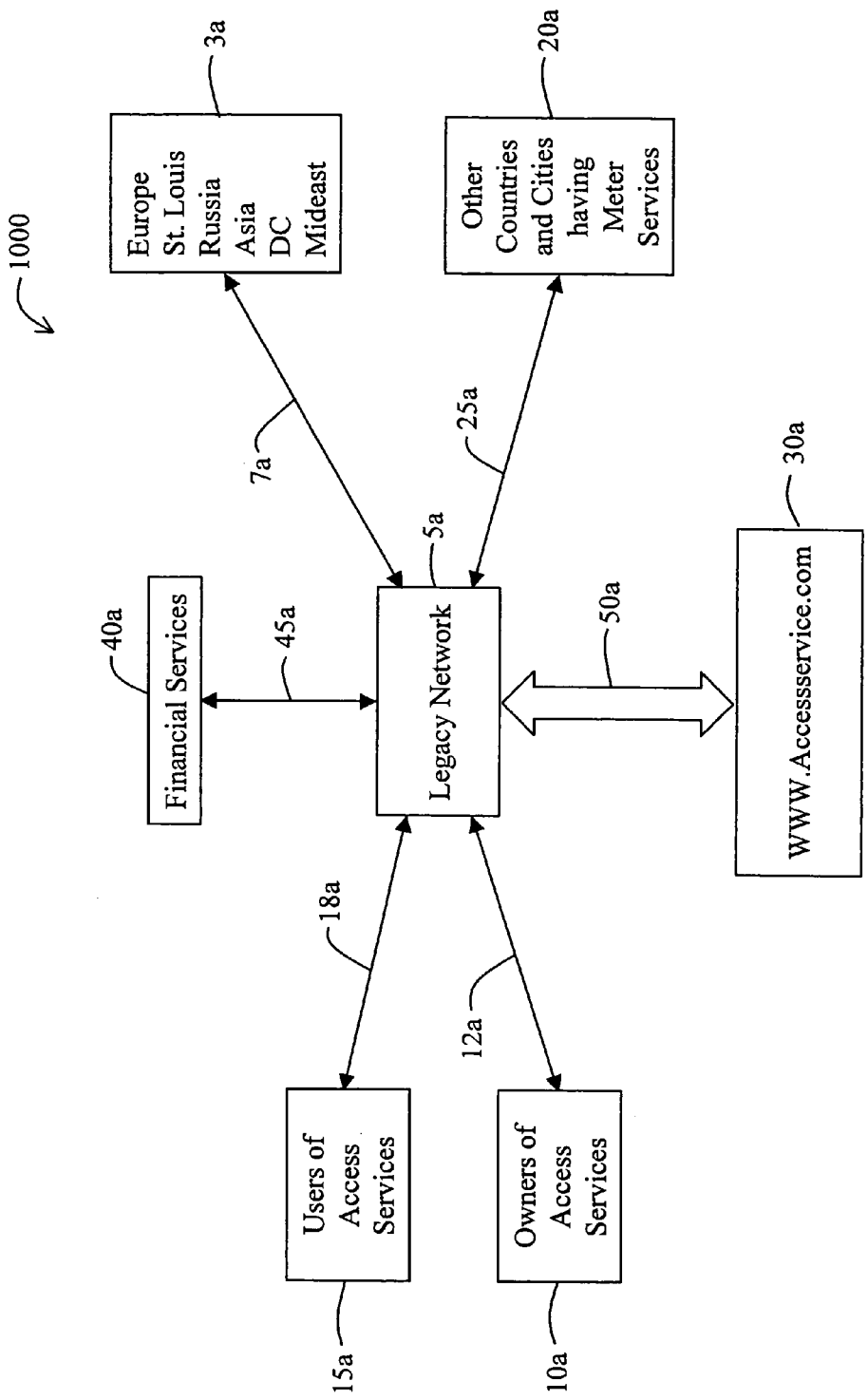
FIGS. 7-12, described briefly below, are block diagrams showing various examples of the Proximity Service Provider System (PSPS) depicted in FIG. 1 wherein each of FIGS. 7-12 shows in particular a different type of proximity service system.

FIG. 7 shows a world wide proximity access service provider system (PASPS) 1000 for use by owners 10*a* of proximity service systems 3*a*, such as parking lots, airports, subways, and buses that have real need for local access requirements from customers 15*a* using wireless or card devices is shown. The operational description process of FIG. 7 for customers 15*a*, owners 10*a*, operators 20*a* and financial services 40*a* is the same as that used in connection with FIG. 1. Consequently an access services web-site 30*a* identified by the URL www.accessservices.com, for example, is depicted in FIG. 7 to show the more specific categories of customers, owners, and operators that might want services more tailored to their needs. By way of example the access services web-site 30*a* might be linked to the more general all inclusive PSPS web-site 30.

Figure 8:
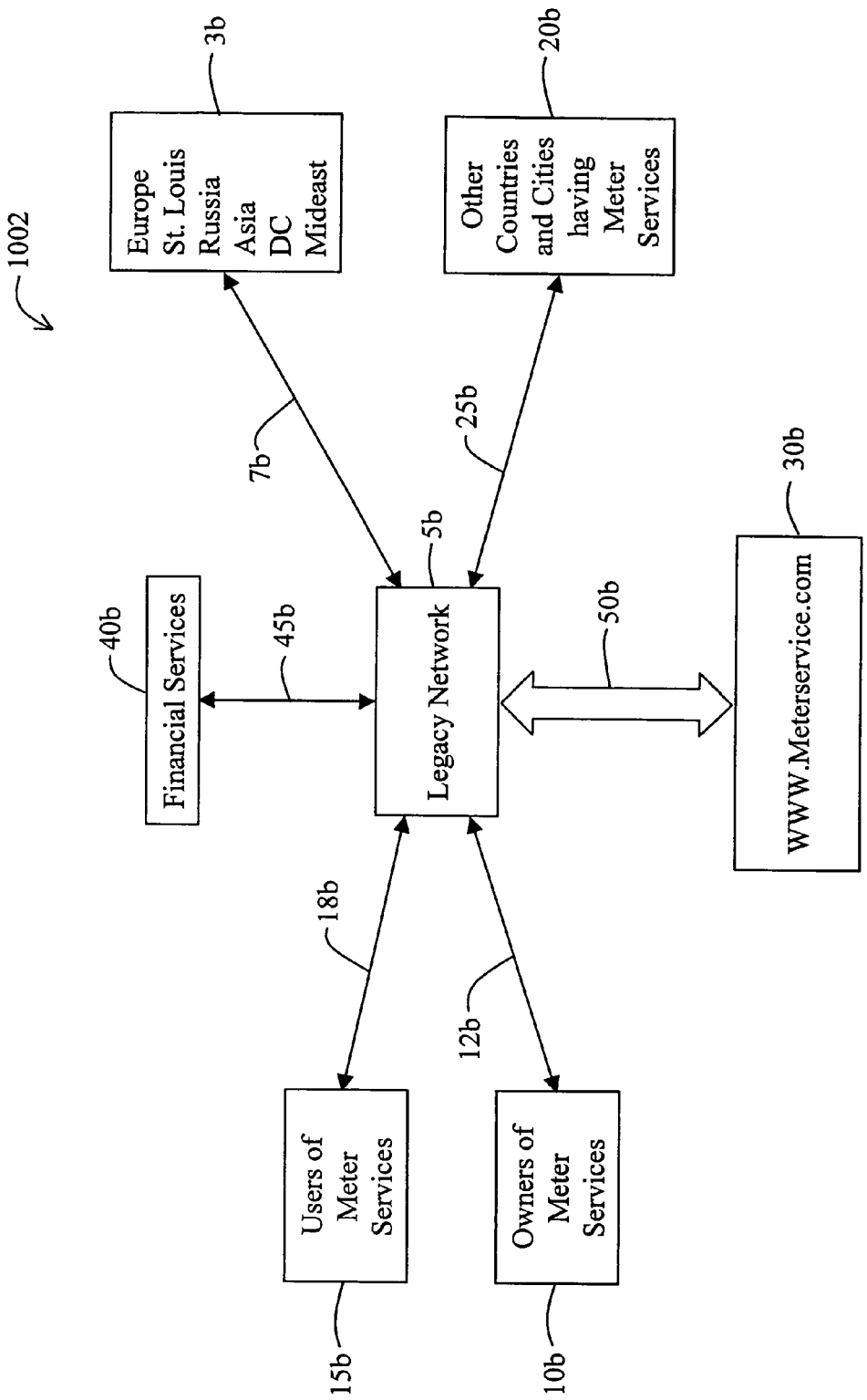

FIG. 8 shows a world wide proximity meter service provider system (PMSPS) 1002 for use by owners 10*b*, such as cities, of proximity service systems 3*b*, such as parking meters, that have a real need for local access requirements from customers 15*b* using wireless or card devices is shown. The operational description process of FIG. 8 for customers 15*b*, owners 10*b*, operators 20*b* and financial services 40*b* is the same as that used in connection with FIG. 1. Consequently a web-site 30*b* identified by the URL www.meterservices.com, for example, is depicted in FIG. 8 to show the more specific categories of customers, owners, and operators that might want services more tailored to their needs. By way of example the web-site 30*b* might be linked to the more general all inclusive PSPS web-site 30.

Figure 9:
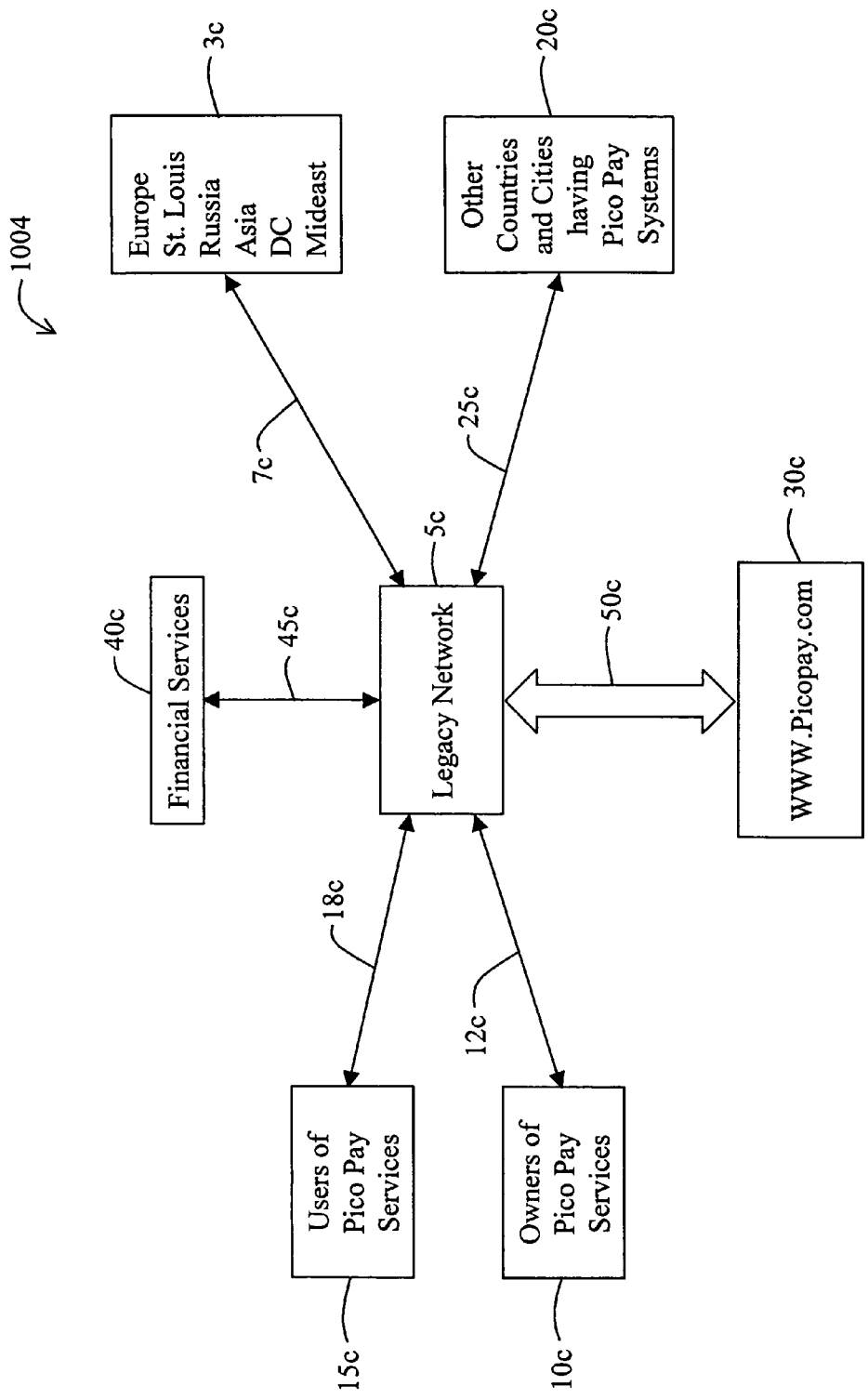

FIG. 9 shows a world wide proximity pay phone service provider system (PPSPS) 1004 for use by owners 10*c*, such as telephone companies, of proximity service systems 3*c*, such as pay phones, that have a real need for local access requirements from customers 15*c* using wireless or card devices is shown. The operational description process of FIG. 9 for customers 15*c*, owners 10*c*, operators 20*c* and financial services 40*c* is the same as that used in connection with FIG. 1. Consequently a web-site 30*c* identified by the URL www.picopay.com, for example, is depicted in FIG. 9 to show the more specific categories of customers, owners, and operators that might want services more tailored to their needs. By way of example, the web-site 30*c* might be linked to the more general all inclusive PSPS web-site 30.

Figure 10:
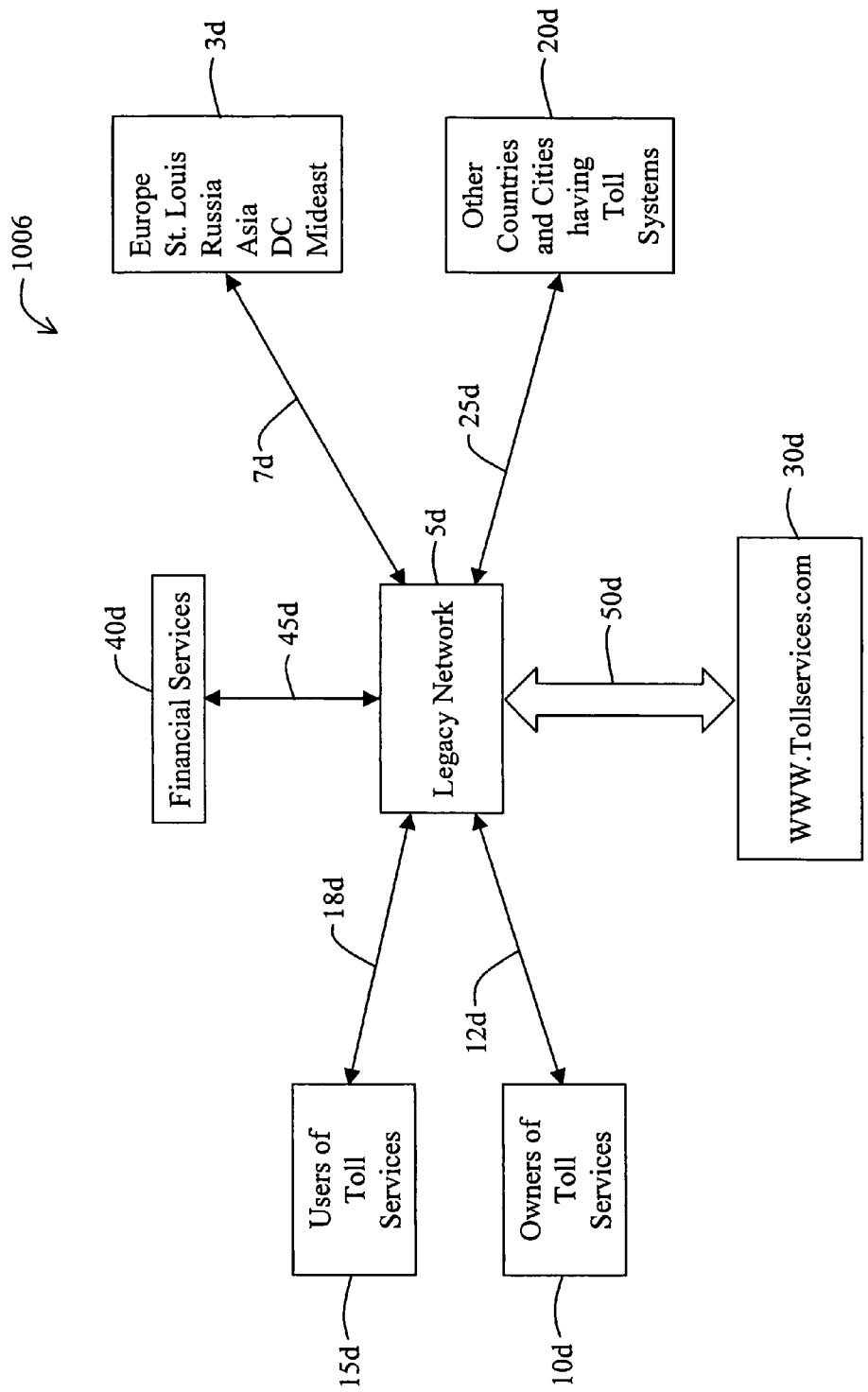

FIG. 10 shows a proximity toll service provider system (PTSPS) 1006 which is similar in construction and function as the Proximity Service Provider System 1 discussed above with reference to FIGS. 1-6, except that users of proximity services 15 have been shown as users of toll services 15*d*, and the PSPS web-site 30 has been shown as a web-site 30*d* identified by the URL www.tollservices.com, for example. Thus, a link is provided between the users of toll services 15*d* and the web-site 30*d* for those customers or users to select proximity services to make it more convenient to drive through any toll gate any place in the world and for owners and operators of proximity service systems 3*d*, such as toll gates, to authorize the proximity service systems 3*d* for selection by the customers or users.

Figure 11:
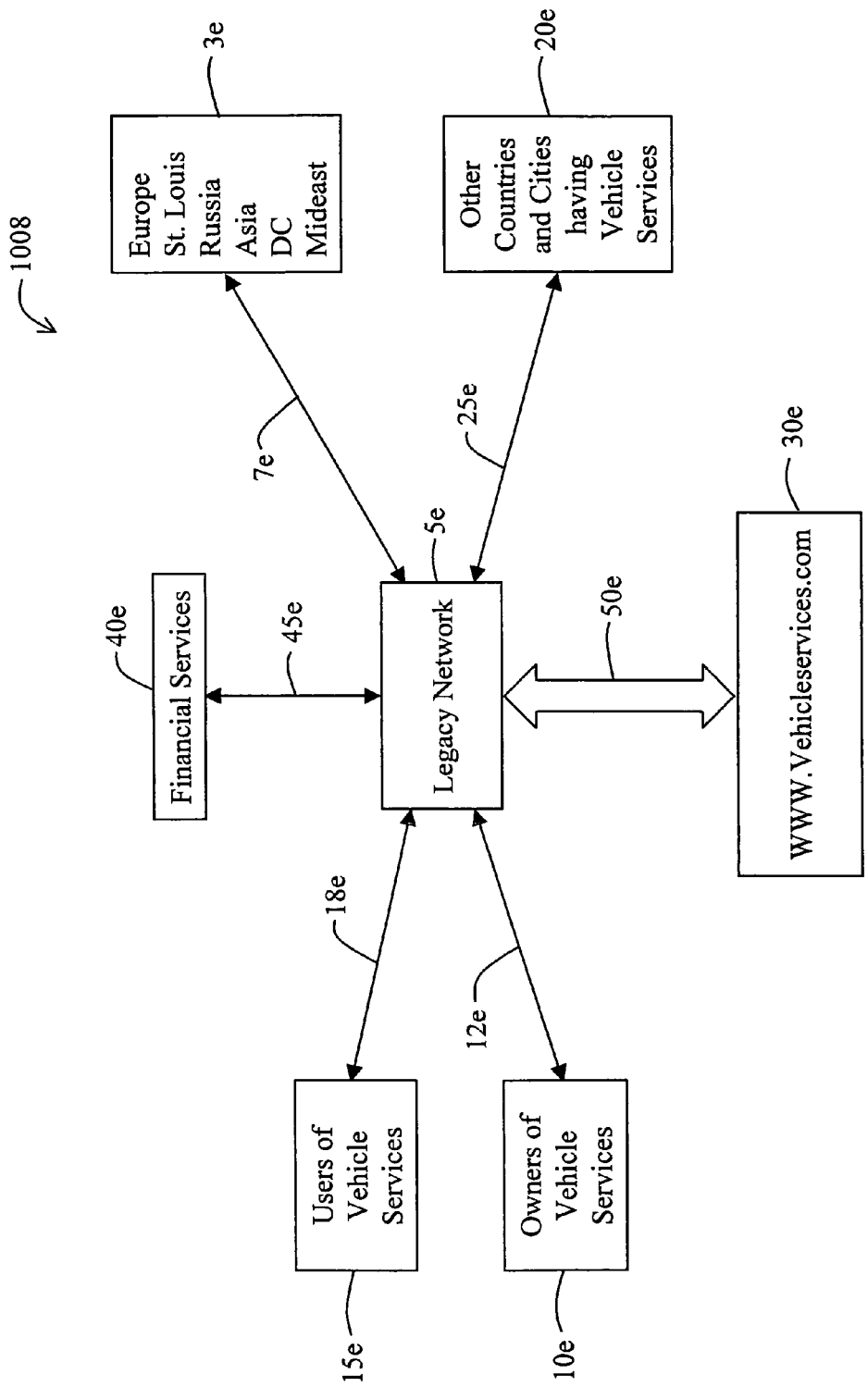

FIG. 11 shows a proximity vehicle service provider system (PVSPS) 1008 which is similar in construction and function as the Proximity Service Provider System 1 discussed above with reference to FIGS. 1-6, except that users of proximity services 15 have been shown as users of vehicle services 15*e*, and the PSPS web-site 30 has been shown as a web-site 30e identified by the URL www.vehicleservices.com, for example. Thus, a link is provided between the users of vehicle services 15e and the web-site 30e for those customers or users to select proximity services for those customers that want to be able to have vehicle services any place in the world and for owners and operators of vehicle services that want to make it more convenient for their customers such as a car rental customers to be able to select and thereafter utilize all of the proximity service systems 3, such as the access, toll, parking lot, and parking meters authorized by the owner of the vehicle services.

Figure 12:
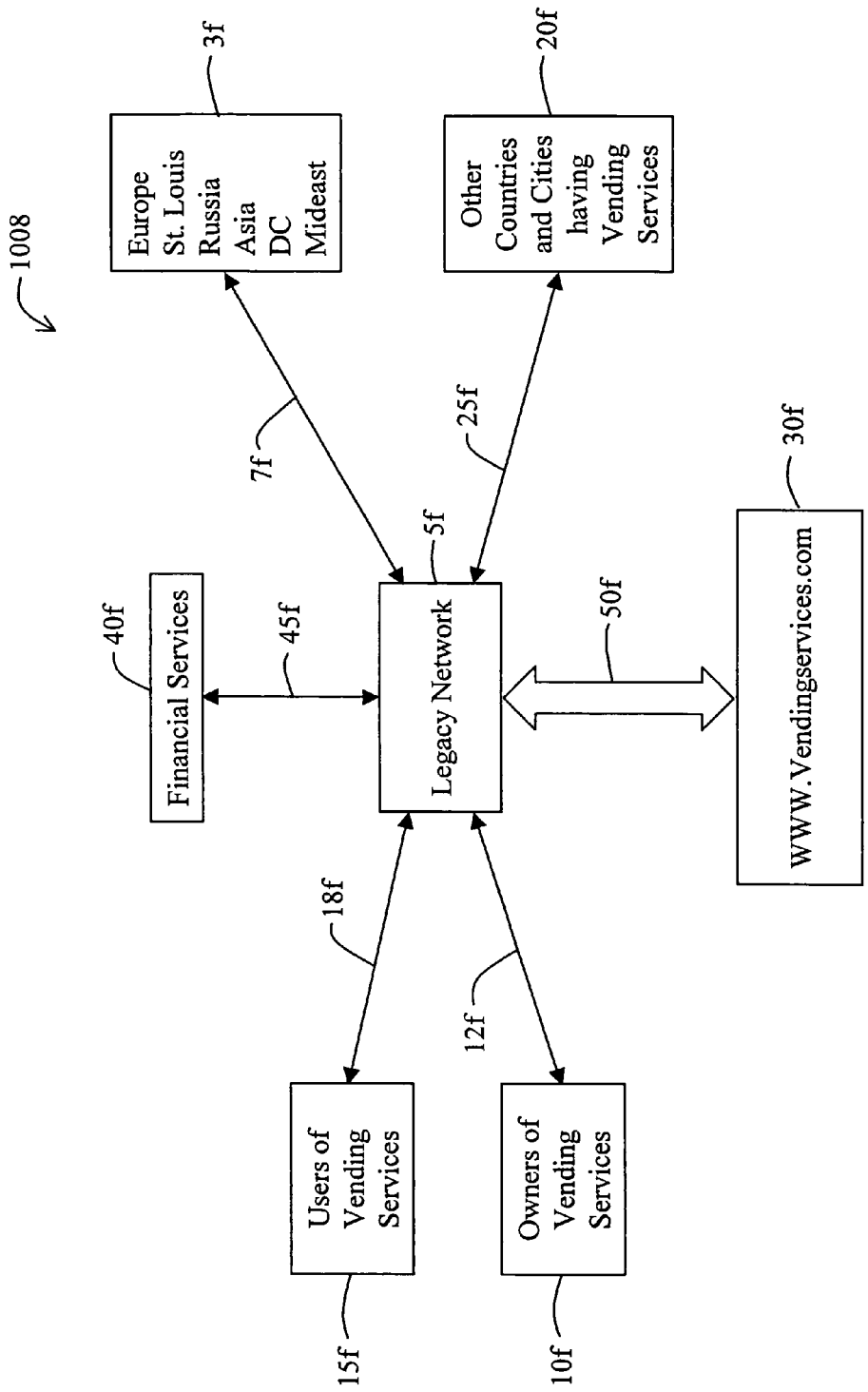

FIG. 12 depicts a Financial Service Provider System 1010 link to yet another web-site 30f which is identified in FIG. 12 as www.vendingmachineservices.com, by way of example, for those customers that want to be able to use any vending or kiosk machine any place in the world in accordance with the present invention, as discussed above with reference to FIGS. 1-6, and for owners and operators of vending and kiosk machines such as vending machine and kiosk service companies that want to make it more convenient for customers to use the proximity service systems 3f that will authorize vending machine products or services locally or remotely as discussed above.

As will be understood by those skilled in the art, the PSPS Web sites 30, 30a, 30b, 30c, 30d, 30e and 30f can be constructed in numerous different manners. For example, a system for constructing the PSPS Web sites 30, 30a, 30b, 30c, 30d, 30e and 30f, and thereby managing the various databases for the users, owners, operators, and financial services is discussed hereinafter.

Figure 13:
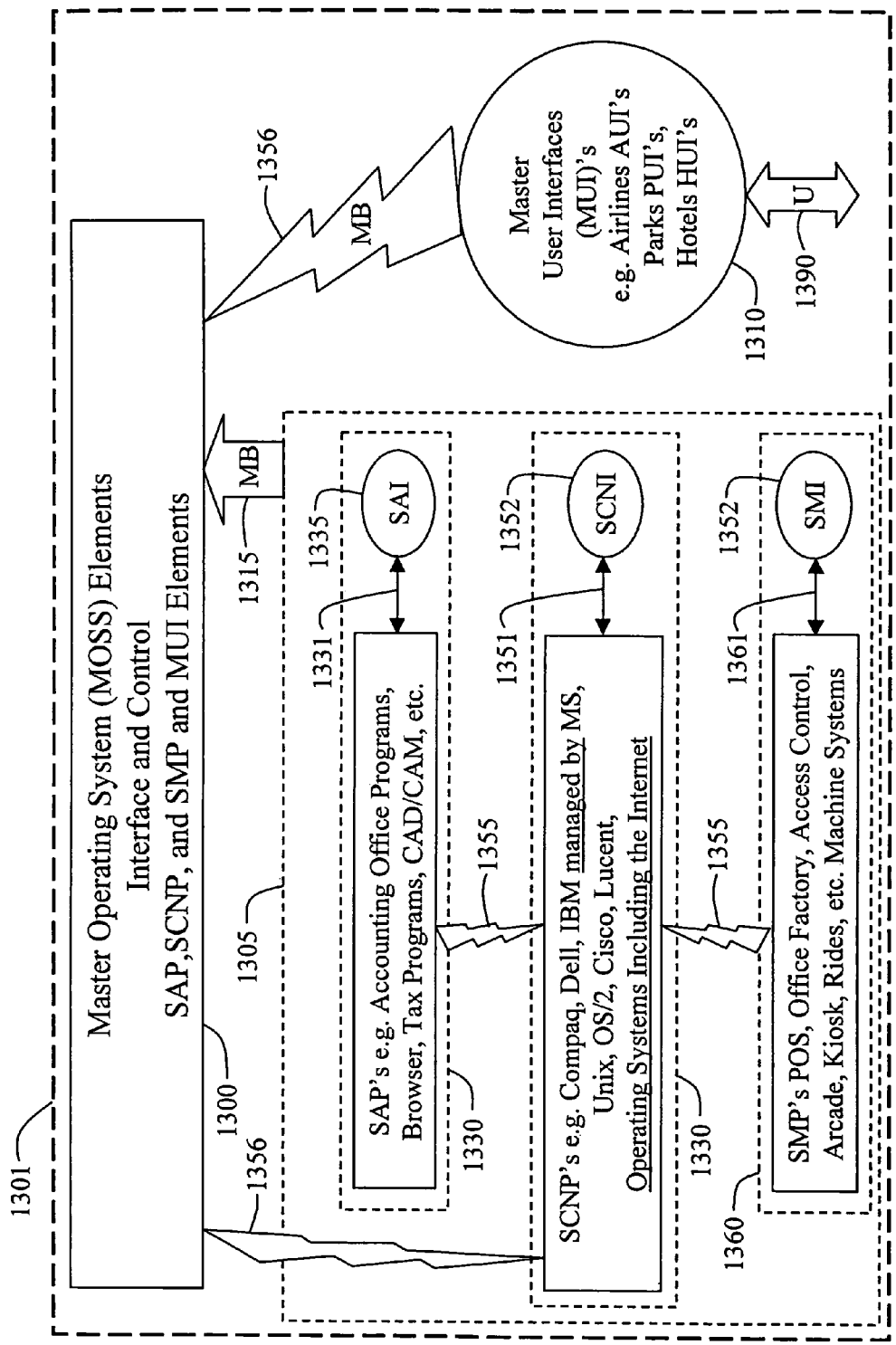
FIG. 13 is a block diagram showing the major user elements of a Master Operating Software Systems (MOSS).

In FIG. 13 a Master Integrated Technology System (MITS) 1301 for a predetermined generic user has all of the generic user elements (GUE) available to increase the users productivity. The MITS 1301 GUE will clearly be different for different generic users such as the MITS 1301 GUE for a hair salon franchisee would be different than the MITS 1301 GUE for a hospital. Also as technology improvements come along the MITS 1301 GUE for every predetermined generic business will have improvements just like car models have improvements. However these are slowly varying improvements and do not influence the basic MITS 1301 GUE for each generic user. The improvements just change the program features such as running faster costing less etc. similar to yearly improvements in automobiles. The improvements do not require the generic user to change the way they are doing business or to hire a person with a technology background. The MITS 1301 GUE are of three basic types and are grouped under a Master Operating Software System (MOSS) 1300 type elements and a Master User Interface (MUI) 1310 elements grouped separately since they are connected to both a User (U) 1390 and a System Bus SB 1356 and they are the "users input output control points" and in cooperation with the MITS 1301 elements puts the user in complete control of the underlying electronic controllable technology available to increase the users productivity.

Probably the single most important feature that allows a single program to be constructed to operate a MITS 1301 GUE for any generic user is the System Bus (SB) 1355 and 1356 versus a Master Bus 1315 design model. This simple "orthogonal" model for any user, independent of size and complexity, combined with available technology programming tools is what allows the invention to be described in terms that allows those skilled in the art of programming to construct a single program controlling vast resources. Probably the best recent analogy is the simple "layers, etching and doping" model used to describe how to grow and integrate unlimited numbers of circuit components onto to a single chip. The SB and MB design model provides a similar simplicity to those familiar with both the electronic technology available to increase user productivity (the MITS 1301 GUE attached to the SB 1355) and also familiar with the user requirements (the MITS 1301 GUE attached to the MB 1315) of the individual, business, government, school, or institution user. It is the "user requirements" (UR) defined by the set of MUI 1310 elements and accessed by the U 1390 that create the MB 1315 for every generic user. As will be described in connection with FIG. 19, the MB 1315 and SB 1355 orthogonal bus model allows those skilled in the art of UR (e.g. business, government, school, home etc.) to define the MB 1315 and SB 1355 "intersections" in such a way that those persons skilled in the art of programming can build a MITS 1301 MOSS 1300 and MUI 1310 for the User 1390.

Both the MOSS 1300 and the MUI 1310 will be described in more detail in connection with FIGS. 14 through 22 since they are the elements, along with the converter boxes (CB) associated with them that are created by this invention. The remaining MITS 1301 GUE are referred to sometimes as the users legacy elements since they are the application programs (AP) type elements 1305 controlling the users computers, networks, other electronic equipment plus any office and data bases AP connected directly to the system bus (SB) 1355. Because of some important difference in the types of 1305 AP and to add clarity to the description they are further sub grouped into System Application Programs (SAP) 1330, System Computer/Network Programs (SCNP) 1350 and System Machine Programs (SMP) 1360.

In common legacy terms the SAP 1330 are those programs written to meet multiple user requirements (UR) such as an accounting program or a CAD/CAM program where the users interacts with the SAP 1330 from a System Application Interface (SAI) 1335 unit (such as a legacy PC GUI terminal) controlled by the SAP 1330 via a communication link 1331 to try and satisfy his UR.

The SAP 1330 include all of the Internet programs employed by the user (such as AOL, Netscape, etc) and all of the SAP 1330 run on or in conjunction with at least one of the users SCNP 1350. The SCNP 1350 are normally thought of as legacy computer or network operating system programs such as Windows 98, NT 4, Linux, Unix, operating on Compact, Dell, Sun Micro computers connected to Cisco, Lucent, Nortel network systems that allow the SCNP 1350 operator to interact using System Computer/Network Interface (SCNI) 1352 units such as the familiar desktop manager controlled by a mouse via a communication link 1351 in order to satisfy the UR for platform capacity.

The SCNP 1350 elements include Internet legacy infrastructure elements if and only if one of the other MITS 1301 GUE groups (1300, 1310, 1330 or 1360) includes a program requiring connection to an Internet URL address. Today as a practical matter all of MITS 1301 GUE will include the Internet SAP 1330, SCNP 1350 and in many cases the SMP 1360 programs such as Point of sale or access control programs will connect to SAP 1330 programs residing on the Internet included in the users SCNP 1350 elements. In fact it turns out that a lot of the legacy Internet technology terminology makes it easy to understand and build a single MOSS 1300 for each MITS 1301 GUE as described in connection with FIGS. 14 through 24. Once a user has an MOSS constructed as described herein then utilizing the features of the Split Personal Computer System, U.S. Ser. No. 09/014,859, filed Jan. 29, 1998 or A Multiple Service Customer and Multiple Location PC Service Provider System, U.S. Ser. No. 09/408,598 filed Sep. 30, 1999, an individual or an owner of any company can stay in complete control, from any place in the world, of their MITS 1301 GUE employed to increase their productivity.

Before proceeding to the more detailed descriptions of how to build a MITS 1301 GUE MOSS 1300 that operates with the MUI 1310 elements to meet the UR selectable via 1390 while hiding the GUE 1305 elements, an explanation is in order of why two systems buses are shown (SB 1355 and 1356) versus the single master bus MB 1315. First, the SB 1355 and SB 1356 can be the same physical bus or they can be different if the user really wants to isolate their operation from outside intervention. Second, since the CB, to be described in great detail later, created by the intersection of the MOSS 1300 elements and the MUI 1310 elements are not orthogonal there are no CB required. So for the sake of clarity in description when the SB 1356 is involved no CB are required for the GUE associated with MOSS 1300 and MUI 1310 elements to communicate with each other. The opposite is true for the AP 1305 elements connected to the SB 1355 and the MB 1315, they are always subject to the CB requirements as described herein after and in conjunction with FIGS. 14 through 27.

Figure 14:
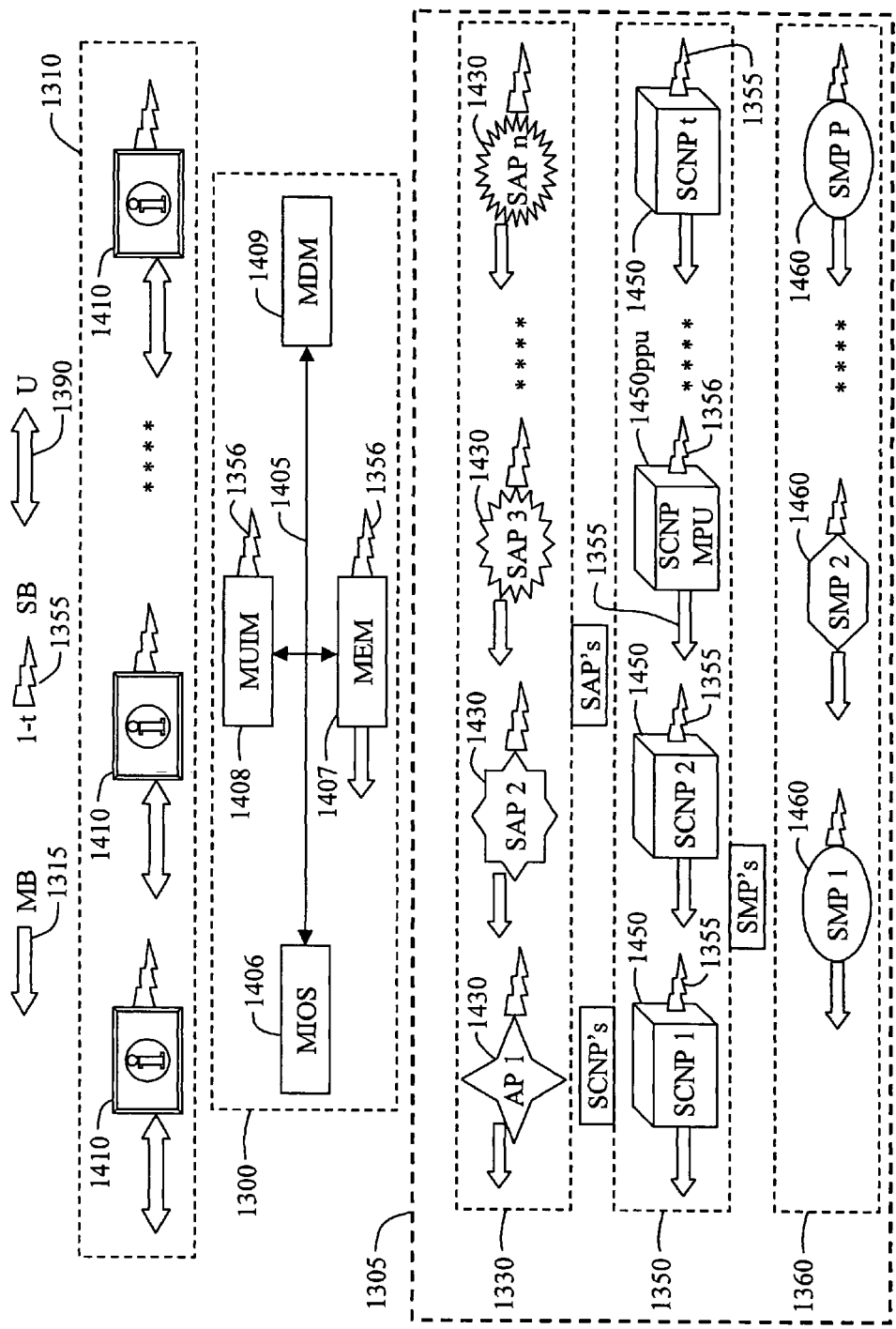
FIG. 14 is a block diagram showing a Generic User Elements (GUE) connected to a System Bus (SB) and a Master Bus (MB).

In FIG. 14 the MITS 1301 GUE are further described in terms of the actual number of GUE associated with the MOSS 1300 the MUI 1310 and each of the AP 1305 types 1330, 1350 and 1360. The only MITS 1301 GUE group whose number of elements is not a function of the generic user such as the users, owners, and operators are the MOSS 1300 element group. The MOSS 1300 elements can be associated with four modules (elements) referred to as a Master Input Output System (MIOS) 1406, a Master Element Manager (MEM) 1407, a Master Database Manager (MDM) 1409 and a Master User Interface Manager (MUIM) 1408. These same four modules are in all MITS 1301 GUE MOSS 1300 and are connected together via a communication link 1405 their functions and purpose do not change. The number and purpose of the elements in the other GUE categories (groups 1310 and 1305) depend on the generic user, such as the users, owners, and operators and financial services, as will be described in detail in connection with FIGS. 24-27. The MIOS 1406 stores the MOSS 1300 input information such as the number and location of the AP 1305 elements and the MUI 1310 elements for each generic user MITS 1301.

The MIOS 1406 stores the user output information required from each AP 1305 element along with the user output format for each MUI 1310 element requested via U 1390. The MIOS 1406 will be described in further detail in connection with FIGS. 16, 17 and 18.

The MEM 1407 is the operational workhorse of the MOSS 1300 and is described in more detail in connection with FIGS. 16, 17 and 18. Functionally the MEM 1407 manages all the AP 1305 elements to only produce outputs meeting the UR and suppressing all of the other output possibilities.

The MDM 1409 maintains the databases needed to satisfy the UR and is described in more detail in connection with FIGS. 16, 17 and 18. The MUIM 1408 manages all of the communication between the MEM 1407, the MDM 1409 and the MUI 1310 elements created by the User 1390 demands.

Figure 14A:
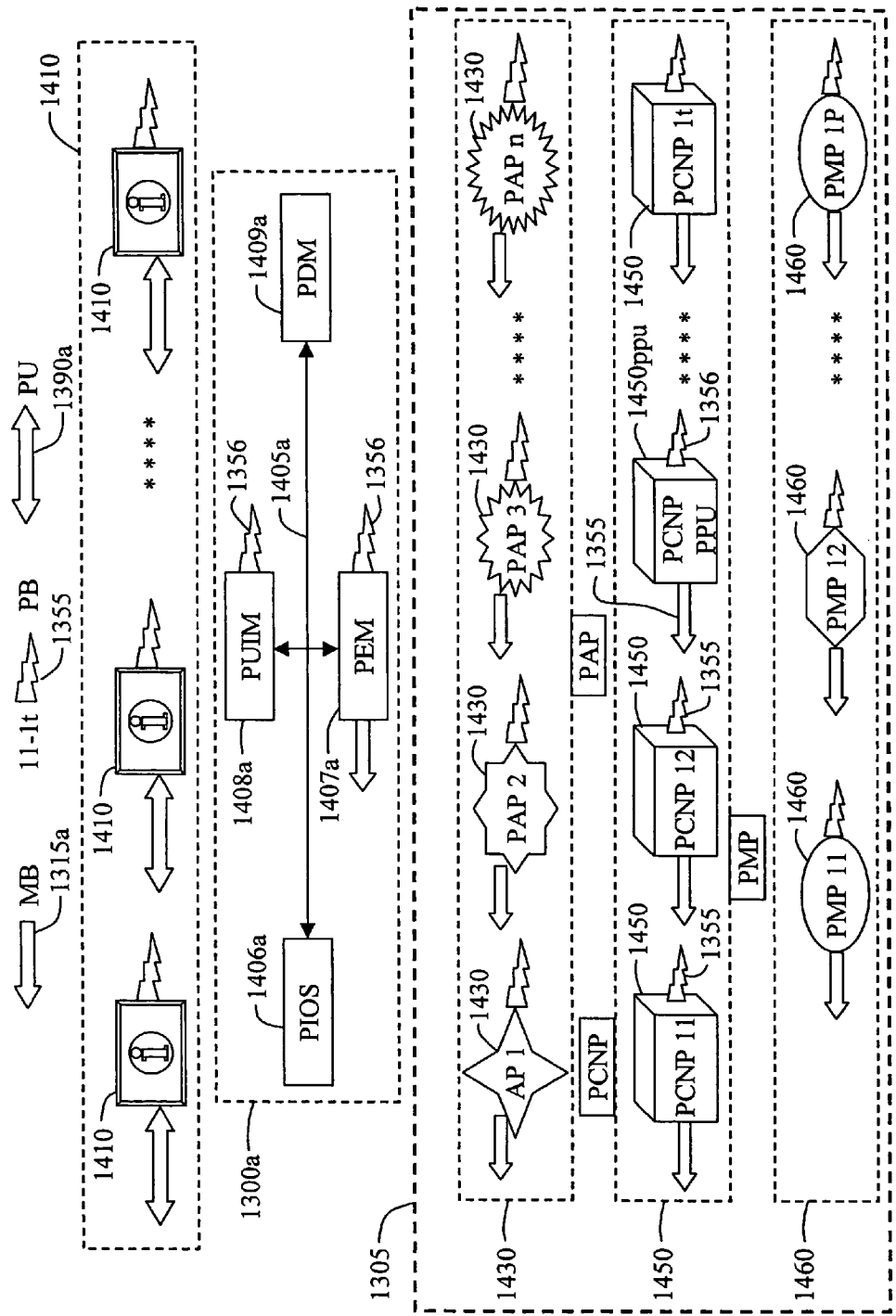
FIG. 14a is a block diagram showing the Master Operating Software System (MOSS) Generic User Elements for a single theme park.

In FIG. 14 legacy AP 1305 elements SAP 1330, SCNP 1350 and SMP 1360 along with the MUI 1310 elements are separated into individual elements for describing how a complete MITS 1301 GUE are constructed. Each of the individual MUI 1310 elements 1410-1 to 1410-1, each SAP 1330 element 1430-1 to 1430-n, each SCNP 1350 element 1450-1 to 1450-t along with each SMP 1360 element 1460-1 to 1460-p could used in the construction of a truly generic MOSS 1300 program but since the user requirements would also have to be generic an example for a specific generic user is considered more appropriate. Consequently, referring to FIG. 14a, the MITS 1301 GUE for a generic theme park owner is used as an example. In order to keep it simple, a Park Integrated Technology System PITS 1301 PUE POSS 1300a for a single theme park user elements (PUE) as shown in FIG. 14a will be constructed and then further described with the aid of FIG. 26 to show how the same PITS 1301 PUE can be extended to include other theme parks or a set of theme parks belonging to the same owner. In FIG. 14a the Park Operating Software System (POSS) 1300a has the same four elements as described earlier for the MOSS 1300 where Park (P) replaces Master (M) but the function descriptions for 1406a, 1407a, 1408a, 1409a and 1405a remain as in the function description of the MOSS 1300 elements given earlier. The MUI element 1410-1 of FIG. 14 is expanded into the (I) Park User Interface (PUI) elements 1410-11 through 1410-1i that will represent the set of generic park user requirements (PUR) for a theme park. By way of example PUI 1410-11 may be the gate entry terminal for the Park Users PU 1390a at a front gate connected by the Park Bus PB 1355-11 to the automated gate entry equipment controlled by the Park Machine Program PMP 1460-11 that runs on one of the park computer/networks PB 1355-11 controlled by the Park Computer/Network Program (PCNP) 1450-11. The PUI 1410-11 may require an additional PUI 1410-111 to PUI 1410-11k (k additional "views") not shown since all programmers skilled in the art of programming understand how to set out the UR for a program "view". This set of k generic views for this one set of PUE would be one set of PUR that would be stored in the Park Input Output System PIOS 1406a and associated with the PUI 1410-11. For example PUI 1410-111 might be the view required when the PU 1390a asks for the user requirement request "give me entry gate demographics" (e.g. # of tickets sold today, # sold this season, etc). Note that this same set or a subset of these PUI 1410-11 PUR may be (most likely are) associated with other PUI 1410-11 to PUI 1410-11 PUE. In fact the actual number of necessary and sufficient PUR subsets to manage a park are not nearly as large as the number of times the set can subdivided into subsets of PUR and then be allocated to satisfy the theoretical number of PU 1390a requests on different PUI-1410-1 elements located through out the park system.

For example if the PUR total was 100 and the set of distinct PAP 1430-1 and PMP 1460-1 elements were 50 then there are 100!/(50!*50!) potential PUI 1410-1 elements that in turn may have 5 to 20 views. That many views PUR combinations are clearly not manageable by any stretch of the imagination. Not manageable like it was not manageable to have electronic technicians in the 1960's learn all the possible circuits that could be constructed taking 100 elements 50 at a time or to have programmers in the 1980's writing all the possible programs to control machines from 100 commands taken 50 at a time.

In the case of electronic circuits the problem became manageable using a generic set of useful circuits invented under the master invention of the Integrated Circuit (IC) so that a relative few useful generic circuits could be used to build a relative large number of specific electronic machines (the IC invention allowed the circuits to be hid from the user). In the case of programming a few useful programs were invented to control the electronic machines and these standard programs (called operating systems OS) allowed a large number (growing geometrically at the time of this invention) of specific user application programs to be written (the OS hid the machines from the user) for users buying the machines. As shown by the example given above for the PUE and PUR it is now time to hide the application programs from the user using the machines. The methods to do this will be referred to as Master Programming to distinguish it from legacy application programming methods or Operating System Programming methods. Master programmers will follow the design procedures (or their equivalent steps) as set out in this application. Fortunately the same programming tools and skills can be used in constructing a MOSS program that are used to construct specific user applications programs (AP) and write good Operating System (OS) programs. It is the MOSS method described in this invention or an equivalent description that will allow an application programmer to quickly become a MOSS programmer once the user (actually the MOSS designer) tells the MOSS programmer what the sub sets of the GUR are along with the number and type of MUI elements associated with each GUR subset. The MITS 1301 system designer for a generic user needs to be familiar with all the GUE and GUR where as the MOSS designer only needs to be familiar with the MOSS programming aspects of the MITS 1301 design.

Figure 15:
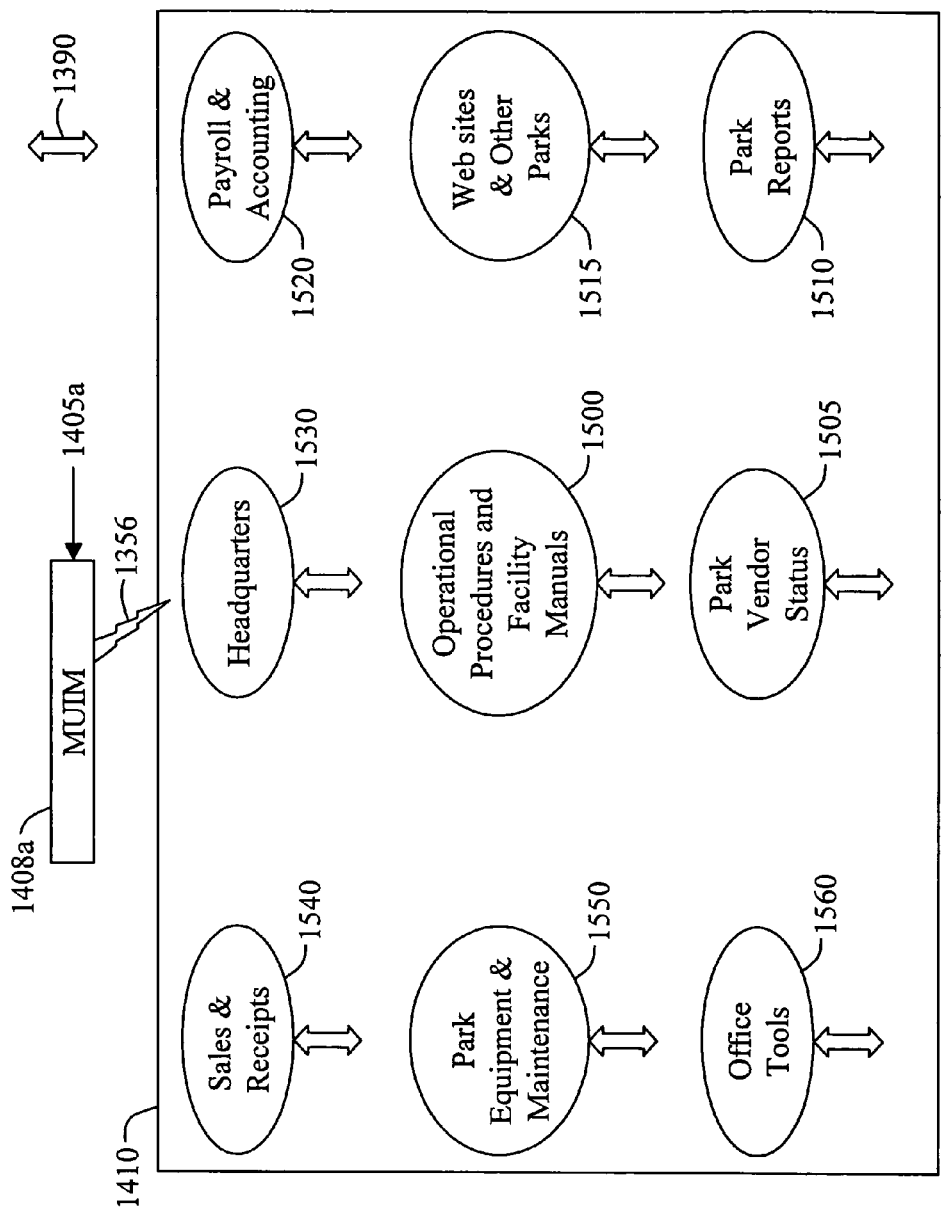
FIG. 15 is a block diagram showing an example of a Park User Interface (PUI) for generic theme park MOSS terminal controlled by a Master User Interface Manager (MUIM).

In FIG. 15 is an example of a typical generic Park User Interface (PUI) 1410-1 connected to nine U 1390 and connected via SB 1356 to the PUIM 1408*a* connected to the other MITS 1301 elements via the communication link 1405*a*. The User 1390 can select any one of nine PUI choices 1500, 1505, 1510, 1515, 1520, 1530, 1540, 1550 and 1560. Upon selecting one of the nine choices a predetermined set of UR will be updated in the PDM 1409*a* after receiving a predetermined command from the PEM 1407*a* caused by the selected U 1390*a* command sent to the PEM 1407*a* by the PUIM 1408*a* via communication links 1356 and 1405*a* respectively. The PUIM 1408*a* then sends back to the PUI 1410-1 along the same path 1405*a* and 1356 the information requested by the User 1390 in the predetermined format stored in the PIOS 1406*a* for the PUI 1410-1 for the selected one of nine choices.

Continuing with another example of the PITS 1301 PUE design lets say the PUI 1410-1*i* is the park owners U 1390*a* terminal having the nine view requests 1500 to 1560 shown in FIG. 15 and discussed earlier in connection with the PUIM 1408*a*. Each of the nine sets of PUR associated with PUI 1410-1*i* are stored in the PIOS 1406*a* and are used by the PEM 1407*a* to maintain the park master database (discussed in more detail in connection with FIGS. 16, 17, 18 and 19) under the control of the PDM 1409*a*. In addition lets assume that the nine predetermined sub views in PUI 1410-1*i* each have 3 additional predetermined sub views for a total of 27 views associated with PUI 1410-1*i*. Then the PIOS 1406*a* has to maintain 27 instead of 9 for the PEM 1407*a* and the PDM 1409*a* to manage. Note that in this second example no mention was made of how the PUI 1410-1*i* was connected to individual elements in the PAP 1430-1 or PMP 1460-1 or PCNP 1450-1 as done in describing the PUI 1410-11 operation and connections earlier in the first example. The reason is that maybe each of the 9 or 27 predetermined views requires combinations of information generated by two or more of the PAP 1430-1 or PMP 1460-1 elements connected to one or more PCNP 1450-1 elements. Such a number of combinations quickly leads to the hundreds of millions of combinatorial numbers used in the above illustrations. Thus we need a simple multiple dimensional method to quickly relate the subsets of PUR to the various PAP 1430-1 elements. Although any of a number of terminology and words could be used to describe what follows, the terminology used seems appropriate and easily understood by those skilled in the art of programming over the last two to ten years.

Figure 14B:
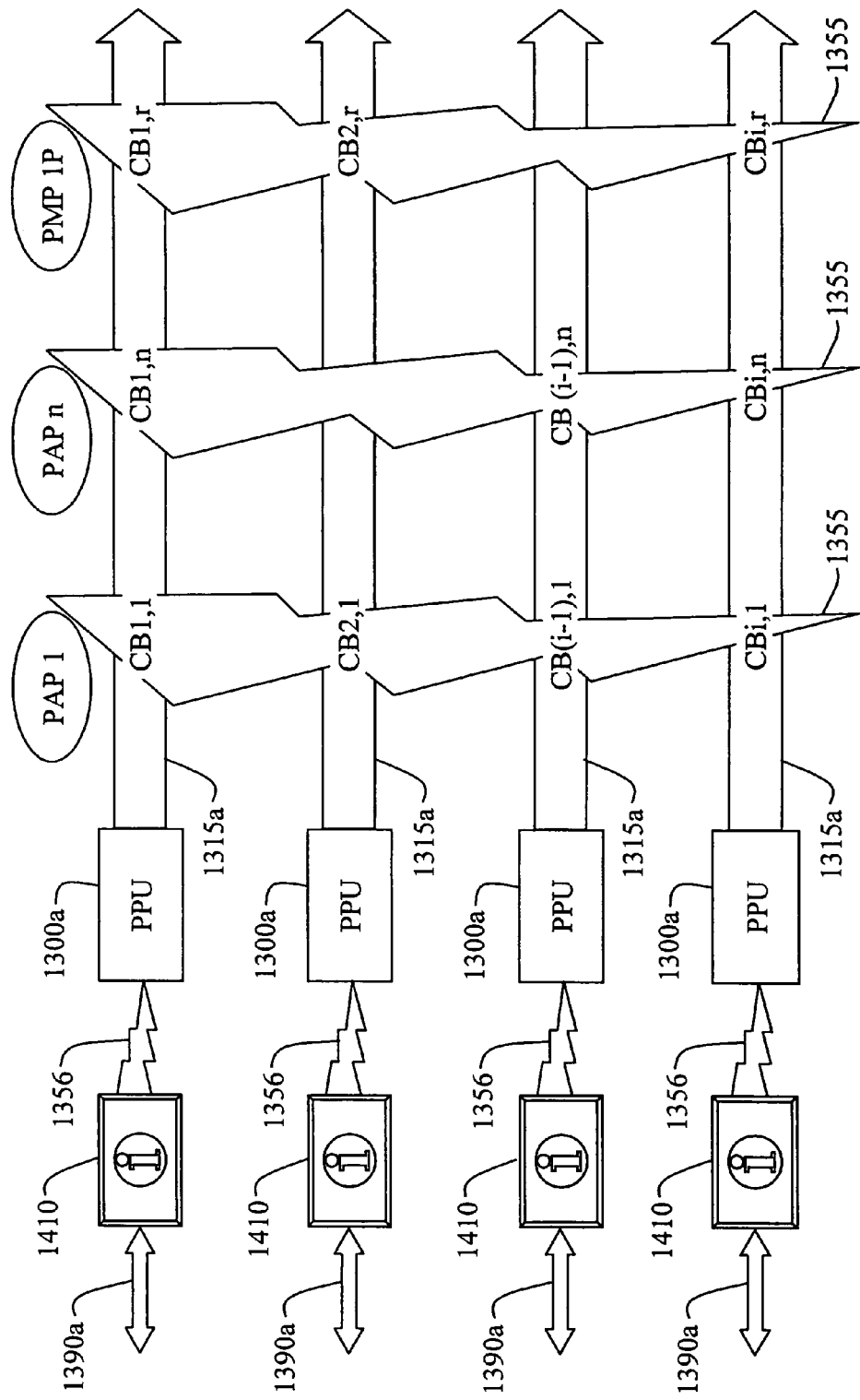
FIG. 14b is a block diagram showing the Master Bus (MB) and a Park Bus (PB) Converter Box (CB) design matrix.

With the aid of FIG. 14*b*, the Master Bus MB 1315*a* and Park Bus PB 1355-11*b*-1355-1*tk* are related to a design matrix and described in such a manner to reduce the combinatorial PUR possibilities to a set determined by simple straight forward design steps. The design steps use Converter Boxes CB which can be thought of as multiple functional browsers for those programmers used to the Internet programming terminology. In FIG. 14*b* the PB 1355-11*b* to 1355-1*tk* (herein after referred to as PB 1355 unless a particular bus need to be identified) represent the respective park physical system computers and networks on which the various PAP 1430-1 and PMP 1460-1 programs are operating and all of them intersect the POSS MB 1315*a* in an orthogonal manner (this is clearly not a physical intersection) and the number of times the PB 1355 intersects the MB 1315*a* depends on how many unique PUI 1410-11 to PUI 1410-1*i* elements are required to operate the park and satisfy the park user input out put requirements. Note that the (I) elements are the number of unique PUI 1410-1 elements not the physical number of park terminals on the PB 1355. The PUIM 1408*a* keeps track of the actual number and location of the park physical terminals and performs a many to one mapping prior to requesting a specific PUR view from the PEM 1407*a*. This many to one mapping done by the PUIM 1408*a* is a simple but powerful feature because it automatically scales the size of a generic PITS 1301 PUE POSS and lets a single POSS design operate many different parks scaled to many different sizes.

The number of intersections between the PB 1355 and the MB 1315 shown in FIG. 14*b* is i*r. the r=n+p and represents the number of PAP 1430-1 and PMP 1460-1 programs shown in FIG. 14*a* available or needed to run the park electronic controlled technology and included in the PUE and (i) is the number of unique PUR subsets built into the generic POSS 1300 as requested by the generic park owner. Both i and r represent the "features" and "horsepower" of the park PITS 1301 and POSS 100*a* and just as in the automobile industry their will be the "economy", "Midsize" and "Luxury" PITS 1301 and POSS 100*a* models with some selection of features given by the "Park PITS 1301 Companies". However having 3 to 10 models to chose from versus having millions of choices for each PUE set of park parts is analogous to the choices of "do you want to buy all the automobile parts and make your own automobile and then drive what you built with no warranty" or "do you want to chose from a selection of automobiles with warranties and drive one that is reliable and affordable".

It is already known that major PAP 1430-1 elements (this will be true for virtually every generic user) will be accounting programs such as DacEasy, Great plains, and office programs such as Office 2000 etc. In addition to these and the gate entry program used in the first example other programs that will most likely be behind the scenes of a POSS to meet the PUR subsets are Tax, Customer, Website, Ride, Office equipment, Security, Maintenance, Insurance, Purchasing, payments, HR, Government Regulations, Training, and Facility Mgt programs slanted towards park operations. Continuing with the design steps each of the (i) PUI 1410-1 elements represent a unique subset of PUR. Each unique PUR subset such as PUI 1410-1*i* requires information and/or actions from the PUE elements intersecting the POSS 1300*a* MB 1315*a* shown in FIG. 14*b* where at each intersection a CB is either shown or not shown.

In the example a CB is shown for the three intersection points (i,1), (i,n) and (i,r). Each CB say CBi,1 defines the information and/or actions to be taken by the PAP #1, CBi,n the actions taken by the PAP #n and CBi,r the actions taken by the PMP #1 p shown in FIG. 14*b* upon receiving a particular View (subset of PUR subset) associated with the PUI 1410-1*i* unit. Each time a view is selected by a PU 1390*a* one or all of the three PUE elements might be required to meet the CB requests required for the view when the POSS 1300*a* receives a PU 1390*a* request from PUI 1410-1*i* via the PB 1356 for a specific view available to the PU 1390*a* using the PUI 1410-1*i* element.

Thus each view selectable from any PUI 1410-1*by* a PU 1390*a* is associated with a set of predetermined CB's that are activated from the POSS 1300*a* PIOS 1406*a* as controlled by the PEM 1407*a* via PB 1356 in connection with the appropriate PAP's of 1430-1 or PMP's of 1460-1 to take action or generate information when instructed. Also a view command associated with each unique PU 1390*a* request will be sent by the PEM 1407*a* via 1405*a* to the PDM 1409*a* that will select the predetermined view response and the PDM 1409*a* will send via 1405*a* this response to the PUIM 1408*a* that will format and send via PB 1356 the information to the physical PUI 1410-1 terminal requesting the view.

Figure 16:
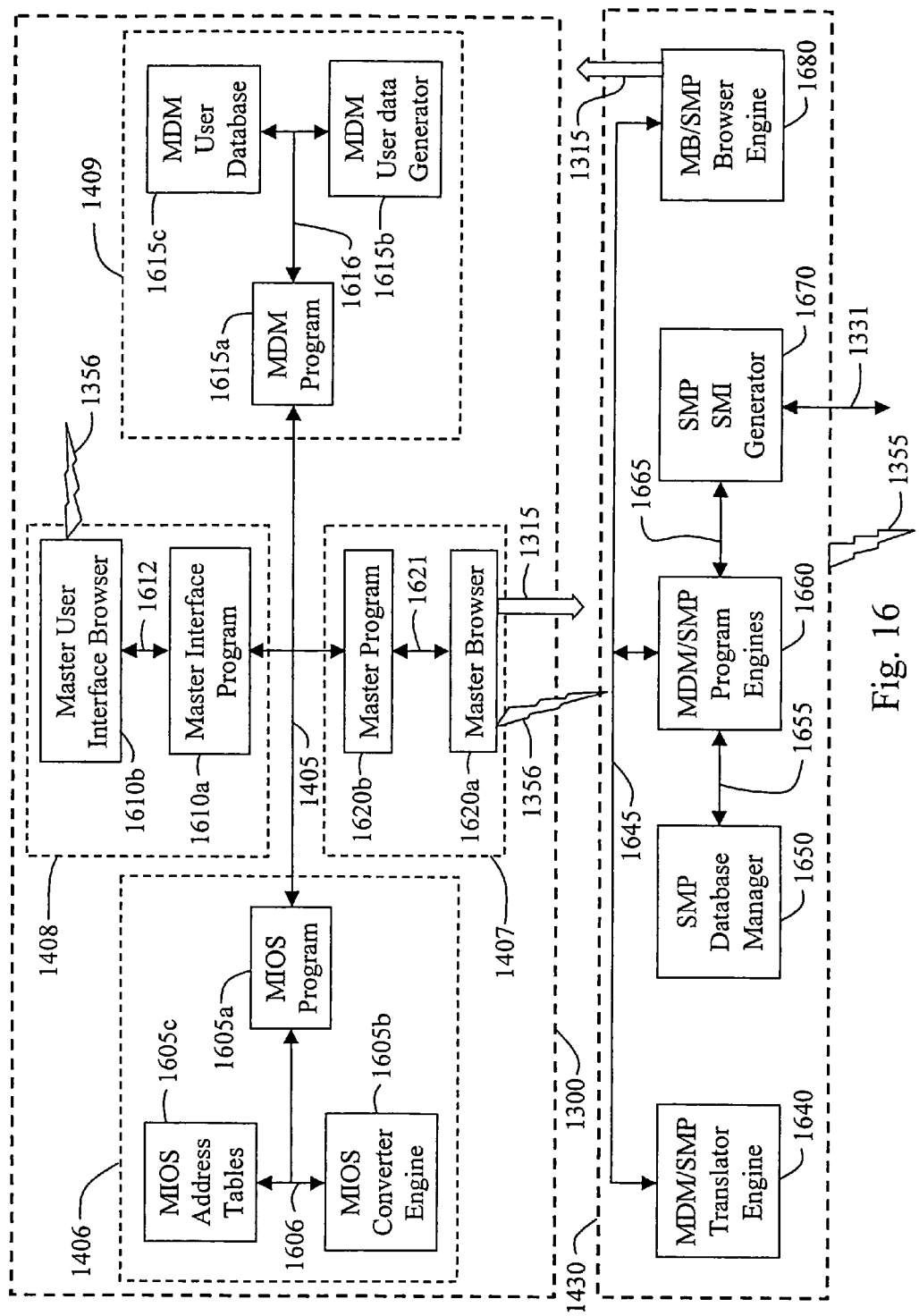
FIG. 16 is a block diagram showing the MOSS and a System Application Program (SAP) converter box interface diagram.
Figure 17:
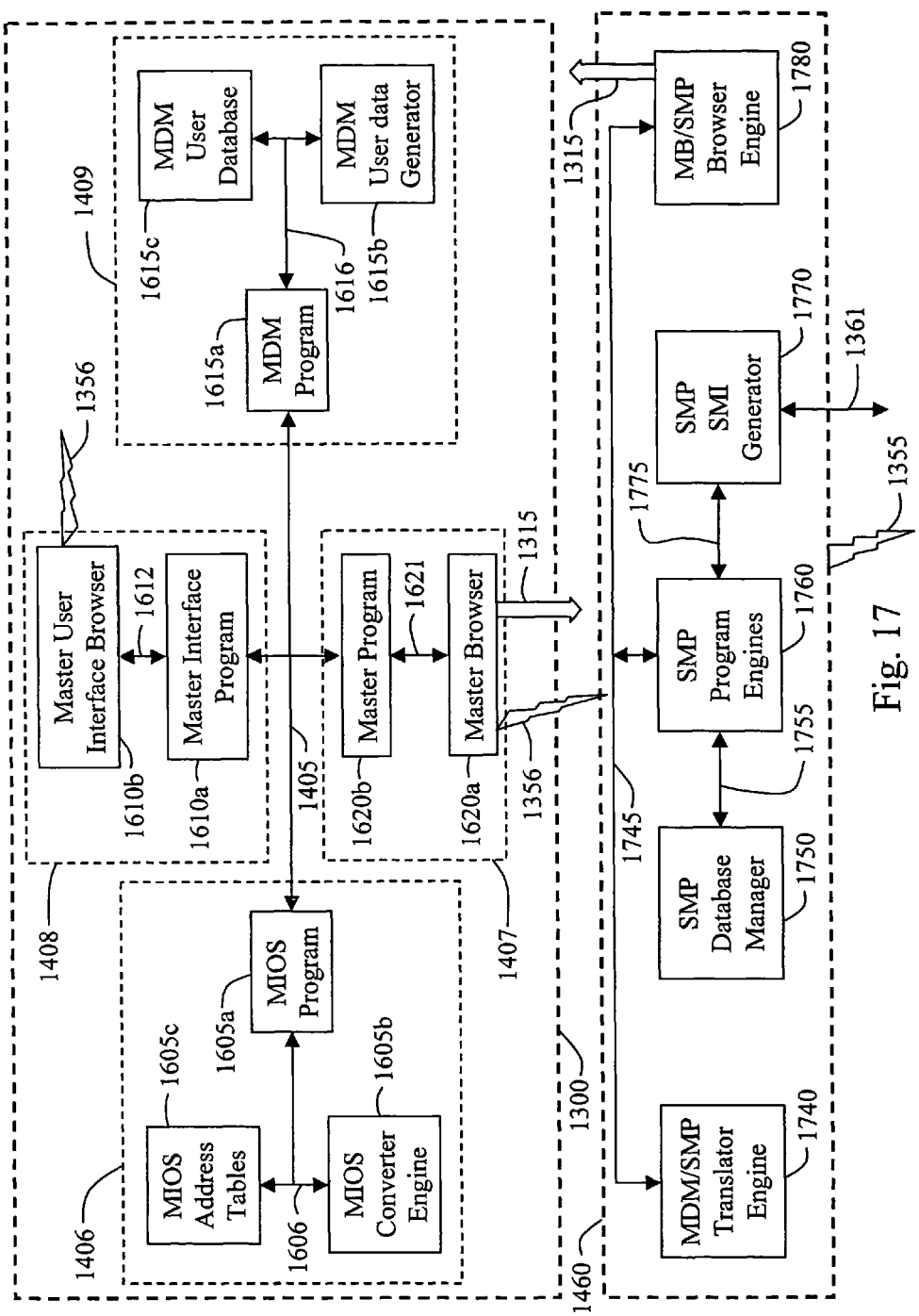
FIG. 17 is a block diagram showing the MOSS and a System Machine Program (SMP) converter box interface diagram.
Figure 18:
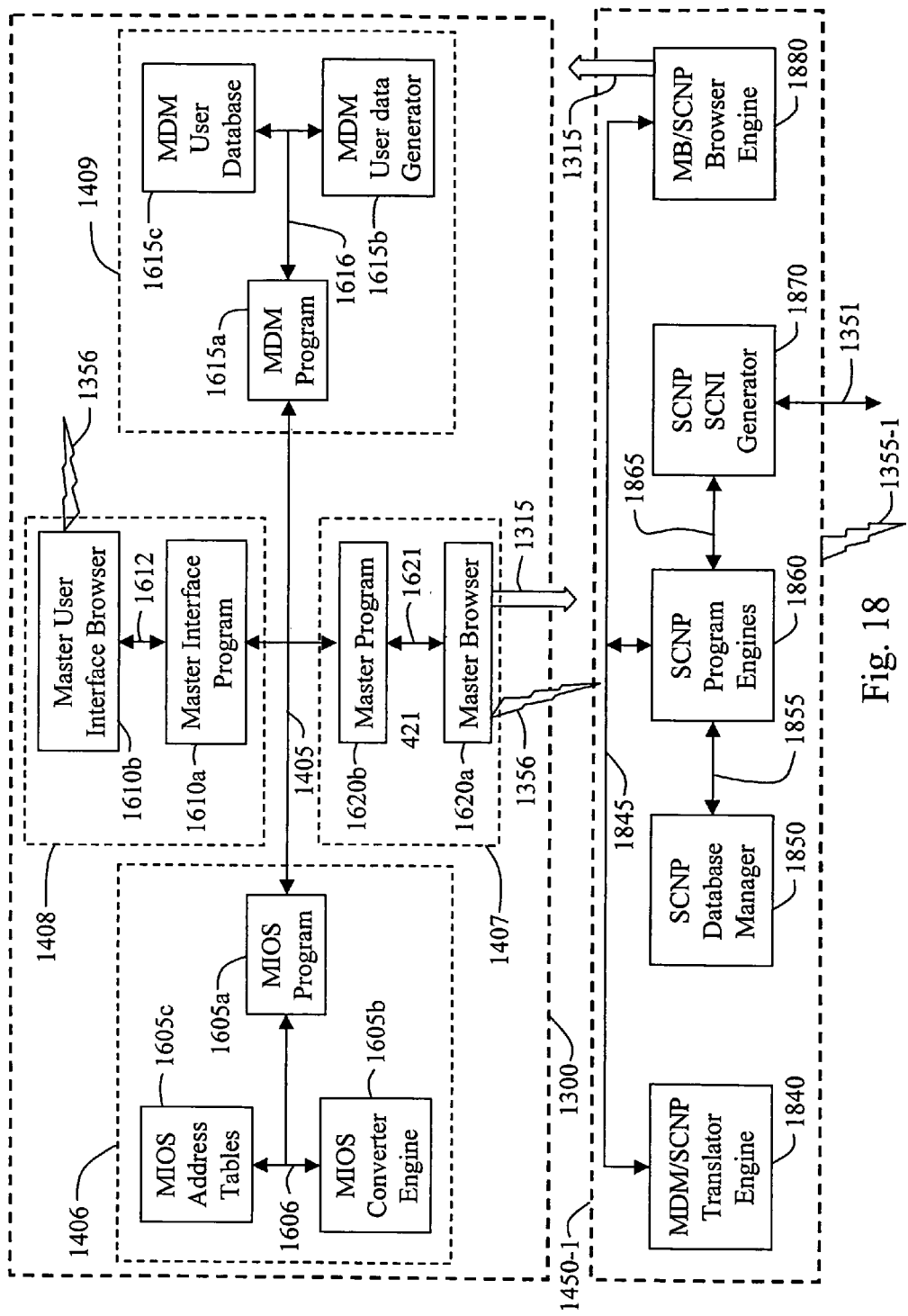
FIG. 18 is a block diagram showing the MOSS and a System Computer Network Programs (SCNP) converter box interface diagram.

In FIGS. 16, 17, and 18 a more detailed description is given so that any programmer skilled in the art can build a converter box and write master programs controlling a predetermined set of PUE having a predetermined set of converter boxes. FIG. 16 shows the inner workings of a typical MOSS 1300 and the inner workings of a typical SAP 1430-1 element and how the preferred communication between the MEM 1407 and the SAP 1430-1 element is accomplished. FIGS. 17, and 18 are the same as FIG. 16 except they relate to the SMP 1460-1 elements and the SCNP 1450-1 elements respectively. Consequently only a detailed description is given in connection with FIG. 16 and the FIG. 17 and FIG. 18 explanations are obtained by replacing the symbols for the SAP 1430-1 elements with those for the SMP 1460-1 and SCNP 1450-1 respectively.

In FIG. 16, the MIOS 1406 includes a MIOS Program 1605*a* connected to MIOS address tables 1605*c* via a communication link 1606 and connected to MIOS converter engines (CE) 1605*b* via communication link 1606 and getting commands via communication link 1405 from the MEM 1407 module. When the MIOS program 1605*a* gets a command from the MEM 1407 via communication link 1405, the command uses a predetermined format that tells the MIOS program 1605*a* what converter boxes need to be activated. The MIOS program 1605*a* decodes this command into an associated CB address located in the address table 1605*c* and a set of CE located in the MIOS converter engines 1605*b*. The MIOS address Tables 1605*c* store the Master Resource Locator (MRL) for each CB in each predetermined MITS 1301 system. The MRL identifies the exact SAP 1430-1 of FIG. 16 that each CE must operate with to cause the View request associated with the set of CB to be satisfied. The format of the MRL can be similar to that used on the Internet but should be of a higher level since the Internet SAP 1430-1 elements are just one set of elements to be controlled by the MEM 1407. Also the CE can be simple or complex engines as will be discussed in connection with the detailed workings of the MEM 1407 depending on the degree of security the MOSS user selects. For example the Military or Government Spy agencies would want more security in the CE program running their operation than a commercial business would be willing to pay. Another important aspect of the CB design are features that allow the Generic User Requirements (GUR) command from a CB received by the MUIM 1408 from a MUI 1410-1 element to be a CE command as simple as "connect SAP or SMP directly to the MUI 1410-1 element specified by the CB". There are many good examples of a stand alone SAP 1430-1 request such as a request for Office 2000 that already have useful control panels and do an adequate job of hiding the technology behind both the SAP 1430-1 and the SAI 1335 as shown in FIG. 13. Other good examples are the SAP and SMP game programs developed for children and the SMP POS terminals used in many retail outlets today including those used at theme parks. In the cases where the MOSS CB requests a "direct connection" to the GUE a simple direct one to one communication connection between SB 1355 and SB 1356 is made by the MEM 1407 unit.

This is shown in FIG. 16 where a more detailed working of a SAP 1430-1 element is shown to make it easy for those skilled in the art of programming.

In FIG. 16 the working elements inside a SAP 1430-1 such as a word processing program are shown. The three key elements of any SAP 1430-1 are a SAP Program Engine 1660 connected to a SAP System Application Interface (SAI) Generator 1670 via a communication link 1665 and also connected to a SAP Database Manager 1650 via a communication link 1655. The SAP SAI generator 1670 is connected to the user SAI 1335 via a communication link 1331 as shown in FIG. 13. Thus when a Master Bus/System Application Program (MB/SAP) Browser Engine 1680 of FIG. 16 detects its MRL address sent from a Master Browser 1620*a* over SB 1356 to SB 1355 wherein the MB/SAP unit 1680 decodes a "direct connect command" the MB/SAP unit 1680 unit can either make a direct communication connection from the SAP SAI generator unit 1670 via the communication link 1331 to the requesting MUI 1410-1 element by connecting the SB 1355 to the SB 1356 or require that the connection be made back through a communication link 1645 connected to the MB/SAP Browser Engine 1680 connected via SB 1355 to SB 1356 to the units 1620*a* and a Master Program 1620*b* connected via a communication link 1621 and passed through communication link 1405 to a master interface program 1610*a* connected to a Master User Internet Browser 1610*b* via a communication link 1612 and finally out to the MUI 1410-1 element via SB 1356. The reason the connection might be forced back through the MOSS 1300 modules are for security and isolation reasons. However for this discussion it is assumed that CB "direct connect commands" means the underlying SAP or SMP "information and action" generators are connected to the MUI 1410-1 element in unaltered form. The above discussion disposes of the simple direct cases which will often occur since most all MUI 1410-1 elements will have generic user requirements (GUR) views that can be satisfied quickly by sending "direct connect commands" to SAP 1430-1 or SMP 1460-1 elements some of which were mentioned above.

The more interesting and much more useful situations regarding databases are when the direct command will not bring to the user the requested GUR subset or when the master database is being updated automatically and are being used to feed other AP so they automatically stay current based in the history of all the user MITS 1301 MUI 1410-1 element transactions. A good example would be when the manager of the theme park used in the early example requested the days operational summary data. Such a PUR would cut across many if not all the databases of the PAP 1430-1 and PMP 1460-1 elements such as shown in FIG. 16 as 1650 and in FIG. 17 as a SMP Database Manager 1750. It is these cases where the need for the MITS 1301 MOSS 1300 becomes so productive for the user. Also there are many interesting business data base threshold combinations were the data bases are being generated in "unconnected AP's 1305" that can signal good or bad situations developing or existing in the business. In most of these situations owners are managers would like to know ASAP when critical operating thresholds where crossed. It is the multiple database GUR activated by a MUI 1410-1 view via a U 1390 request that makes the current cost of operating technology so high since with out a MOSS the data from one SAP or SMP into still another SAP or SMP has to be combined manually in some fashion. These multiple database view requirements are an important number of GUR views for the individual and certainly for any business. The fact that nobody has written down these GUR and the predominate sub set of CB needed to run an operation from a MOSS is probably because direct operation of a SAP or SMP are all that has been available up until this invention. Even where a special program has been written for the customer to combine some data bases available from other programs the special program is still accessed directly and all the other GUR sub sets are still not considered for the generic user MOSS. Again the reason is probably because of the astronomical possibilities a programmer would face if asked to write a single program to completely run all aspects of a business. However using the MOSS design method described herein a single MOSS can be constructed to operate a complete generic business such as a theme park by those skilled in the art of programming. Continuing with FIGS. 14b and 16 the case for when the GUR view request requires information from multiple SAP 1430-1 database interrogations will be described.

In FIG. 14b the number of potential multiple data bases that could be required from a PUR request was r=p+n which represents the total predetermined PAP 1430-1 and PMP 1460-1 databases for a generic theme park PITS 1301 PUE. Although it probably would be rare to have information from every PUE database in a single view the question of the MB 1315 size (address plus command words) must be determined in any design. For example SB 1355 sizes range from 4 words (bytes) up to 256 words in order to have enough address plus command capacity for the SCNP 1450-1 elements to control every element on a predetermined MITS 1301 GUE system ranging from a standalone PC MITS 1301 up to a MITS 1301 that includes all the Internet SAP elements. The address size of the MB 1315 represents how many CB can be activated in the MIOS 1406 module by a single U 1390 view request. The MB 1315 command size needs to accommodate the largest number of unique MUI 1410-1 elements that need a view. That number was represented by (i) in FIG. 14b. As a practical matter the number of unique MUI 1410-1 probably will be less than 32 for a home MITS 1301 GUE even when the home appliances and security systems along with the entertainment and phone systems are included and as large as several hundred for world wide multi-national companies.

The number of MUI 1310 will be discussed in much more detail in connection with FIGS. 20 through 24. The size of the active MB 1315 also determines how large a MDM 1409 User Database 1615c must be to accommodate all of the potential data received from multiple SAP 1430-1 and SMP 1460-1 database queries. The active size of the MB 1315 is the actual predetermined number of MUI 1410-1 unique elements of a generic MITS 1301 GUE used in a specific design. MDM user data generator 1615b takes via a communication link 1616 the View data stored in the MDM user database 1615c each time a MDM program unit 1615a receives a request for view data from the Master Program 1620b via communication link 1405 and sends the view data to the Master Interface Program (MIP) 1610a via communication link 1405 that formats the view data before sending the view request data to the Master User Interface Browser 1610b via the communication link 1612 for delivery back to the requesting MUI 1410-1 unit via SB 1356. The preferred embodiment has the Master Browser 1620a periodically, at predetermined intervals associated with each CE in the MIOS converter engines 1605b, sending out CE requests for the predetermined MIOS 1406 sets of view data to the respective multiple SAP 1430-1 and SMP 1460-1 elements so that view requests from a MUI 1410-1 element U 1390 can be filled by the MOSS 1300 modules without having to wait for the Master Browser 1620a interrogation responses.

Since the active size of the MB 1315 can be specified for every specific generic design, a MB 1315 address size of two words (over 10,000 multiple data bases per view) and a MB 1315 command size of two words (over 10,000 unique user terminals) will be used as the preferred embodiment. It is important to distinguish the difference between the size of the MB 1315 (2 words by 2 words) and the size of the other various MOSS 1300 databases such as the MIOS 1406 databases and the MDM 1409 databases. The active size of the MB 1315 only determines the addressing range of the other two MOSS 1300 databases the active size of the MB 1315 does not indicate the size of each database cell in either the MIOS 1406 or MDM 1409. For example, the active MB 1315 size might indicate there are 200 View cells but the size of each view cell is a function of the GUR set associated with each cell in the case of the MDM 1615c database of FIG. 16.

In the case of the MIOS converter engines 1605b database the size of each cell depends on a number of factors ranging from the number of multiple database sets to the degree of security designed into the MOSS 1300. Both of these factors are well known to those skilled in the art of database programming and discussed in even greater detail in connection with FIGS. 20 through 24.

After choosing the active size of a specific MB 1315 design for a generic GUR set of views the GUE SAP 1430-1 and SMP 1460-1 of FIGS. 16 and 17 required to satisfy the GUR can be chosen which in turn dictates the SCNP 1450-1 of FIG. 18 needed to complete the MITS 1301 GUE design process for each generic user. The final detailed programming steps for the multiple database views are associated with periodically (or on command) launching the MIOS converter engines 1605b (or a search engine (SE) as will be described in more detail later). In the preferred embodiment the MIOS program 605a in FIG. 16 maintains an update table for every set of predetermined GUR views for a generic MITS 1301 MOSS 1300. The update table in the MIOS address tables 1605a associates a set of CE and SE stored in the MIOS program 1605a with each predetermined set of GUR views along with the frequency of update for each CE and SE. The MIOS program 1605a via the communication links 1405 notifies the master program 620b each time a CE or SE needs to be launched and provides both the MRL address from the MIOS address tables 1605c and the CE or SE or both from the MIOS converter engines 1605b via the communication link 1606 to the master browser 1620a via communication links 1405 and 1621. The master browser 1620a launches the selected CE and or SE to the MRL address of a predetermined SAP 1430-1 element that has a MB/SAP 1680 browser engine as shown in FIG. 16 via the SB 1356.

The MB/SAP browser engine 1680 unit detects the CE on the SB 1355 and notifies a MDM/SAP translator engine (TE) 1640 (put into the SAP 1430-1 as part of the MITS 1301 MOSS 1300 design procedure and discussed in more detail in connection with FIG. 24) via communication link 1645 to provide the requested CE or SE engine View Data or make the requested CE or SE View transaction or make an update to a predetermined portion of the MDM 1615c database where the predetermined data is used as a silent automatic input to other SAP 1430-1 or SMP 1460-1 program not requiring manual assistance. As will be discussed again in connection with FIG. 24 the TE will eventually become the heart and soul of good MOSS designs. Upon receiving the CE or SE request the SAP program engine 1660 is directed via communication link 1645 by the MDM/SAP translator engine 1640 to effect the request and the SAP program engines 1660 unit causes either the SAP database manager 1650 to get the data via communication link 1655 or instructs the SAP SAI generator 1670 to cause a transaction via communication link 1665 or both predetermined actions might take place. When the CE or SE requests requires data to be sent back the process is reversed as well understood by those skilled in the art of programming. The process described above is repeated for every CE or SE associated with the predetermined GUR view set of CE or SE until the multiple transactions are completed and the MDM user database 1615*c* associated with the view is updated. Thereafter if a MUI 1410-1 view request is received by the master user interface browser 1610*b*, an accurate response can be provided from the MDM user database 1615*c*. The discussions above apply equally to the FIGS. 17 and 18 where the workings of the MOSS 1300 is applied to the workings of SMP 1460-1 elements and to the workings of the SCNP 1450-1 respectively.

A key part of the MITS 1301 MOSS 1300 design is to hide all but the "direct connect" programs from the generic user and not require the user to understand how to load them or how to operate the AP 1305 elements. To accomplish this key feature each of the SAP 1330-1, SMP 1460-1 and SCNP 1450-1 elements are put under the control of the MOSS 1300 converter box engines (the converter engines act like today's IT administrators only the engines work at computer speeds and accuracy). The transactions required by the CB engines can be done in one of three ways well known to those skilled in the art of programming. The three ways are 1) through cooperation with the original AP 1305 designer to perform much of up date and upstream as requested 2) by operating the AP program from a set of view database generating Macros, or 3) finding another equivalent AP 1305 element designer that is willing to modify their design in order to be part of a higher order more appealing user friendly program. Also, by hiding all of the AP 1305 elements behind a single program multiple marketing and training materials will reduce the cost of each AP 1305 element product available to the user. Consequently the modifications required to incorporate MB/SAP, MB/SMP, and MB/SCNP Browser Units 1680, 1780, 1880 along with Translator Engines 1640, 1740, 1840 of FIGS. 16, 17 and 18 respectively can be done in at least three ways as just described. Note that this key part of the integrated program design is similar to describing the several "doping" methods that can be used to build IC's.

The preferred embodiment for incorporating each of the AP 1305 GUE is to start with the predominately accepted set of GUE for each generic industry and integrate these into an economy model, mid-size model luxury model etc in cooperation with the AP developers. However, the invention quickly lends itself to modifying several AP 1305 elements for each MITS 1301 GUE model able to satisfy each associated set of GUR with only slight difference and give the users choices like automobiles allow several choices of tires, sun roofs, and other accessories. In other words AP 1305 element designers will not only want to be SCNP 1450-1 Application Program Interface API compliant they will want to become Master Program Interface (MPI) compliant and future OSI programmers will want to be MPI compliant. The main difference between being API or OSI compliant is that your program will require someone to learn how to load it and use it where as when a designer makes his program MPI compliant a MOSS program will load it and manage it for the user. Also since MOSS 1300 has the "direct connect CE command" a user will not be giving up any API available in today's market but they will be gaining the full power of today's AP 1305 enslaved and integrated to work for each generic user using less skilled workers.

To review the design process, FIGS. 19 through 22 are used to more clearly describe both the process and the design matrices associated with each MITS 1301 GUE. In general, a design matrix is first provided. The design matrix has at least two axes with the system application programs 1430 being represented on one of the axes, and user requirement elements (GUR) being represented by another one of the axes. The system application programs 1430 each defining a particular technology. Each of the user requirement elements define a particular user requirement.

One unique intersection point is located between each of the user requirement elements represented on one of the axes and the system application programs 1430 represented by another one of the axes in the design matrix. Then, a technology converter requirement or converter box is developed for each intersection point. Each technology converter requirement uses the system application program at each intersection point to develop an output satisfying the user requirement element at the corresponding intersection point.

Figure 19:
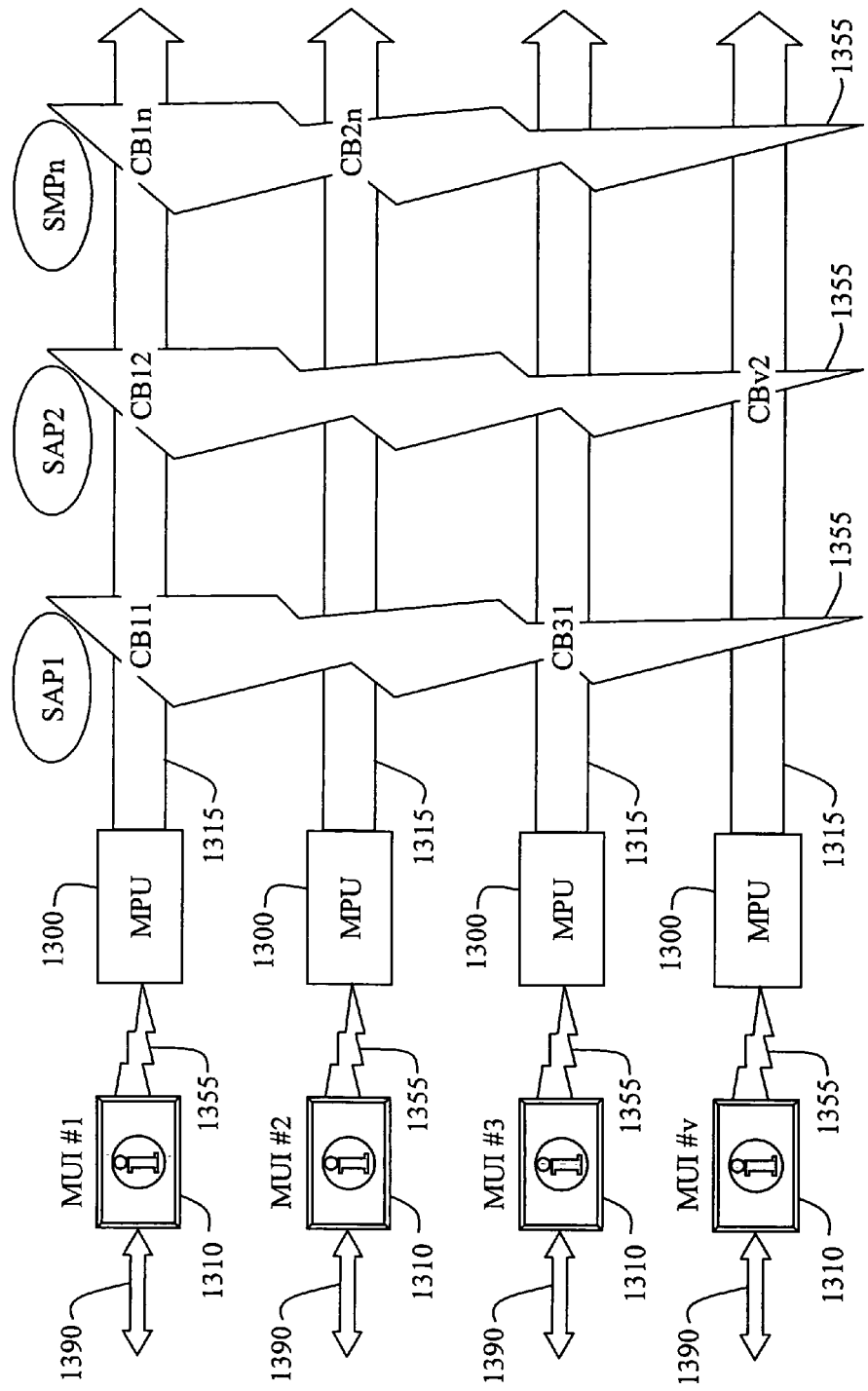
FIG. 19 is a block diagram showing the Master Bus and System Bus address system interconnection logic diagram.

More specifically, in FIG. 19 a set of predetermined GUR are shown allocated to a set of predetermined MITS 1301 MUI elements 1 through v required to satisfy the necessary subset of the GUR that can be made by a user 1390. The GUR subset allocation is done by 1) either a MITS 1301 designer being familiar with the generic user input output needs at various points of the generic user operation such as a theme park, a hair salon, or fast food franchise operation or 2) a design GUR request form along with a MOSS AP 1305 size form is filled out by the generic business owner or Individual. Method two is tomorrow's Web store version of purchasing a complete MITS 1301 with the MOSS 1300. At the time of this invention only some of a MITS 1301 GUE can be purchased by filling out an order form such as the SCNP 1350 elements and some SAP 1330 and SMP 1360 but none have a MOSS 1300. With this invention tomorrow's users will be able to order integrated technology elements operating as they specify under the control of a single MOSS and for the most part only need MUI terminals at the user interface points 1390. Each MUI element 1 to v has at least one GUR subset called a GUR view (GURV) that can be requested by one of the users 1390 via SB 1356 connected to the MOSS 1300 as represented by a CB shown at the intersections of the MITS 1301 MB 1315 created by the GUR and the AP 1305 MITS 1301 SB 1355. Note that each GURV is defined as either providing an input (I) action such as a POS credit card transaction or requesting an out put (O) action such as a report, picture or receipt, etc or the GURV might require several I and O actions. For example a credit card GURV might always require a set of several predetermined I and O actions. Sets of I/O caused at an MUI location are treated as one GURV and define one CB like CB1*n* in FIG. 19 for example and in FIG. 20 the Intersection Address (IA) is IA1*n*. Note that terminal view changes that just give the user another menu to make another choice are handled directly by the MUI terminal or MOSS 1300 and are not part of the MB 1315 and SB 1356 interconnection logic diagram shown in FIG. 19.

The CB and associated CE discussed herein always refer to MOSS actions causing transaction processing other than giving a user another MUI view to make a request from. In FIG. 20, one of the MIOS address tables 1605*c* discussed earlier is shown for a predetermined number of n AP 1305 elements and a predetermined number of v MUI terminals that each have a unique set of MITS 1301 GURV. Each IA of FIG. 20 is associated with a predetermined MRL relating a specific Predetermined MOSS AP element with a specific predetermined MITS 1301 MUI element. The MIOS address table 1605c exists even though there may not be a CB associated with each address.

In fact as shown in FIG. 21 the MIOS 1406 CE table 1605b has fewer CE than the MIOS address tables 1605c has IA addresses. This will most likely be the case and especially as the predetermined MITS 1301 generic user becomes larger and the MUI terminals required to satisfy all the predetermined sets of GURV range from those MUI with the GURV sets for the corporate officers that are interested in company performance down to those less skilled workers operating specific POS MUI with only the GURV sets required for customer interface transactions. In FIG. 21 the three types of CE types associated with any MOSS MIOS 1406 CE table 1605c are shown. The CE shown in FIG. 21 with an IA matrix subscript such as CE11 and CE42 are IA where either a) multiple AP database, b) specific parts of a single AP are required or c) combinations of these two CE transactions are required to meet the GURV for the MUI requested by a user 1390. This type CE is really one of the major purposes for the MOSS invention because this need for automated AP database transactions integration and control is what MOSS is really all about. The other two types of CE engines shown in FIG. 21 and are referred as the Direct Connect (DC) engine and the Not/Applicable (N/A) engine. The DC engine was also discussed earlier and that is a simple GURV request to DC the AP associated with the IA to the MUI element associated with the IA. For example in FIG. 21 the DC at IA22 would directly connect the AP#2 (say office 2000) to the MUI #2 terminal when requested by the user 1390. While discussing the MUI #2 note that the GURV selections available to the user at that location are one DC and one N/A and two complex GURV CE23 and CE2n respectively. Also note that every MUI 1 through v shown in FIG. 21 to have at least one complex GURV or N/A or both. At this point it is important to understand that the MOSS invention is only needed for that part of a user MOSS GUE that requires complex AP database transaction integration or AP blockage as will be discussed last. If for example a users MUI terminals where the matrix of FIG. 21 was filled with DC engines then the user does not need a MOSS 1300. The corollary is that users can have all sorts of non MITS 1301 GUE but they will not be integrated into the users MOSS and if they influence the users bottom line or performance goals the user will clearly not have a complete MITS 1301 design. The third type of CE shown in FIG. 21 is the N/A and it is the opposite of the DC engine and probably the most important CE in every generic MOSS design in terms of making money or increasing performance goals for the user. The N/A in essence blocks the complete underlying AP 1305 element from the MUI terminal and as shown in FIG. 21 many IA show N/A engines. In fact for the purposes of these descriptions all of the SCNP 1350 elements are considered N/A and not even used in these discussions or considered part of the IA matrix. To show and discuss the actual SCNP AP 1305 elements in a MITS 1301 MUI discussion would be like discussing what an API is or OSI is to a programmer that has written 100 programs to operate with the NT 4 platforms or to run on an ISP.

The purpose of the MOSS 1300 is to hide all the AP 1305 elements and especially the SCNP 1350 platforms and programs that support the multitude of SAP 1330 and SMP 1360 programs that MOSS 1300 controls under a single program. The N/A feature block all SCNP 1350 programs in essence and says no MUI 1310 user terminals will ever have to deal with complicated and confusing desktop GUI MUI as presented to SCNP 1350 administrators such as described in the Microsoft Certified System Engineer (MCSE) series of twenty or so books. The MOSS designs will in essence hide completely all the confusing desktop managers available to help allocate what AP 1305 Icons show up on what terminals like 1335, 1352, and a Terminal 1365. This fact is probably the greatest feature of the MOSS 1300 from a practical point of view since the user can greatly reduce the employees using the MUI terminals to play games and visit the Internet on company time since those options simply wont be available due to the N/A blocking engine capability of the MOSS 1300 design on most MUI 1310 terminals. Another easy feature to include in the MOSS 1300 design are the automatic MUI 1310 transaction demographics that can be kept in the MDM 1409 data base or can be kept in the MUIM 1408 unit so that user customer, user facilities, and employee activity can be easily observed by the owner. FIG. 15 is a good example of how the theme park PUI terminal 1410-1 only had nine user related GURV selection request shown and all of them showed park related GURV transactions would follow when any one of the nine selections were made. The MOSS 1300 design descriptions given are more than adequate for those skilled in the art of programming to build a MOSS 1300 unit for a predetermined set of AP 1305 elements related to a predetermined set of GURV and MUI 1310 terminals as defined by the matrices in FIGS. 20 and 21.

In addition, with the rapid movement of AP 1305 elements for "rent" from website's such as office 2000, accounting, e-mail service, etc., the MOSS design lends itself nicely to provide the "ultimate rent a master program" in that each user has their own Website and keeps all the MITS 1301 GUE except the MUI 1310 elements themselves that are disbursed through out the users operation at the ISP location or location. In this manner the AP 1305 elements are not only MOSS 1300 design hidden they are physically eliminated from the users operation and that is most likely even better (the government and institutional users will probably still want the have their own AP 1305 elements and just have them hidden from the employees). This Internet service is anticipated and is actually the preferred embodiment of the MOSS 1300 design and so in FIG. 22 all of the FIG. 21 CE are converted to Converter Browser Engines (CBE) to show that all communication between the MUIM 1408 interface browser 1610b as shown in FIGS. 16, 17 and 18 are MOSS 1300 browser engines located at the ISP location of the MITS 1301 GUE and the MUI terminals involve Internet browsing.

Note however that a FIG. 22 must all ways be associated with a FIG. 21 (Internet service or not) because the CE of FIG. 21 relate to the MIOS 1406 1605b engines controlled by the MEM 1407 MP 1620b and master browser 1620a that communicates with the hidden AP 1305 elements whereas the CBE of FIG. 22 relate to communication engines between the MUI 1310 elements and the MUIM 1408 and MDM 1409 elements that provide the MOSS 1300 responses for each user 1390 request. This double buffered or double protection feature of the MOSS 1300 was discussed earlier and the two CE FIGS. 21 and 22 for every MOSS design makes this design fact abundantly clear to those skilled in the art of programming. In addition each CB could have a search engine SE as mentioned earlier to perform selected internal or external database searches to satisfy many of the GURV especially in the future, consequently as a good design procedure for every CE there should be an associated SE in the design matrix and FIG. 22a is used to depict this fact even though both a CE and SE might not be required. Even though the combinatorial design possibilities with a lot of GURV, say n having a number of MUI showing specific GURV subsets say v, become astronomical quickly $(n!/(v!*(n-v)!))$, as a practical matter, for any particular generic user only a few are required and in most cases the GURV subsets are well known to the user. This is shown with the aid of FIGS. 23, 24, and 25.

In FIG. 23 an embodiment of a GURV MUI generation table for a typical medium to large size company is shown. In FIG. 23, four basic well known User Relation (UR) groups (they also can be thought of as department groups) are shown that apply to virtually any generic user along with a special UR group that will depend on the specific sub generic user along with 20 AP 1305 SAP and SMP program elements. The sub generic UR group is described in more detail in connection with FIG. 25. The 19 AP programs listed along with the specialty AP programs (of which one is shown) are also well known to the generic user and in most cases multiple AP are available to satisfy the UR groups. For example there are probably at least five accounting programs that will service all UR large and small, two tax programs, three office programs, three forms programs etc. Since for the most part these programs become hidden from the user behind a MOSS 1300, a list of the AP to use are not necessary in order to describe the design procedure. In FIG. 23 the four UR groups or departments are operations, accounting, HR and G&A. The GURV for essentially all MOSS 1300 designs can be generated using the table in FIG. 23 (or its equivalent) by assigning a MUI 1310 to each of the intersections points created by the AP line intersecting with each of the five UR groups along with the number of CE required for each MUI 1310. The CE number is shown in parenthesis as ®) and for sake of demonstrating the size of a typical MOSS CE matrix as shown in FIGS. 21, 22 and 22*a* assume r was 3 for an economy MOSS 1300 design. If in fact the numbers in FIG. 23 are typical, then only 100 MUI 1310 type terminals, each satisfying 3 sets of GURV are required for a typical MOSS 1300 (the economy model) and 300 CE would be distributed over a 2000 element matrix in FIGS. 20, 21, 22 and 22*a*. Even if the number of CE engines for each MUI were increased to r=10 only 100 MUI 1310 are still required where each can Satisfy 10 GURV (the luxury model) and the 2000 size matrix in FIGS. 20, 21 and 22 would be 50% full instead of 16% full as in the case of the economy model r=3. In fact the number of MUI 1310 are much smaller than the design matrix used in FIG. 23 to build the MOSS 100. The reason is that each department usually only needs or wants more than 1 to 10 MUI 1310 types for the employees to work with and most of the CE choices at each of the intersection points of FIG. 23 will be either DC or N/A (the N/A is the default value) if the user does not specify. Consequently it becomes clear that following the object oriented design procedures described herein programmers skilled in the art can readily become master programmers and write programs for any MOSS 1300 design where the CE GURV and AP 1305 elements are provided.

As discussed in connection with FIGS. 16, 17 and 18 another powerful (in the future maybe the most powerful)-feature of the MOSS 1300 design are the silent translator engines (TE) that feed the common MOSS 1300 databases to predetermined frequencies managed by the MEM 1407 MOSS 1300 module. It is these behind the scenes TE that operate to keep all the MOSS 1300 user data bases feeding a common database in a fashion not unlike the concept behind synchronizing two databases such as done between portable computers and desktop computers but clearly much different in how they work since synchronizing two is much easier than feeding a master database from say 100 slices of many separate databases as done by the MOSS 1300. However to elevate this part of the design procedure to its proper place FIG. 24 shows the same MOSS 1300 design as FIG. 23 except TE (t) are used to denote silent MOSS database automation features that are transpiring periodically to maintain the MDM 1409 databases required to satisfy all of the theoretical MUI (millions and millions) if one is ever needed. A good example would be say the Tax AP #10 of FIG. 24 was a program such as Turbo Tax and the 15 or so accounting related programs in column 2 of FIG. 24 all came from Quicken. Both of these AP brands are very popular for both individual and small business generic users. Then the MOSS 1300 would be filling out all the generic user Turbo Tax return behind the scenes based on the I/O transactions coming in from all the MUI 1310 terminals and the computations being accomplished in the other 15 or so AP Quicken accounting related AP. Then for example if one of the special MUI GURV was "let me see the Tax due" an individual or owner would know during the year what his tax liability was and maybe have the Tax expert make suggestions. In this example it is clear that the behind the scenes processing is huge and most likely has more and different contact points than the simple I/O points made visible to the generic user.

Figure 26:
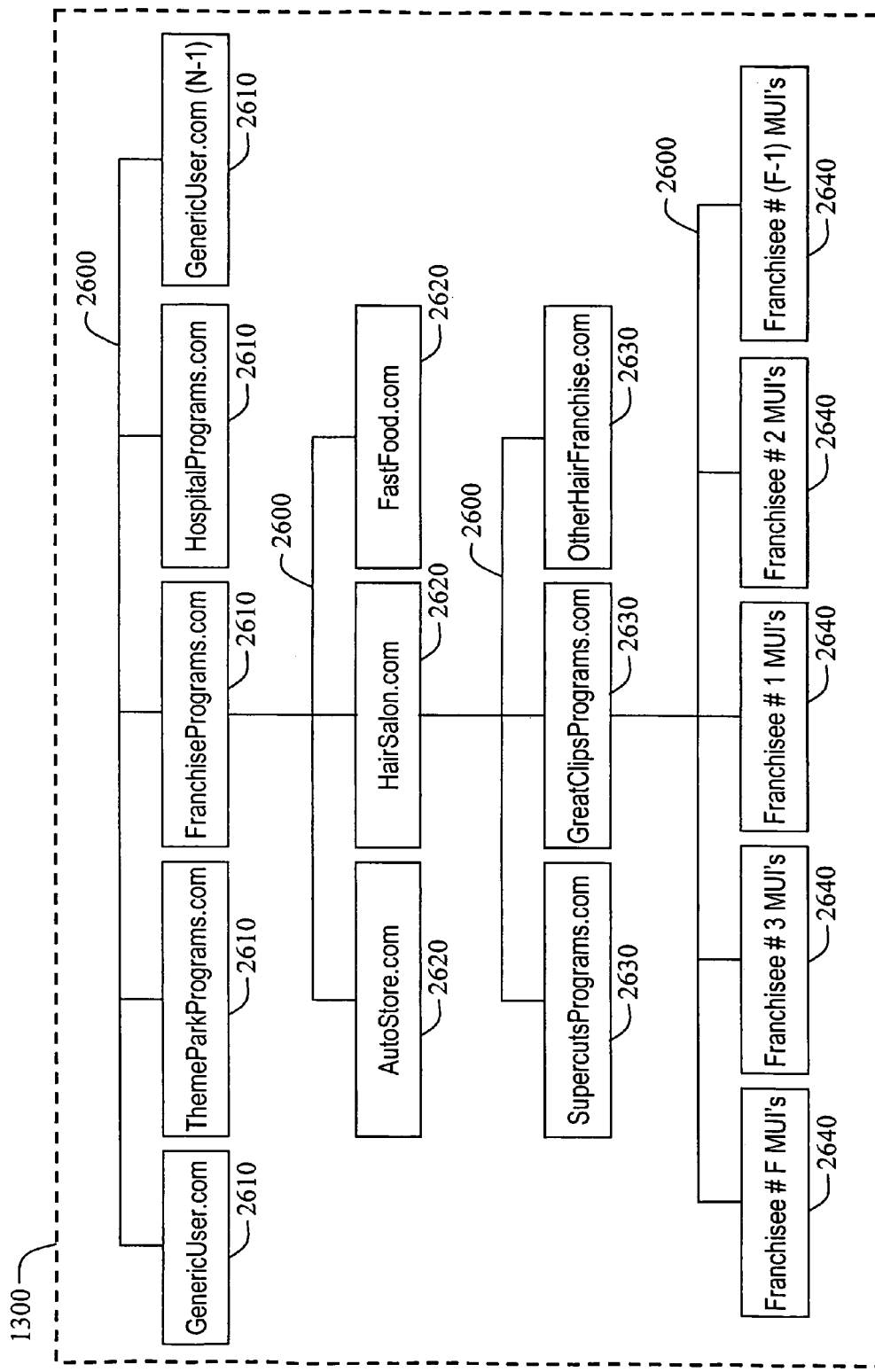
FIG. 26 is a block diagram showing specifically how a generic user renting MOSS master program from an Internet Service Provider (ISP), feeds a local MUI.

With the aid of FIGS. 25 and 26 a more detailed description of a generic user is afforded. In FIG. 25 a table for 536 generic users and specific sub users is given where the user categories were taken from the Standard Industrial Classification (SIC) published by the Department of Commerce and used industry wide. The table was constructed by taking the major generic categories and then counting the number of sub categories at the next level to arrive at the 536. If one was to go to the next level another multiplier of approximately 10 would give over 5000 MOSS programs is all that is required to service the industry (that is actually a very small number compared to the number of SAP 1330 programs alone that are on the market when website programs are included). Continuing, if there were say 1000 businesses operating in each of the 5000 category a market of one thousand users for every MOSS 1300 design would be a good supportable market and if each license was for say 3% of the gross (user savings from a MOSS 1300 will range from 10 to 20%) then you can see the industry of hiding technology from the user in combination with automating the users business (remember a MOSS 1300 does both) will become as big if not bigger than the underlying technology. The business of hiding, automating, and integrating technology together for the benefit of the customer can now be very practical if the Internet is properly employed.

In FIG. 26 the preferred deployment of the MOSS 1300 invention on the Internet 2600 is shown where Generic User Websites 2610 maintain generic MITS 1301 AP 1305 technology for the sub generic users like those of Websites 2620. The 2620 Websites have the actual MOSS 1300 programs for specific User Websites such as shown in 2630. The specific user Website 2630 then services their specific users like kind MUI's 1310 shown as Franchisee MUI's 2640 and can offer tailor made features such as now done by technology, grocery or automobile shopping carts. The specific users themselves only have to have the MUI 1310 terminals required for their specific business.

Figure 27:
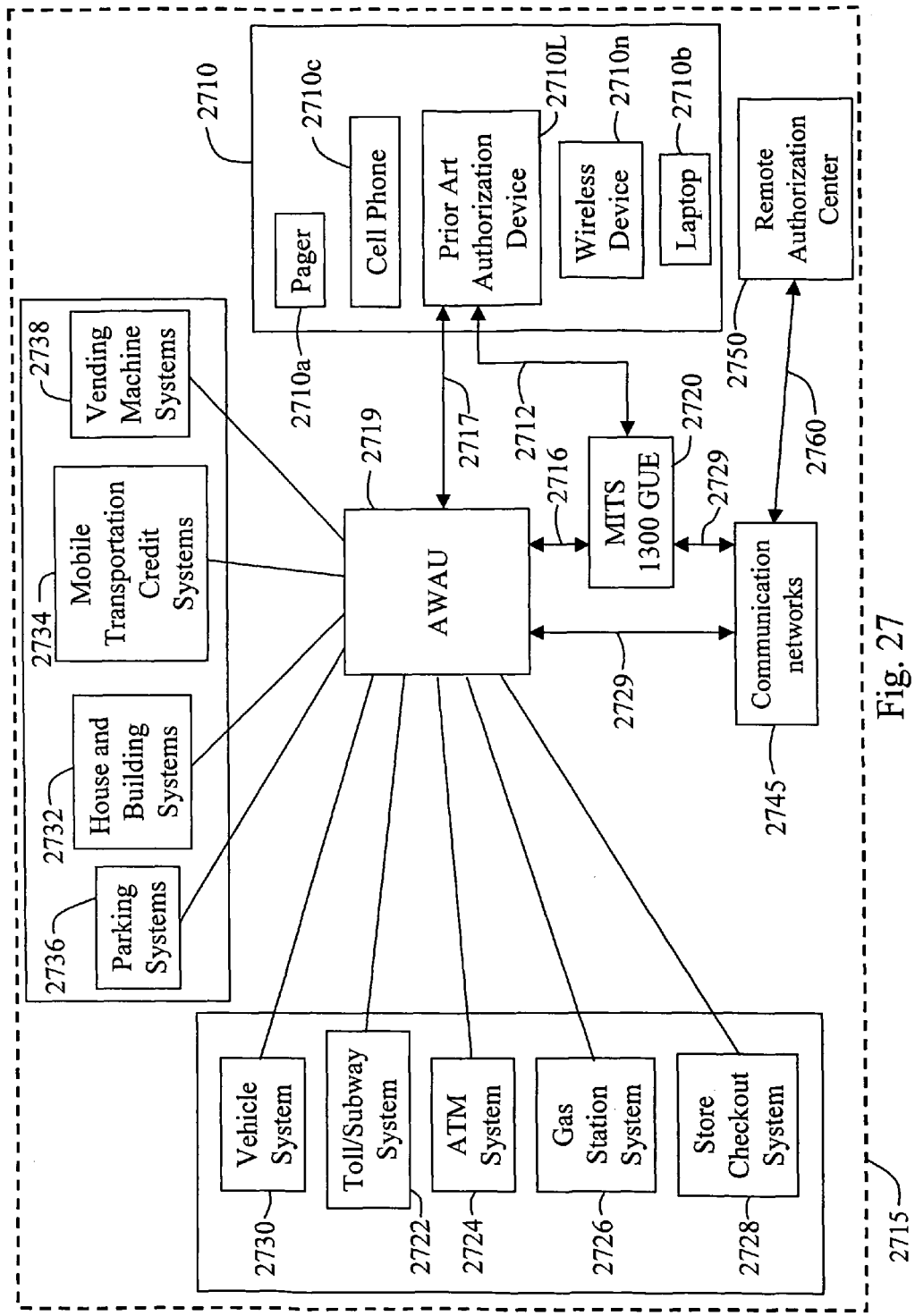
FIG. 27 is a block diagram showing a MOSS for automating portable computers and wireless communication devices.

In addition to the fixed generic user technology AP 1305 and MUI 1310 described in FIGS. 13 through 18 the MOSS invention with the appropriate interface modifications using Converter Boxes 2719 are shown in FIG. 27 to operate with portable MUI 1310 and wireless AP 1305 and SCNP 1350 elements. Some of the Mobile Devices 2710*a,b,n* and proximity systems described in a patent application identified by U.S. Ser. No. 09/652,077, entitled "new communication and proximity authorization systems", and filed on Aug. 31, 2000, the entire content of which is hereby expressly incorporated herein by reference, are shown in FIG. 27 along with Communication Networks 2745 and 2760. The devices 2710 a-n can be given a MOSS 1300 unit with converter boxes 2719 to automatically detect and operate with all the various proximity and communication systems automatically upon activating the proper MUI 1310 User 1390 selection. Some of the specific proximity systems identified in FIG. 27 are referred to as, 2722 for Toll/Subway Systems, as 2724 for ATM Systems, as 2726 for Gas Station Systems, as 2728 for Store Checkout Systems, as 2730 for Vehicle Systems, as a 2732 for Parking Systems (including parking meters), as 2734 for Mobile Transportation Credit Systems such as used in taxis and buses, as 2736 for House and buildings, as 2738 for Vending Machine Systems that also can be made to work with wireless mobile devices.

In FIG. 27 the basic operation of a mobile MITS 1301 is described by starting with the multiple mobile devices shown in 2710 where five different type devices such as a digital cell phone, pager, computer, PDA or a specialty device are shown. For the sake of clarity, let four types of the devices be wireless mobile and not discussed in connection with FIGS. 13 through 18. These devices are those that work with existing communication systems SCNP 1350 platforms such as Windows CE, Blue Tooth, WAP and activate existing Proximity systems SMP 1360 and will be denoted by 2710*a*, 2710*b*, 2710*c* and 2710*n*. The fifth mobile MUI 1310 (it may or may not be wireless) already designed to operate with a MITS 1301 (shown as 2720) is denoted as 2710L. The four 2710 wireless mobile device elements 2710*a*, 2710*b*, 2710*c* and 2710*n* can be made to operate with compliant proximity and communication system after the MOSS 2719 elements are installed in 2710*a*, 2710*b*, 2710*c*, 2710*n* and connected via a communication link 2717 are connected to the MITS 1301 via a communication link 2716. The complete SB 1355 and 1356 are shown in FIG. 27 as communications links 2717, 2729, 2745 and 2760. For those persons skilled in the art of programming on the Windows CE platform, the above description along with the detailed design descriptions given in connection with FIGS. 20 through 25 allow the MOSS 1300 to be incorporated into the four types of devices.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. A method for providing a predetermined service, comprising the steps of:
   receiving a request for a predetermined service and a cyber card code by a proximity service system;
   locally approving the cyber card code by the proximity service system utilizing a cipher algorithm;
   providing, by the proximity service system, a predetermined service in response to approving the cyber card code; and
   outputting information to a proximity service provider computer system indicating usage of the proximity service system.

2. The method of claim 1, wherein the cipher algorithm converts the cyber card code to a service provider identification number, and wherein the proximity service provider periodically receives at least one of a new cipher algorithm and a service provider identification number.

3. The method of claim 1, wherein the cyber card code is a public key of a public key, private key encryption system.

\* \* \* \* \*

UNITED STATES PATENT AND TRADEMARK OFFICE
CERTIFICATE OF CORRECTION

PATENT NO.        : 8,935,184 B2                                    Page 1 of 1
APPLICATION NO.   : 11/018176
DATED             : January 13, 2015
INVENTOR(S)       : Charles C. Freeny, Jr.

It is certified that error appears in the above-identified patent and that said Letters Patent is hereby corrected as shown below:

In the Specification:
Column 22, line 36: Before "PUE." delete "1410-11" and replace with
-- 1410-1i --

Signed and Sealed this
Twenty-first Day of April, 2015

Michelle K. Lee
*Director of the United States Patent and Trademark Office*